US011945649B2

(12) United States Patent
Galluzzo et al.

(10) Patent No.: US 11,945,649 B2
(45) Date of Patent: Apr. 2, 2024

(54) BIN RETRIEVAL AND TRANSPORT SYSTEMS AND METHODS

(71) Applicant: IAM ROBOTICS, LLC, Pittsburgh, PA (US)

(72) Inventors: Thomas Galluzzo, Gibsonia, PA (US); Vladimir Altman, Pittsburgh, PA (US)

(73) Assignee: IAM Robotics, LLC, Pittsburgh, PA (US)

( * ) Notice: Subject to any disclaimer, the term of this patent is extended or adjusted under 35 U.S.C. 154(b) by 283 days.

(21) Appl. No.: 17/350,911

(22) Filed: Jun. 17, 2021

(65) Prior Publication Data

US 2021/0395007 A1 Dec. 23, 2021

Related U.S. Application Data

(60) Provisional application No. 63/130,036, filed on Dec. 23, 2020, provisional application No. 63/059,161, filed on Jul. 30, 2020, provisional application No. 63/040,013, filed on Jun. 17, 2020.

(51) Int. Cl.
*B65G 1/04* (2006.01)
*B65G 1/137* (2006.01)
*B65G 1/08* (2006.01)

(52) U.S. Cl.
CPC ......... *B65G 1/0421* (2013.01); *B65G 1/1371* (2013.01); *B65G 1/1375* (2013.01); *B65G 1/08* (2013.01)

(58) Field of Classification Search
None
See application file for complete search history.

(56) References Cited

U.S. PATENT DOCUMENTS

| 4,492,504 | A  | * | 1/1985  | Hainsworth | B66F 9/07 |
| | | | | | 414/280 |
| 5,328,316 | A  | * | 7/1994  | Hoffmann | B65G 1/0435 |
| | | | | | 414/280 |
| 9,582,001 | B1 | * | 2/2017  | Holmberg | G05D 1/0088 |
| 11,414,312 | B2 | * | 8/2022 | Nobata | B65G 1/0435 |
| 2015/0032252 | A1 | * | 1/2015 | Galluzzo | B60P 1/5423 |
| | | | | | 700/218 |
| 2017/0174431 | A1 | * | 6/2017 | Borders | B65G 1/0492 |
| 2022/0194700 | A1 | * | 6/2022 | Fujita | B66F 9/141 |

* cited by examiner

*Primary Examiner* — Mark C Hageman

(74) *Attorney, Agent, or Firm* — Dentons Cohen & Grigsby P.C.

(57) ABSTRACT

Bin retrieval robots configured to pick or put-away bins within a logistics facility and to transport one or more picked bins. Methods and systems for autonomous picking or put-away of bins within a logistics facility that include the bin retrieval robot(s) are also disclosed. The systems include a remote server and at least one bin retrieval robot, wherein the remote server is configured to communicate with the bin retrieval robot(s) to send and receive picking data, and the bin retrieval robot(s) are configured to autonomously navigate and position within the logistics facility.

20 Claims, 25 Drawing Sheets

BIN RETRIEVAL AND TRANSPORT SYSTEMS AND METHODS

CROSS-REFERENCE TO RELATED APPLICATIONS

The present application claims the benefit under 35 U.S.C. § 119(e) of prior U.S. Provisional Application Ser. No. 63/040,013 filed Jun. 17, 2020 and titled "Bin Retrieval and Transport Systems and Methods", U.S. Provisional Application Ser. No. 63/059,161 filed Jul. 30, 2020 and titled "Direct Drive Outer Rotor Brushless DC Motor Drive Wheel", and U.S. Provisional Application Ser. No. 63/130,036 filed Dec. 23, 2020 and titled "Bin Retrieval Robot", the entire contents of each incorporated herein.

TECHNICAL FIELD

This invention relates generally to supply chain, manufacturing, and logistics automation equipment, systems, and methods. More specifically, the present disclosure is directed to devices, systems, and methods useful for the purpose of autonomously picking, transporting, and placing bins within a logistics facility.

BACKGROUND

Distribution centers are facing increasing pressures on cost and delivery time from the exploding e-commerce industry. This comes at a time when many companies are facing a national labor shortage of workers to fill jobs related to picking or packing items within such centers. For employees, these changes are demanding increased pick rates and hours. Additionally, many in the workforce in these centers spend up to 90% of their time walking from one item to the next. The result is unhappy employees with turnover rates harmful to business.

The time consuming and very manual nature of picking and put-away makes it a costly process and, therefore, one that has led to intense scrutiny by organizations looking to save time and money. There are currently many solutions for both optimizing and automating various aspects of the process, ranging from augmenting human labor with various technologies to completely replacing human labor with customized picking equipment and infrastructure. The most successful solutions use automated storage and retrieval systems (ASRS) that bring the items or bins directly to the picker, typically by bringing an entire shelving unit, where a picker (human or robotic) either directs the bins for delivery to a store or transfers items from the bins to order containers for delivery to stores or individual customers. By delivering the shelves containing the ordered items to the human location rather than having the human go to the individual shelf locations, the humans, and in turn, overall order fulfillment, become more efficient.

Other ASRS systems are massively complicated machines that behave like complicated vending machines. Product is stored in custom bins, and these bins are sent into the ASRS, which then places the bins into a number of storage locations inside the ASRS. The ASRS can then retrieve the bins when the product is needed.

Such automation systems, in many cases, require a complete overhaul of the distribution site or require specialized shelving units that the robots can lift and move within the distribution site. This requires a significant up-front investment from the facility, which may be difficult to afford and is the main reason many automation solutions have not been widely adopted. As such, many distribution facilities still rely on manual labor to accomplish picking.

SUMMARY

The present disclosure overcomes many of the shortcomings of the prior art by providing automation equipment, systems comprising the automation equipment, and methods for robotic bin retrieval, transport, and bin placing within a logistics facility. These systems may use existing shelving and logistic facility layouts and may be configured to work alongside existing human labor and/or in combination with various other automation equipment to provide distribution site operators with scalable automation solutions.

Accordingly, disclosed herein is a first autonomous mobile robot configured for retrieval of totes or bins from shelving within a logistics facility, i.e., a bin retrieval robot. The retrieval robot generally comprises a mobile base having a vertically extending support frame installed thereon. The support frame includes a plurality of storage trays distributed in a vertical direction, and a bin handling platform that is moveable vertically along the support frame and positionable at each of the plurality of storage trays.

The bin handling platform includes an upper surface comprising a bin retrieval device that is configured to extend horizontally from the bin handling platform to a position under a bin and retract horizontally to pull the bin onto the bin handling platform. Further, the bin handling platform is configured to deliver the bin to one of the plurality of storage trays without rotation of the bin handling platform or bin retrieval device.

The bin retrieval device generally comprises a telescoping deck having at least a first and second telescoping platform or a pair of telescoping arms, each of which may extend along a horizontal plane in either direction from the bin handling platform, generally in a direction 90 degrees from the direction of travel of the mobile base. The telescoping deck or each telescoping arm may comprise a retractable finger at each end thereof, wherein each of the retractable fingers are configured to have an open position parallel and flush with the telescoping deck or arm and a closed position substantially perpendicular to the horizontal plane and extending upward therefrom.

The upper surface of the bin handling platform may comprise a transfer mechanism configured to move the bin between the bin handling platform and one of the plurality of storage trays. As such, once the bin retrieval device has retracted horizontally to position the bin on the bin handling platform, the transfer mechanism may move the bin between the bin handling platform and one of the plurality of storage trays. Exemplary transfer mechanisms include wheels, omni-wheels, mecanum wheels, rollers, roller balls, activated roller belts, belts, or combinations thereof. Additionally, each storage tray may comprise an actuatable conveyance system.

Also disclosed herein is a second autonomous mobile robot configured for retrieval of totes or bins from shelving within a logistics facility, or a bin retrieval robot. The bin retrieval robot generally comprises a mobile base having a vertical tower positioned thereon and a bin handling platform moveable on the vertical tower along vertical tracks on a face thereof. The bin handling platform comprises a bin retrieval device configured to extend horizontally from the bin handling platform to a position under a bin and retract horizontally to pull the bin onto the bin handling platform. The bin retrieval device may comprise a telescoping deck having at least a first and second telescoping platform or a pair of telescoping arms that extend along a horizontal plane in either direction from the bin handling platform, generally in a direction 90 degrees from the direction of travel of the mobile base.

The bin handling platform may be configured to lift vertically to a raised position after the bin retrieval device extends horizontally from the bin handling platform to a position under a bin, and before the bin retrieval device retracts horizontally. In this way, the bin is lifted from its position on a shelf and the full weight of the bin is positioned on and supported by the bin retrieval device before the bin retrieval device retracts to a position on the bin handling platform.

The bin handling platform may comprise retractable finger(s) at each end thereof, wherein each of the retractable fingers are configured to have an open position parallel and flush with the telescoping deck or arm and a closed position substantially perpendicular to the horizontal plane and extending upward therefrom. Alternatively, or additionally, the first telescoping platform may comprise a platform conveyance means at each end thereof, wherein each platform conveyance means is configured to move in a direction parallel to and opposite from the extension direction of the first telescoping platform. Exemplary platform conveyance means include any of wheels, omni-wheels, mecanum wheels, rollers, roller balls, activated roller belts, belts, or combinations thereof.

Any of the bin retrieval robots disclosed herein may further comprise a plurality of sensors, one or more processors, a remote communication device, and a memory comprising computer program instructions executable by the one or more processors to receive data from and send data to a central server, process data received from each of the plurality of sensors, and output control signals to the mobile base, the bin handling platform, and the bin retrieval device.

The plurality of sensors may include forward and rear facing cameras and a laser ranging device, wherein the laser ranging device may be positioned in a horizontal cavity of the mobile base, the horizontal cavity located in a front portion of the mobile base and configured to afford the laser ranging device at least a 180-degree field of view on a horizontal plane elevated from and parallel with a floor surface. As least one of the plurality of sensors may be positioned on the bin handling platform and configured to view a bin and/or shelving unit.

The bin retrieval robots may be in communication with a central server configured to send a task list to the bin retrieval robot including at least one bin to be picked, wherein the task list may include a location within the logistics facility for the at least one bin. The task list may include a unique identification for the at least one bin, and the location within the logistics facility for the at least one bin may include an identity of a shelf defined by a shelf marker.

The bin retrieval robots may further comprise a field replaceable battery comprising at least one battery cell, a charging interface for connecting the at least one battery cell to an external power source, and a blind mate connector electrically connected to the at least one battery cell and configured to engage a corresponding blind mate connector on the bin retrieval robots. The field replaceable battery may comprise a self-contained charging circuit that is connectable to an external power source. The bin retrieval robots may be configured to autonomously exchange the field replaceable battery based on signals received from one or both of a charge sensor on the field replaceable battery and a central server.

The bin retrieval robots may comprise at least two direct drive wheels, wherein each direct drive wheel comprises an inner stationary stator comprising a plurality of electromagnets positioned on an outer circumference thereof; a cylindrical outer rotor surrounding the inner stationary stator and including: a plurality of permanent magnets alternatively magnetized north and south and positioned on an inner circumferential surface of the rotor forming a magnetic clearance gap between the plurality of permanent magnets and the plurality of electromagnets, and a tire positioned on an outer circumferential surface of the rotor; and a stationary central shaft having a central axial bore, wherein the stator is mounted to the central shaft and the rotor is configured for rotation about the stator. The motor controller may be configured to provide power to groups of electromagnets of the plurality of electromagnets, and to apply a switching pattern to the groups to cause the outer rotor to rotate about the stator.

Each of the direct drive wheels may further comprise a front cover attached to an outer circumferential edge of the rotor; and a back cover attached to an inner circumferential edge of the rotor and extending inward from the rotor toward the central shaft such that the stator is positioned between the front cover and the back cover. Rotation of the rotor about the central shaft is permitted by a first bearing positioned between an inner surface of the front cover and the central shaft and a second bearing positioned between an inner edge of the back cover and the central shaft. Moreover, the central shaft of each of the direct drive wheels further includes at least one axial bore offset from the central axial bore and configured to accept an attachment means for connection to the bin retrieval robot.

The presently disclosed invention further relates to systems comprising a central server and at least one bin retrieval robot, wherein the robot(s) are configured to receive bin pick orders from the central server and retrieve, transfer, and transport bins within a logistics facility based on the bin order. The presently disclosed invention further relates to systems comprising a central server, at least one bin retrieval robot, and at least one transport robot, wherein the bin retrieval robot(s) are configured to receive bin pick orders from the central server and retrieve and transfer bins to a transport robot based on the bin pick order, wherein the transport robot is configured to transport bins within a logistics facility.

The presently disclosed invention further relates to methods for bin pricking, transfer, and transport within a logistics facility using any of the robots or systems disclosed herein.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present disclosure, unless stated to be otherwise, are not necessarily drawn to scale. The illustrative embodiments in the following drawings are not meant to be limiting; other embodiments may be utilized, and other changes may be made without departing from the spirit or scope of the subject matter presented herein.

DETAILED DESCRIPTION

Figure 1:
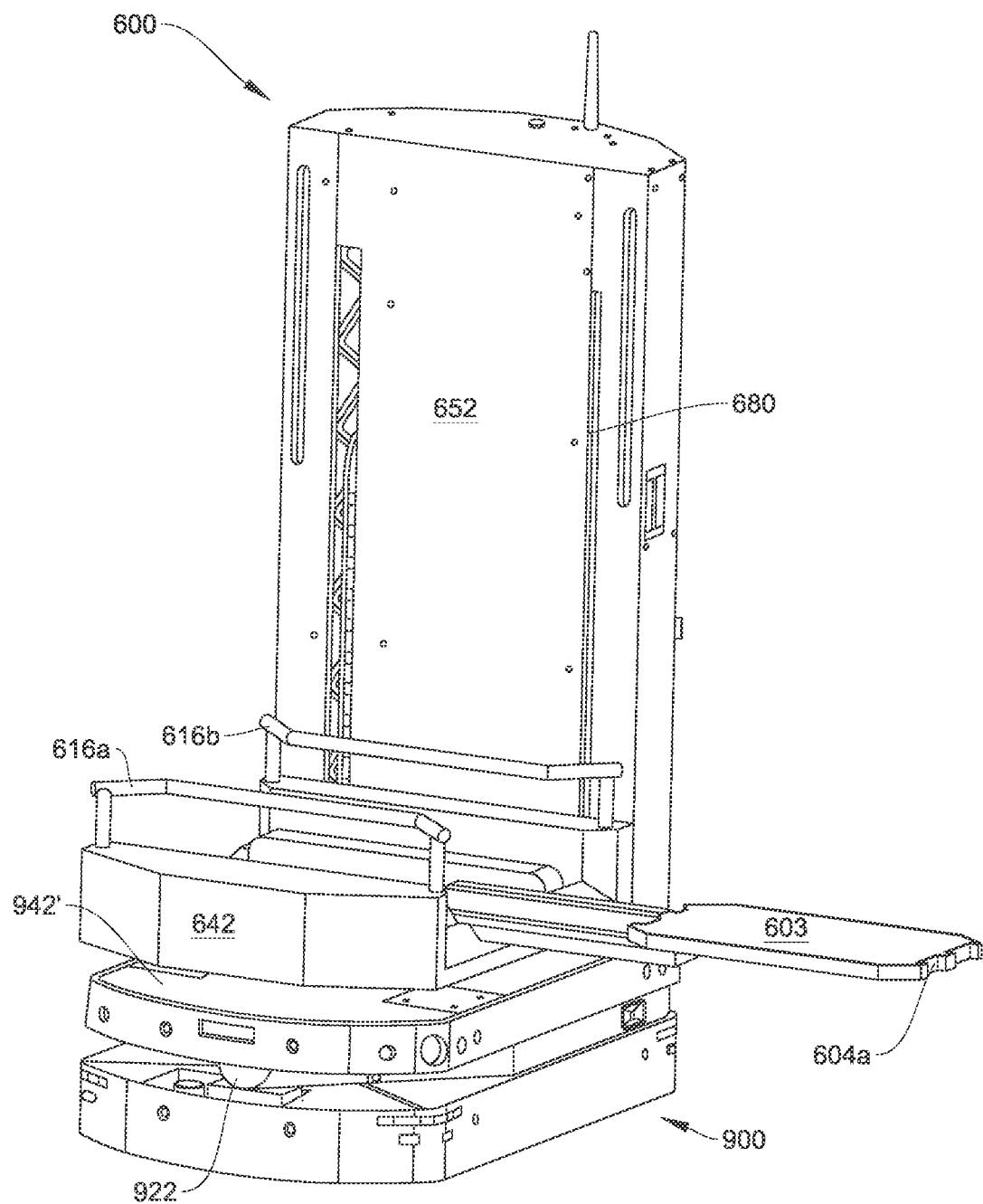
FIG. 1 illustrates a front perspective view of a bin retrieval robot with a telescoping platform in the extended position in accordance with certain aspects of the presently disclosed invention.

The present disclosure describes systems and methods for automated robotic transfer and transport of totes or bins within a logistics facility. Logistics facilities generally include, but are not limited to warehouses, distribution centers, manufacturing facilities, and retail facilities. The presently disclosed systems and methods utilize both robotics hardware and software technologies that are detailed in the following description. The above summary and drawings are not intended to describe or show each illustrated embodiment or every possible implementation of the present disclosure.

Definitions and Abbreviations

Described herein are autonomous mobile robots ("AMRs") configured to pick and place totes or bins from shelving or other storage locations within a logistics facility, i.e., "bin retrieval robots". The present disclosure further relates to AMRs configured to transport totes or bins received from a bin retrieval robot to human workers or a conveyance system, or vice versa, i.e., "transport robots". The bin retrieval robots, alone or in combination with other AMRs, e.g., the transport robots, may form a system configured to pick and place bins within a logistics facility. These AMRs may be part of a larger system comprising autonomous mobile manipulation robots ("AMMRs") configured to pick and put-away items, bins, or cases within a logistics facility. Typical AMMRs include a robotic arm capable of picking individual items, bins, or cases. The AMRs may be configured to send and receive totes or bins from each other, and from the AMMRs, human workers, and/or a conveyance system.

Various aspects of the systems and methods for transfer, i.e., removing a tote or bin from, or delivering to, shelving or a designated storage location with any of the AMRs or AMMRs may be illustrated by describing components that are coupled, attached, and/or joined together. The terms "coupled", "attached", and/or "joined" are interchangeably used in this disclosure to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" are used herein to describe one element's relationship to another element illustrated in the drawings. It will be understood that relative terms are intended to encompass different orientations of aspects of the system in addition to the orientation depicted in the drawings. By way of example, if aspects of the bin retrieval robot shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

"Substantially," as used herein, is understood to mean to a great or significant extent, such as at least 80%, or 90%, or 95%, 96%, 97%, 98%, or even 99%. For example, when an object is described as having a property substantially the same as a comparative such as a diameter or shape or position (e.g., perpendicular or parallel), etc., the property will be within at least 80% of the value of the comparative.

As defined herein, a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least 1D-barcodes such as a Universal Product Code (UPC), International Article Number (EAN), Global Trade Item Number (GTIN), Code 39 barcode, Code 128 barcode, Interleaved 2 of 5 (ITF), Code 93, Codabar, GS1 databar, and MSI Plessy. Examples further include 2D-codes such as a QR code, Datamatrix code, PDF417 code, Aztec code, and ArUco markers.

The terms "goods," "products," "items," and SKUs may be used interchangeably, and may be taken to indicate items that need to be retrieved and/or stored. Such items can include any consumer product, including but not limited to, packaged and unpackaged products (e.g., packaged food and individual units of food such as produce). Such items can also include items that are not considered consumer products (e.g., library items). Furthermore, while each of these terms is generally understood to indicate a single unit, these terms may refer to groups of these units packaged together, such as in a multipack or in a case.

The terms "tote" and "bin" are also used interchangeably, and may be taken to mean a container used to store products or goods while they are located on a shelf within a logistics facility, or as they are moved throughout the logistics facility on or by a robotic system or conveyor belt. Exemplary containers include at least plastic, metal, wood, or cardboard bins or boxes, and plastic, metal, wood, or cardboard trays. Any of these containers may be specialized or may be standard examples of such a container, e.g., a standard commercially available plastic bin or cardboard box. Additionally, individual items or boxes may be packaged together and may form a tote or bin as used herein, such as by shrink wrapping, or in a case or multipack.

The process of selecting and retrieving items, bins, or cases from a specific storage location in a facility is referred to as "picking", wherein selection of individual products or items may be referred to as piece-picking or each-picking. The process of breaking cases for individual product picking, i.e., taking the individual items from the case or pallet and placing them in a specific storage location in a facility, is called "put-away". Put-away may also comprise placing bins or cases or even items in a specific location within a facility or placing multipacks in a specific location within a facility. Picking and put-away occurs in both distribution warehouses and retail centers.

The terms "storage" and "data storage" and "memory," when used in the context of a computer system or method, may be used interchangeably and may be taken to indicate both transient and permanent storage (i.e., on a non-volatile memory hardware device) of data on a computer.

The term "logistics" facility may be taken to mean any facility that provides for the efficient production, storage, and/or flow of goods. Exemplary logistics facilities include at least warehouses, distribution centers, retail centers, and manufacturing facilities.

The terms "shelf" and "rack" are used to indicate a storage unit within a logistics facility. As used here, however, these terms may also refer to locations or regions of interest within a logistics facility. Moreover, while the term "slot" is used with respect to a shelf or rack to indicate a defined section having specifically delimited edges, the term slot may also be understood to refer to a region of interest. Thus, for example, a slot may also be understood to indicate a general position on a floor within a logistics facility or on a shelf in which an item or tote or bin may be stored.

The term "warehouse management system" or WMS may be understood to mean any database which stores information about items or products stored within a logistics facility, and may include the product size, weight, inventory count, storage location, etc. The terms "warehouse execution system," or WES and "warehouse control system," or WCS may be understood to mean a software application that directs the real-time activities within logistics facility. The terms warehouse management system, WMS, warehouse execution system, WES, warehouse control system, and WCS are used interchangeably herein, and reference to one may comprise reference to any or all of these terms. Moreover, the term "remote server" may be used to refer to at least a processor/memory of a computing system remote from the robotic system being discussed, such as the central server or a processor/memory of the WMS, WES, and/or WCS.

As used herein, the terms "shelf tag" and "marker" may refer to an object used to identify a location. Most commonly a shelf tag or marker may be a fiducial marker placeable in the field of view of an imaging system. Exemplary fiducial markers include at least 1D and 2D barcodes and ArUco markers. Shelf tags or markers may also be understood to refer to an object that is not visually perceived, such as RFID, sound, or tactile markers that may identify or differentiate an identity.

Embodiments of the Present Disclosure

The present disclosure relates to autonomous mobile robots (AMRs) configured to pick and place totes or bins from shelving or other storage locations within a logistics facility, i.e., "bin retrieval robots". The present disclosure further relates to AMRs configured to transport totes or bins received from a bin retrieval robot to human workers or a conveyance system, or vice versa, i.e., "transport robots". The bin retrieval robots, alone or in combination with other AMRs, e.g., the transport robots, may form a system configured to pick and place bins within a logistics facility. These AMRs may be part of a larger system comprising autonomous mobile manipulation robots (AMMRs) configured to pick and put-away items, bins, or cases within a logistics facility, generally comprising a robotic arm. The AMRs may be configured to send and receive totes or bins from each other, and from the AMMRs, human workers, and/or a conveyance system.

The present disclosure further relates to methods for picking and put-away of totes or bins using the bin retrieval robots, the bin retrieval robots and the transport robots (the AMRs), and systems comprising the AMRs and the AMMRs. Such methods may include dynamic selection of work areas for each of the robots and/or humans working in a logistics facility and may further include dynamic storage and retrieval of high frequency items, bins, or cases at specific high-frequency locations within a logistics facility.

Referring now to the drawings, FIGS. 1-6 illustrate a bin retrieval robot according to certain aspects of the presently disclosed invention. With specific reference to FIG. 1, the bin retrieval robot 600 includes a vertical tower 652 positioned on a mobile base 900. As shown, according to certain aspects, the vertical tower 652 may be positioned on a top surface 942' of the mobile base 900, which includes at least one sensor 922 configured to sense an environment around the mobile base.

The vertical tower 652 supports a bin handling platform 642 that includes a bin storage bed 640. The platform 642 is moveable vertically on the vertical tower 652 along vertical tracks 680 so that a position of the platform 642 may be aligned with a vertical position of a bin on a shelf. As shown, the bin storage bed 640, also referred to herein as a bin retrieval device, may include a telescoping deck comprising at least two telescoping portions or platforms, wherein a topmost portion or first telescoping platform 603 is shown in a fully extended position. At an end of the first telescoping platform 603 are shown a set of twister arms 604a in the retracted or open position, i.e., parallel with a top surface of the first telescoping platform 603. As shown in FIG. 1, sides of the telescoping deck (i.e., first and second telescoping platforms 603, 602, respectively) are those aligned parallel to a direction of extension and ends of the telescoping deck are those aligned perpendicular thereto.

Figure 3:
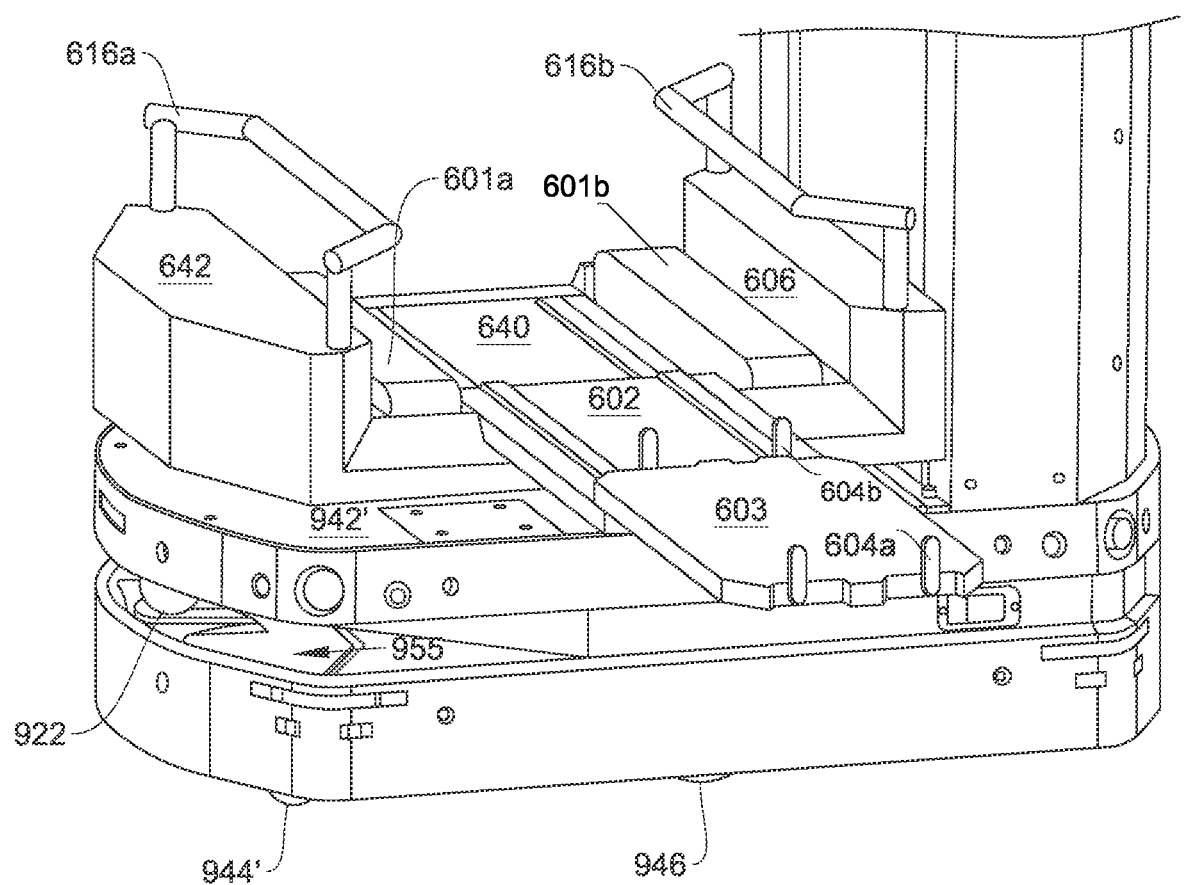
FIG. 3 illustrates closeup side perspective view of the bin retrieval robot shown in FIG. 1.

When the bin retrieval robot 600 is in position in front of a tote or bin that is to be picked, the telescoping deck may extend to position the first telescoping platform 603 underneath the bin, i.e., extend within the shelf to a position beneath the bin. The twister arms 604a may then move to an extended or closed position, such as shown in FIG. 3. The telescoping deck may then retract, thus pulling the first telescoping platform 603 out from within the shelving unit with the picked bin thereon. According to certain aspects, the platform 642 may raise slightly so that the weight of the bin is fully supported on the first telescoping platform 603 before the telescoping deck retracts.

With continued reference to FIG. 1, the bin storage bed 640 further includes rails (616a, 616b) that may aid in positioning a tote or bin as it is moved onto the bin storage bed. That is, as the first telescoping platform 603 moves into the retracted position on the bin storage bed 640, the rails (616a, 616b) will capture and properly align the bin on the bin storage bed 640. The angled portions at ends of the rails may contact the sides of the bin so that it is redirected and properly aligned as the first telescoping platform 603 retracts.

Figure 2:
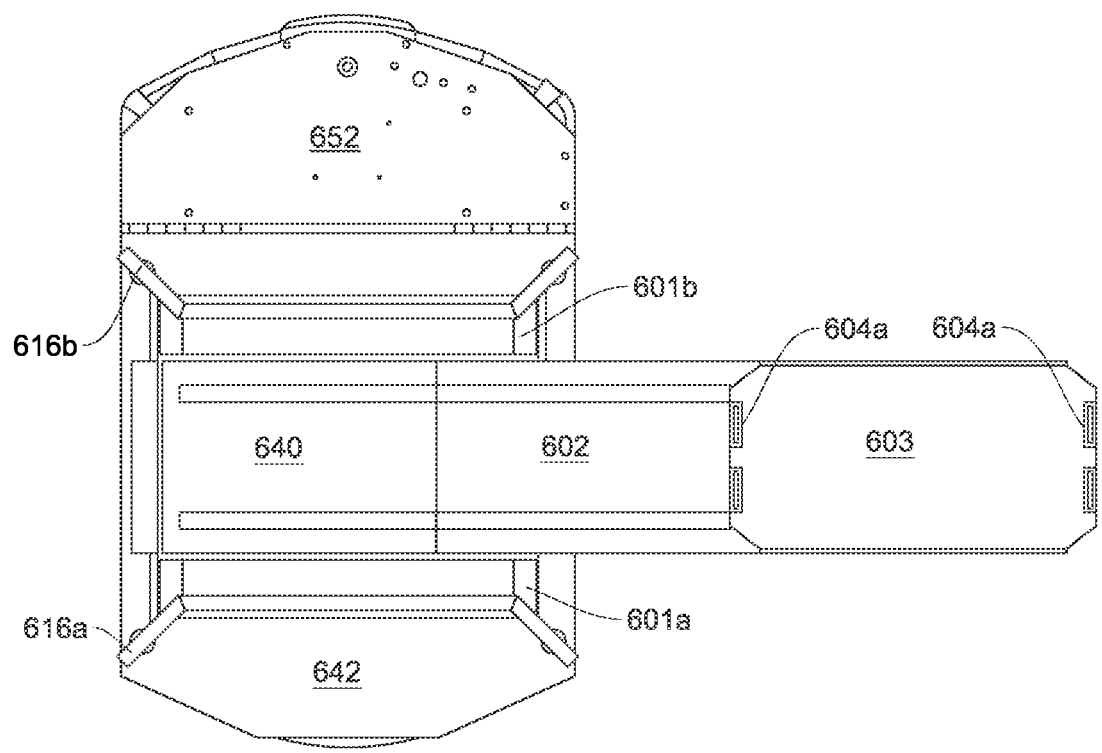
FIG. 2 illustrates a top view of the bin retrieval robot shown in FIG. 1.

With specific reference to FIG. 2, which is a top view of the bin retrieval robot 600, an exemplary position of the twister arms (604a, 604b) on either end of the first telescoping platform 603 are shown. Also shown are the bin storage bed 640 and a second telescoping platform 602 of the telescoping deck. On either side of the bin storage bed 640 are conveyance means (601a, 601b). Exemplary conveyance means include any of wheels, omni-wheels, mecanum wheels, rollers, roller balls, activated roller belts, belts, or combinations thereof. These conveyance means may assist in displacing a bin positioned on the bin storage bed 640, i.e., when the telescoping deck (602, 603) is in the retracted position, to any of the other robots disclosed herein, or to a conveyance means within a logistics facility.

Figure 4:
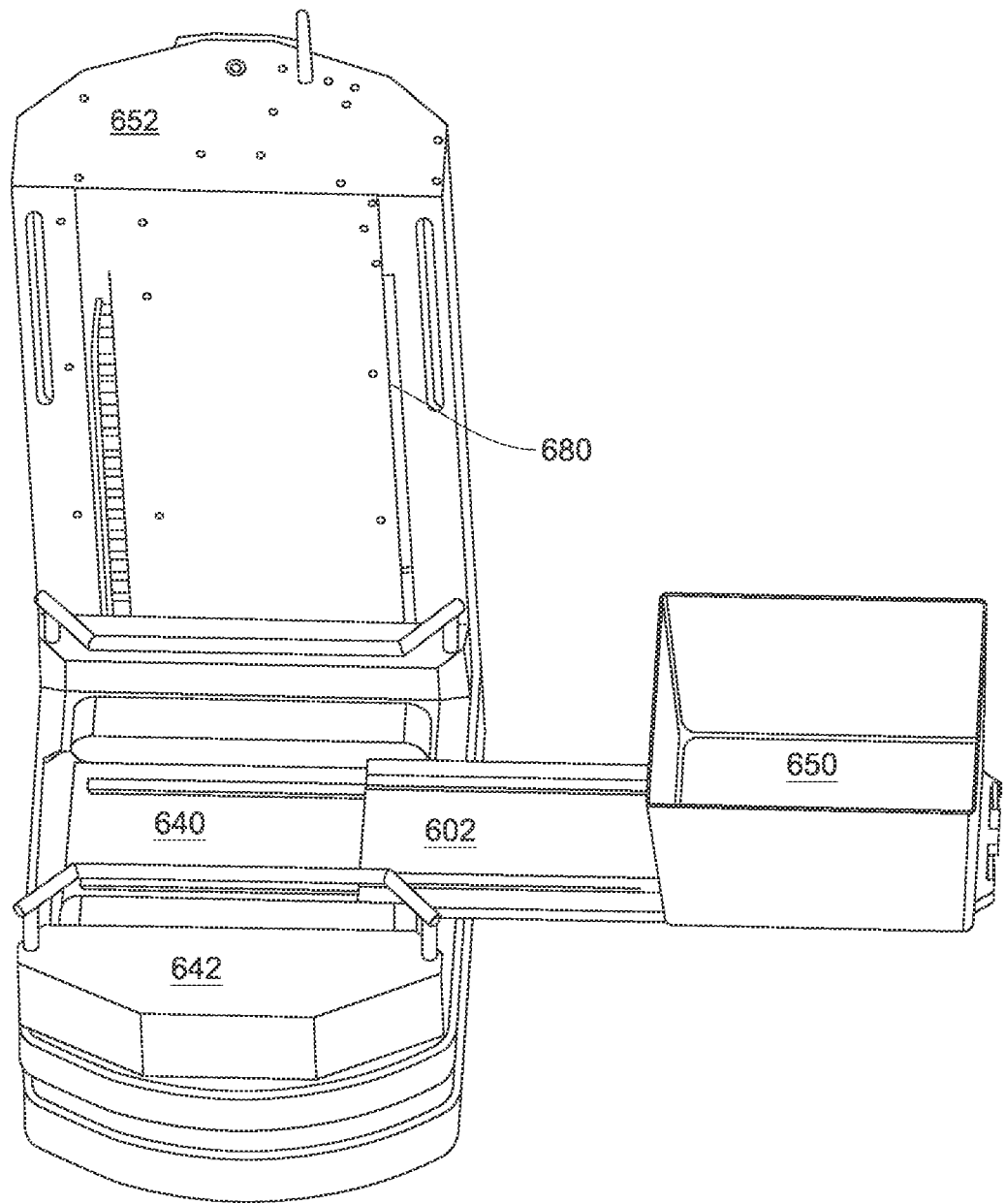
FIG. 4 illustrates a top perspective view of the bin retrieval robot shown in FIG. 1, with a bin carried on the telescoping platform in the extended position.
Figure 5:
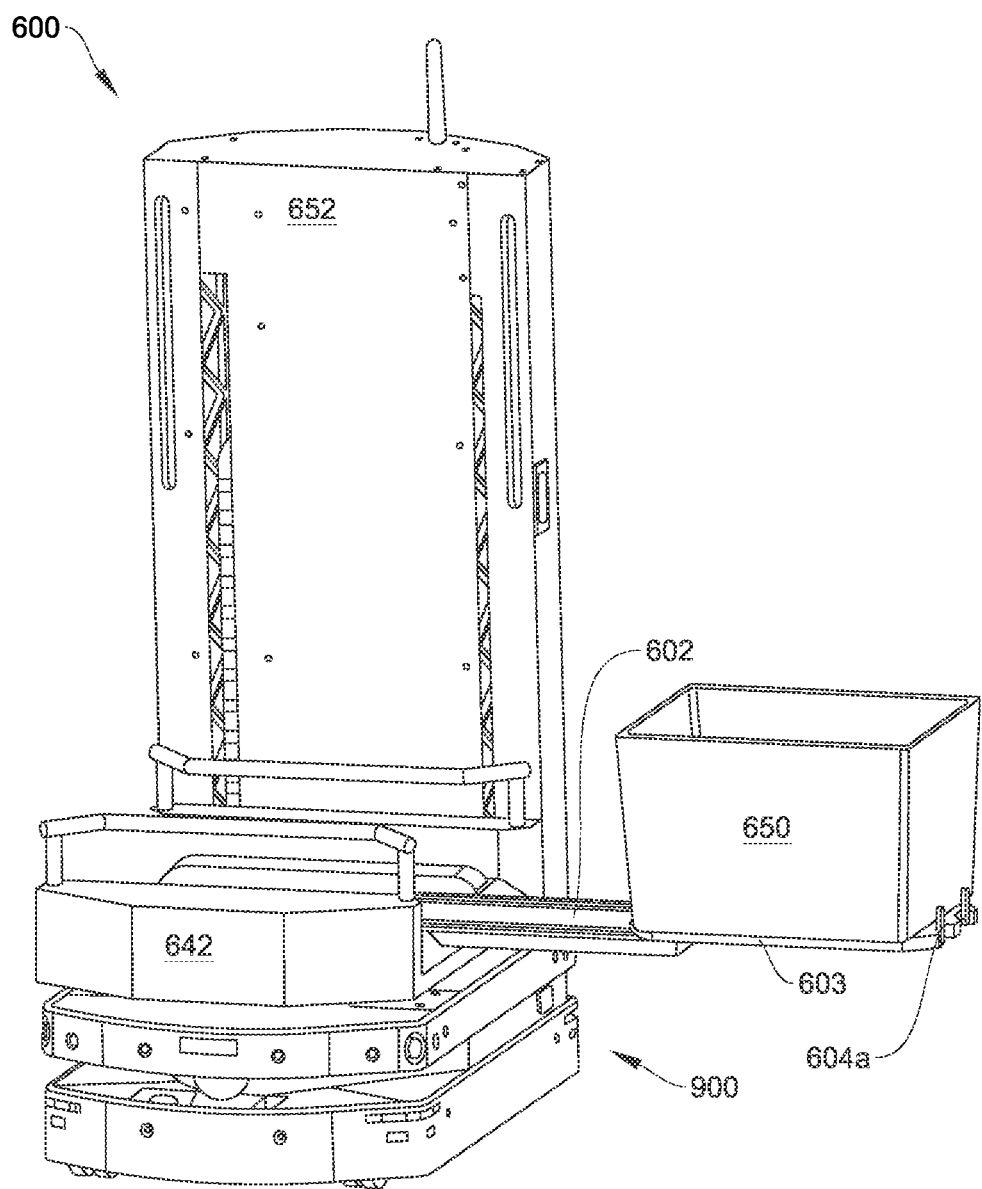
FIG. 5 illustrates a front perspective view of the bin retrieval robot shown in FIG. 4.
Figure 6:
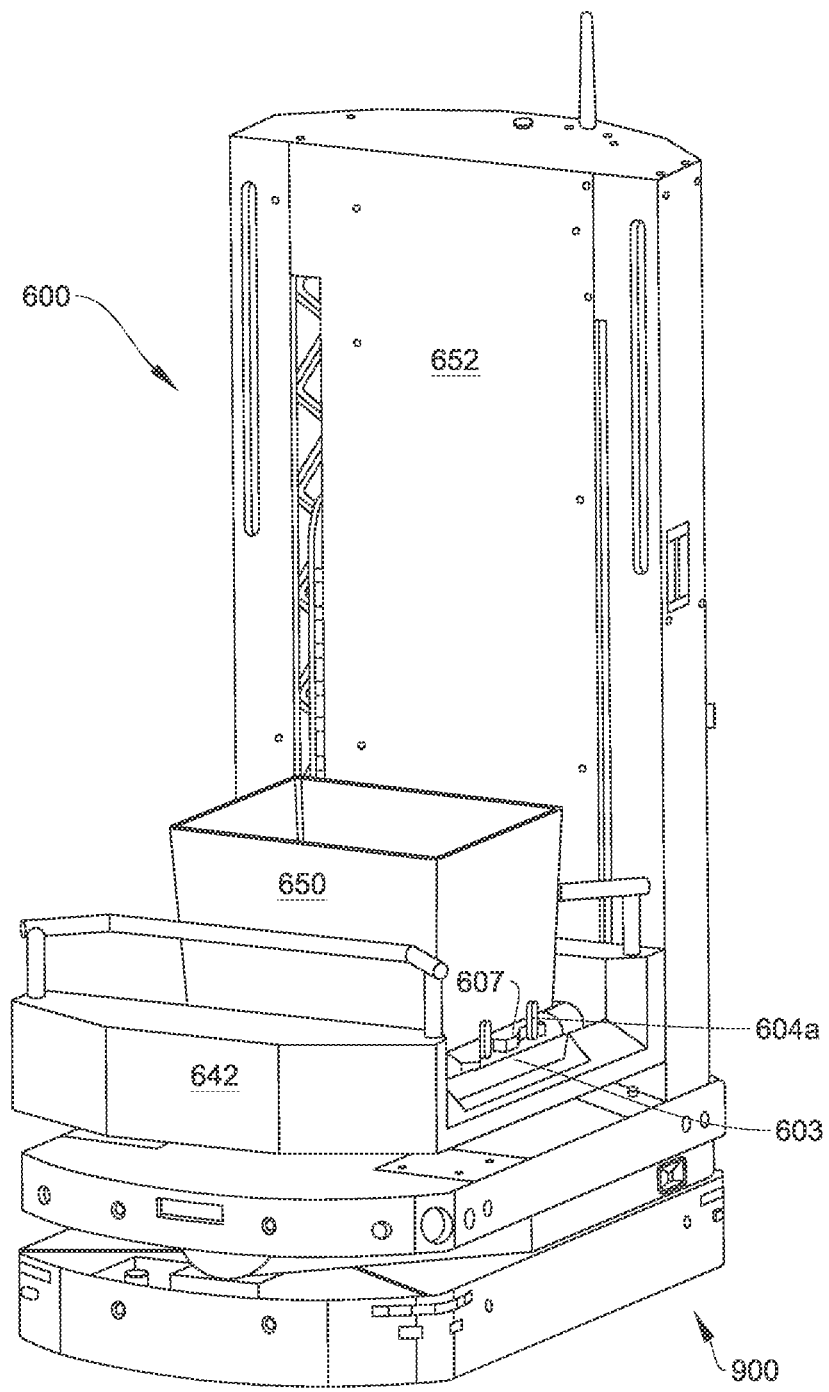
FIG. 6 illustrates a front perspective view of the bin retrieval robot shown in FIG. 4, with the bin carried on the telescoping platform in the retracted position.

The telescoping deck (602, 603) is shown in more detail in the enlarged perspective view of FIG. 3, wherein a position of the conveyance means (601a, 601b) may be better understood. The twister arms (604a, 604b) on either end of the first telescoping platform 603 are shown in the extended or closed position (i.e., perpendicular to the top surface of the first telescoping platform 603). With reference to FIGS. 4 and 5, once a bin or tote is positioned on the first telescoping platform 603, the twister arms (604a, 604b) may move from a retracted or open position as shown in FIG. 1 to the extended position shown in FIGS. 3 and 5 to hold the bin 650 thereon. As shown in FIG. 6, the telescoping deck (602, 603) may retract to position the bin 650 directly over the bin storage bed 640, thus retrieving the bin from a position on a shelf. The extended twister arms (604a, 604b) maintain the bin on the first telescoping platform 603 as it retracts back onto the bin storage bed 640.

The bin retrieval robot 600 may include additional or alternative conveyance means on the telescoping deck, such as across a full width or portion thereof along or adjacent to ends of the first telescoping platform (i.e., platform conveyance means). These conveyance means may be included instead of or in addition to the twister arms (604a, 604b). In the latter case, the twister arms may be configured to extend from supports positioned beneath the platform conveyance means or on sides of the first telescoping platform 603, or in configurations where the platform conveyance means does not occupy a full width of the platform 603, the twister arms (604a, 604b) may be positioned at ends of the platform adjacent the sides of the platform.

Exemplary platform conveyance means include any of wheels, omni-wheels, mecanum wheels, rollers, roller balls, activated roller belts, belts, or combinations thereof. The platform conveyance means may be configured as a small portion of the first telescoping platform 603, such as a thin conveyor belt or a single roller bar, as a full surface of the first telescoping platform 603, such that each of the platform conveyances means occupy half of the platform, or any portion in between. According to certain aspects, the platform conveyance means may occupy a small portion at either end of the first telescoping platform 603, wherein a remaining surface of the platform 603 includes a stationary surface or a set of freely rotating roller bars.

The platform conveyance means may be designed to rotate in either direction individually or in unison. For example, when the bin storage bed 640 is positioned at a vertical height matching that of a bin to be retrieved, at least the platform conveyance means adjacent the bin, i.e., adjacent platform conveyance means, may rotate in a direction opposite from the direction of extension of the first telescoping platform 603. As the first telescoping platform 603 approaches the bin, the rotation of that adjacent platform conveyance means may assist in pulling the bin onto the platform 603. As the bin is moved fully onto the platform, the adjacent conveyance means may stop rotation. If twister arms are included on the platform 603, they may be extended to further secure the bin thereon as the platform retracts onto the bin storage bed 640.

Continuing with the above example, the conveyance means at an opposite end of the platform 603, i.e., the distal conveyance means, may have remained stationary during the bin retrieval, may have rotated in the same direction as the adjacent conveyance means, or may have rotated in a direction opposite from that of the adjacent conveyance means to provide a stop. Alternatively, or additionally, if twister arms are included on the platform 603, i.e., distal twister arms, they may have been extended to provide a stop.

According to certain aspects, the telescoping deck (602, 603) may extend from either side of the bin storage bed 640 so that the bin retrieval robot 600 may pick or place bins from either side thereof. Movement of the twister arms (604a, 604b) and/or platform conveyances means would be analogous to the movements described hereinabove to assist with retrieval of a bin.

Also shown in FIG. 3 are the positions of the rails (616a, 616b) that assist in properly positioning the bin on the bin storage bed 640. According to certain aspects, the rails may be positioned on vertical sides 606 of the bin storage bed 640 as shown. As the telescoping platform retracts, these rails may align the bin on the first telescoping platform 603 so that the bin may be centered over the conveyance means (601a, 601b) on either side of the first telescoping platform 603. The conveyance means (601a, 601b) allow for displacement of the bin to another robot, shelf, or conveyor system without extending the telescoping deck (602, 603). If additional platform conveyances means are included on the first telescoping platform 603, these may further assist in displacing the bin to another robot, shelf, or conveyor system. That is, one or both of the platform conveyance means may be configured to rotate in the same direction as the conveyance means (601a, 601b) to push the bin from the bin storage bed 640.

According to certain aspects, a position of the telescoping deck (602, 603) and a bin thereon may be sensed by one or more sensors. Exemplary positions of such sensors may be on the vertical sides 606 of the bin storage bed 640, a front face of the vertical tower 652, and/or on the bin storage bed 640 (e.g., a position below the telescoping deck).

According to certain aspects, additional sensors may be positioned on ends of the bin storage bed 640, such as those facing outward toward the locations of bins on shelving within a logistics facility (aligned parallel with movement of the telescoping deck). An exemplary position of such a sensor 607 is shown in FIG. 6. The sensor may be included on an end of first telescoping platform 603, or on a stationary end of the bin storage bed 640.

Figure 7:
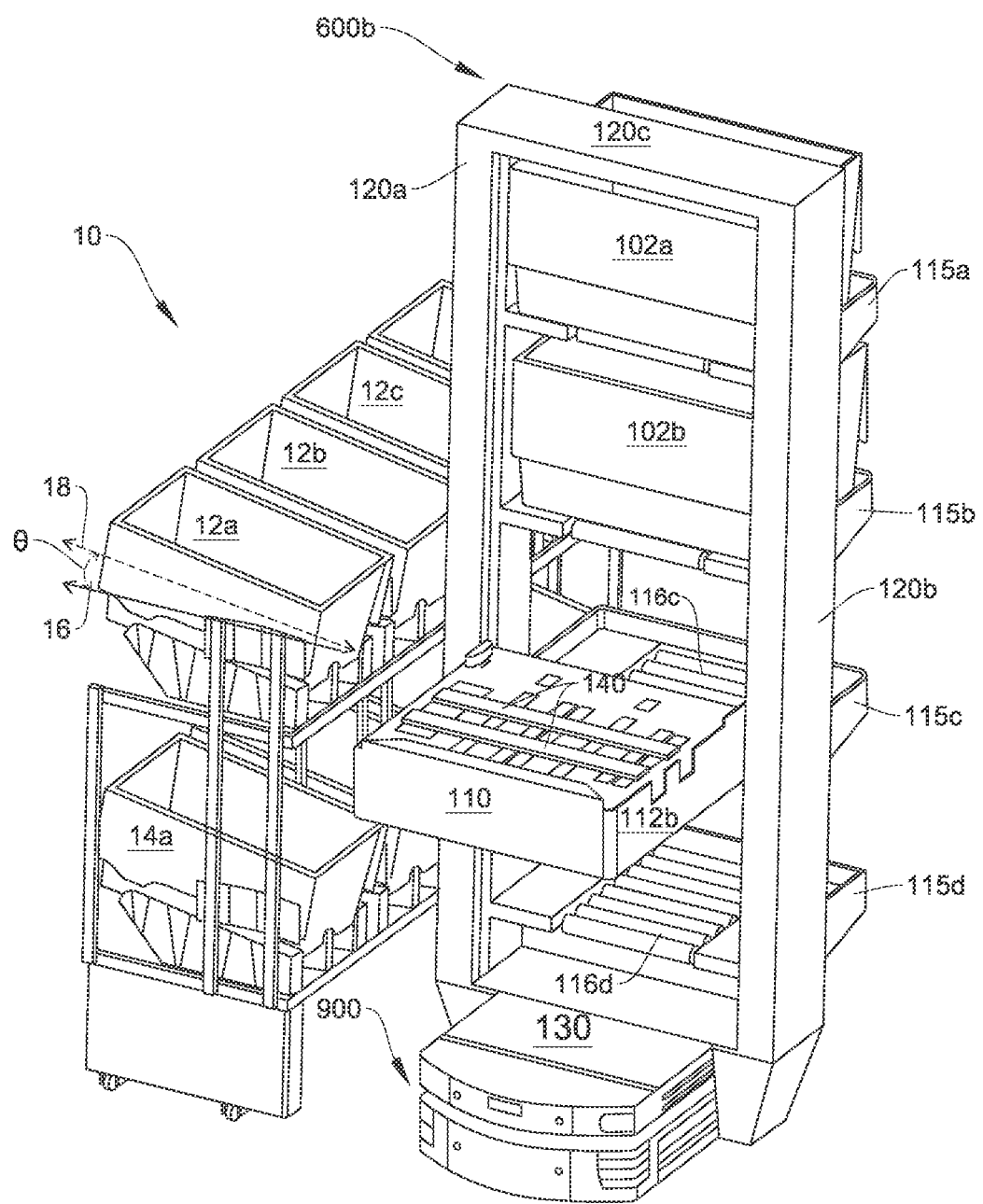
FIG. 7 illustrates a front perspective view of a bin retrieval robot with a platform positioned in front of a row of bins in accordance with certain aspects of the present disclosure.
Figure 10:
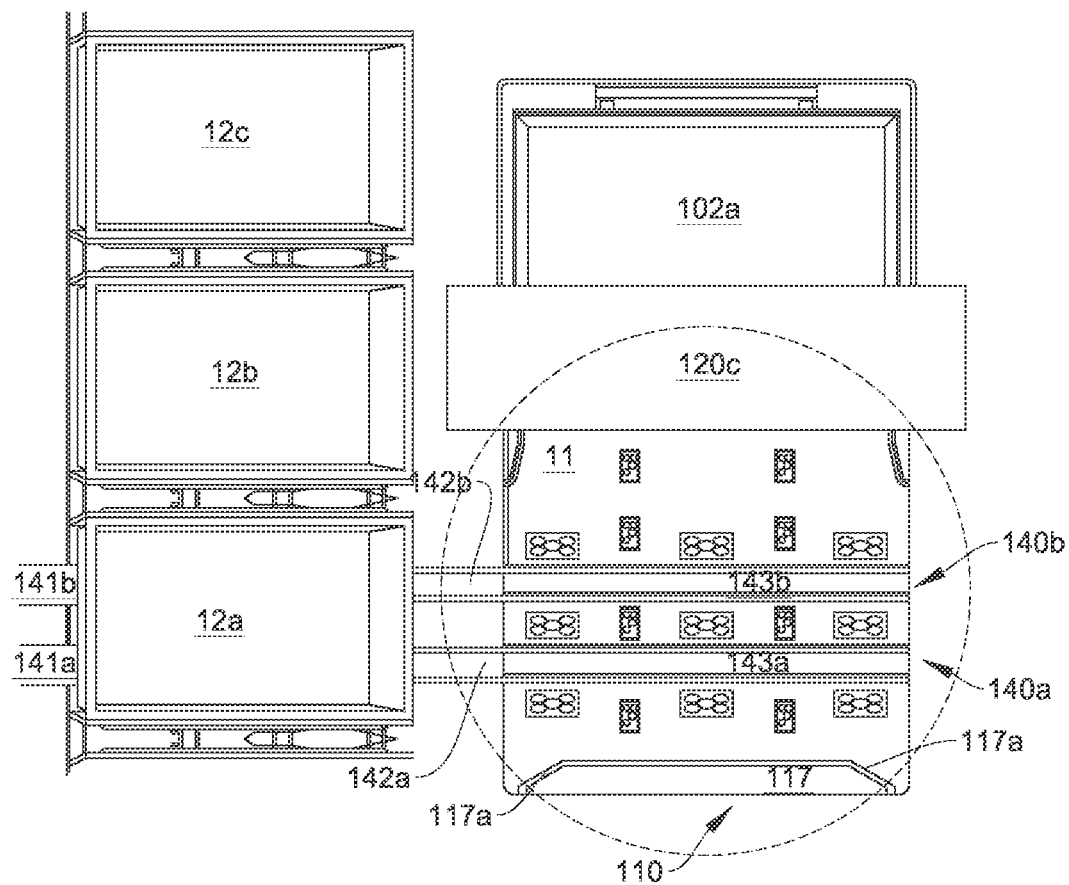
FIG. 10 illustrates a top view of the bin retrieval robot shown in FIG. 7, with a telescoping arm in an extended position.

According to certain aspects, the telescoping deck may be divided to provide two parallel extending platforms having a space therebetween (i.e., space positioned parallel with direction of movement of the telescoping deck thus forming a "fork-lift"). The sensor 607 may be positioned on the bin storage bed 640 at a position between the two sections of the telescoping deck. An exemplary version of a "forklift" is shown in FIGS. 7 and 10, wherein the telescoping portion includes two telescoping arms (140a, 140b) rather than the deck shown in FIGS. 1-6.

The movement of the telescoping deck and/or conveyance means (601a, 601b) may be controlled by a sensed position thereof, i.e., started, stopped, slowed, etc., as detected by these sensors on the vertical sides 606 and/or ends (607) of the bin storage bed 640.

When a bin is retrieved by the bin retrieval robot 600 and is positioned on the bin storage bed 640, it may be displaced therefrom to any of (1) a platform on another robot, (2) a storage location within the logistics facility, (3) a conveyance means within the logistics facility, (4) to a human worker, or (5) to an autonomous mobile manipulation robot, such as described in any of U.S. Pat. No. 9,785,911 or 9,519,882. These AMMRs may be used to pick items or pieces that may be placed into bins and transferred to any of the AMRs disclosed herein (i.e., 600, 600b, 900', 900").

Referring now to FIGS. 7-11, another bin retrieval robot according to the present disclosure is shown. With specific reference to FIG. 7, the bin retrieval robot 600b generally comprises a mobile base 900 having a support frame (120a, b, c) attached thereto, such as via a support brace 130. The support frame includes right and left side portions (120a, b) that extend vertically upward from the mobile base 900 and a central beam (120c) positioned horizontally between and connecting the right and left side portions (120a, b). The support frame (120a, b, c) includes a plurality of storage trays (115a . . . d) distributed in a vertical direction (arrow 2 of FIG. 9), wherein each of the plurality of storage trays (115a . . . d) extend horizontally from a first side of the support frame. The support frame (120a, b, c) further includes a bin handling platform 110 that extends horizontally from a second side of the support frame opposite the first side.

The bin handling platform 110 is moveable vertically on the support frame (120a, 120b) and positionable at least at (a) the vertical level of each of the plurality of storage trays (115a . . . d) so that a bin may be transferred therebetween, and (b) the vertical level of a bin (e.g., 12a, 14a) on a shelving unit 10 on which a bin is positioned. The platform 110 may be moveable vertically on the support frame (120a, b, c) along vertical tracks thereon.

The bin handling platform 110 includes an upper surface 111 comprising a bin retrieval device 140. The bin retrieval device 140 is configured to extend horizontally (arrow 4 of FIG. 9) from either side (112a, 112b) of the bin handling platform 110 to a position under a bin (12a . . . d, 14a . . . d), and retract horizontally to lift and pull the bin onto the bin handling platform 110. Accordingly, the bin retrieval robot 600b is configured to pick and/or place bins from either side thereof. The bin handling platform 110 is further configured to deliver the bin to one of the plurality of storage trays (115a . . . d) without rotation of the bin handling platform 110 or bin retrieval device 140.

As shown in FIG. 7, the bins (12a . . . c, 14a) may be positioned on a shelving unit 10 at an angle θ or parallel to the floor. That is, with respect to a horizontal plane 16 (i.e., a plane generally parallel with the floor surface), a rear end of the bin 12a may be raised with respect to a front end of the bin such that a longitudinal axis 18 of the bin is angled relative to the horizontal plane 16. The angle θ may be any angle >0° or =0° and generally less than 45°, such that θ comprises 0° to 45°, or 0.5° to 30°, or 1° to 22.5°. Accordingly, after the bin retrieval device 140 extends horizontally (arrow 4 of FIG. 9) from the bin handling platform 110 to a position under a bin (e.g., 12a as shown in FIG. 7), the bin handling platform 110 is configured to lift vertically on the support frame (120a, b, c) to a raised position. This lifts the bin from the shelf so that a weight of the bin is supported on the bin retrieval device 140 before it retracts horizontally to a neutral position over the bin handling platform 110.

Also shown in FIG. 7 are bins (102a and 102b) positioned on storage trays (115a and 115b, respectively), and empty storage trays (115c and 115d). Once a bin is retrieved and positioned on the bin handling platform 110, such as in the neutral position (i.e., when the bin retrieval device 140 is retracted and the bin is centered on the platform 110), the bin handling platform 110 is further configured to deliver the bin to one of the plurality of storage trays (115a . . . d) without rotation of the bin handling platform 110 or bin retrieval device 140.

Each of the storage trays (115a . . . d) may include a conveyance system, such as roller bars or balls, wheels, or a belt. For example, roller bars 116c and 116d are shown in FIG. 7 for each of storage trays 115c and 115d, respectively. The conveyance system may be actuatable, such that it may assist in pulling a bin onto the tray from the bin handling platform 110 and/or may help push the bin off the tray and onto the bin handling platform 110 for transfer to the conveyor.

Figure 8:
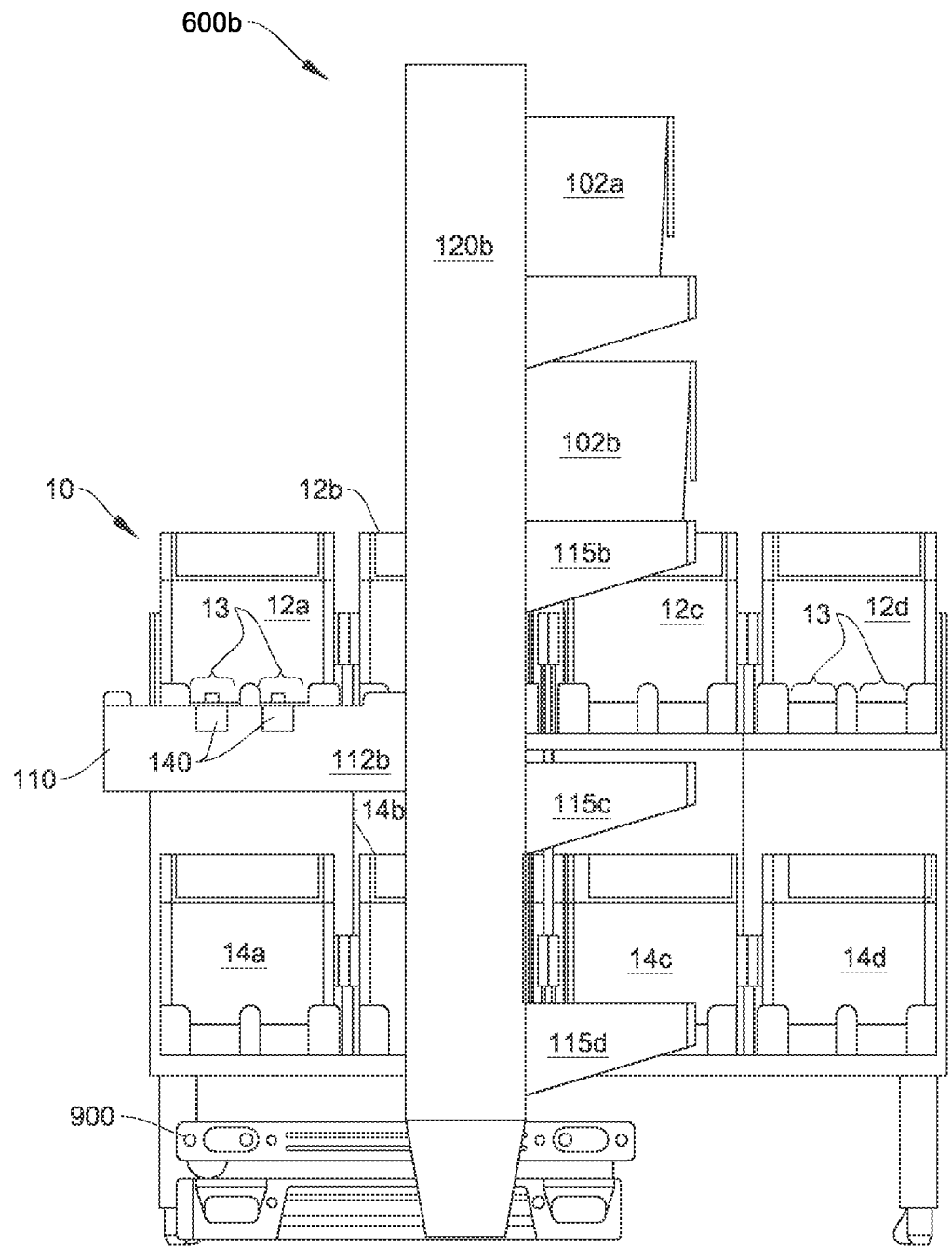
FIG. 8 illustrates a side view of the bin retrieval robot shown in FIG. 7.

With reference to FIG. 8, a side view of the bin retrieval robot 600 is illustrated, wherein the storage trays (115a . . . d) are shown extending horizontally from a first side of the support frame (side 120b is shown), and the bin handling platform 110 is shown to extend from an opposite side of the support frame. Also shown in FIG. 8 are bins (12a . . . d and 14a . . . d) on a shelving unit 10 as they would be positioned at a side of the bin retrieval robot 600b. Two storage trays (115a, 115b) are shown with a bin positioned (102a, 102b) thereon, and two storage trays (115c, 115d) are shown without bins.

Figure 9:
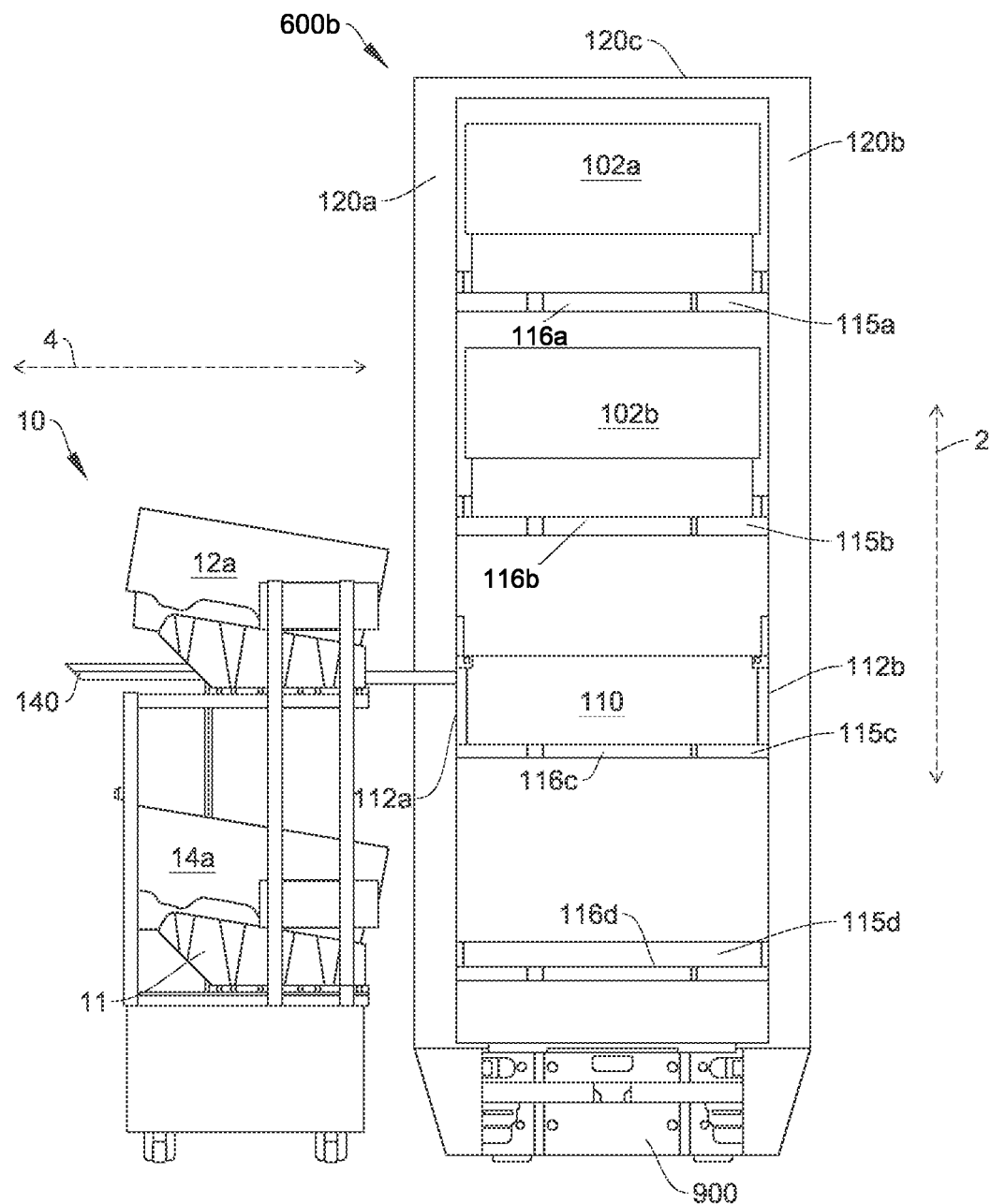
FIG. 9 illustrates a front view of the bin retrieval robot shown in FIG. 7.

Illustrated in FIG. 8 is a side 112b of the bin handling platform 110 and ends of the bin retrieval device 140. With reference to FIG. 9, an end view of the robot 600b illustrates the bin retrieval device 140 in an extended position under a bin 12a. As discussed above, the bins may be angled with respect to the horizontal plane 16 by the angle θ (shown in FIG. 1). The shelving unit may include individual shelves that are positioned so that the bins achieve this angle (i.e., the shelves are positioned at the angle θ), or an insert may be included that positions each bin at the angle θ. Shown in FIGS. 7 to 9 are cradles 11 that positioned the bins at the angle θ, and may further provide slots 13 through which the bin retrieval device 140 may pass as it moves to a position under a bin. Further exemplary cradles may provide a single slot, such as would be configured to allow the telescoping deck or platform 603 shown in FIGS. 1-6 to gain access to a position under a bin. Alternatively, the bins may include one or more slots on a bottom surface thereof that achieve the same functionality, i.e., provide an open path for the bin retrieval device 140 or telescoping platform 603 under a bottom surface of the bin.

With reference to FIG. 10, the bin retrieval device 140 may comprise a pair of telescoping arms (140a, 140b) that are configured to extend from either side of the bin handling platform 110. Each telescoping arm may include at least one portion (142a, 142b) that extends from a track (143a, 143b) positioned on an upper surface 111 of the bin handling platform 110. Ends of each extensible portion (142a, 142b) may comprise a retractable finger (only fingers 141a and 141b are shown; generally at least four are included, i.e., 141a . . . 141d) configured to have an open position that is parallel to and flush with a longitudinal axis of the extensible portion (142a, 142b). The retractable fingers (141a . . . 141d) are also configured to have a closed position that is substantially perpendicular to the longitudinal axis of the extensible portion (142a, 142b) and extending upward therefrom. There are generally at least two retractable fingers on each of the extensible portion(s) of the bin retrieval device 140 (e.g., at either end thereof) to support pulling a bin onto the bin handling platform 110, and/or to support a bin from sliding while lifting it from the cradle 11. Additional retractable fingers may be included to accommodate different bin designs and/or sizes, such as fingers positioned at other locations on the extensible portions (142a, 142b), i.e., in addition to ends of the extensible portions.

Actuation of the open and closed position of the retractable fingers (141a . . . 141d) may be controlled by the bin retrieval robot 600b, such as by signals sent from any one or more sensors positioned on the bin handling platform 110 and/or the support frame (120a, b, c). For example, signals related to a position of the bin retrieval device 140, i.e., position of the telescoping arms (140a, 140b) and/or retractable finger (141a . . . 141d) within a shelf and/or under a bin, may be sent from one or more sensors, such as sensors positioned on a side (112a or 112b) of the bin handling platform 110 facing the shelf. When the sensors indicate that the bin retrieval device 140 is positioned completely beneath the bin such that the retractable fingers (141a . . . 141d) are clear of a bottom surface of the bin, as shown in FIG. 10, the robot may actuate the fingers to close. In the closed position, the retractable fingers (141a . . . 141d) may assist in maintaining the bin on the bin retrieval device 140 as it retracts onto the bin handling platform 110.

A position of the bin handling platform 110 and a bin thereon may be sensed by one or more sensors. Moreover, a position of the bin retrieval device 140, i.e., any of the various extensible portions of the telescoping arms (140a, 140b) may be sensed by one or more sensors. Exemplary positions of such sensors include at least the vertical sides (120a, b) of the support frame or the vertical sides of the bin handling platform 110 (e.g., 112a, 112b, facing the shelves), and/or a front face of the support frame (e.g., on 120c).

According to certain aspects, sensors may be positioned on ends of the telescoping arms (140a, 140b), such as those facing outward toward the locations of bins on shelving within a logistics facility (aligned parallel with movement of the telescoping arms). According to certain aspects, the bin retrieval device 140 may be divided to provide two parallel extending arms as shown in FIG. 10 having a space therebetween (i.e., space positioned parallel with direction of movement of the telescoping arms thus forming a "forklift"), or may include a first telescoping deck that support the two telescoping arms. A sensor may be positioned on the platform 110 at a position between the two sections of the telescoping arms (e.g., on the sides 112a, b or upper surface 111 thereof), or on a first telescoping deck at a similar position.

The bin handling platform 110 may further comprise a guide 117 at an edge thereof that may assist in positioning the bin on the platform 110. As the extensible portion (142a, 142b) of the telescoping arms (140a, 140b) retract onto the platform 110, the bin will be guided to a central position of the platform 110. Moreover, angled portions (117a, 117b) at ends of the rails may contact a side of the bin so that it is redirected and properly aligned as the bin retrieval device 140 retracts and pulls the bin onto the platform 110.

Figure 11:
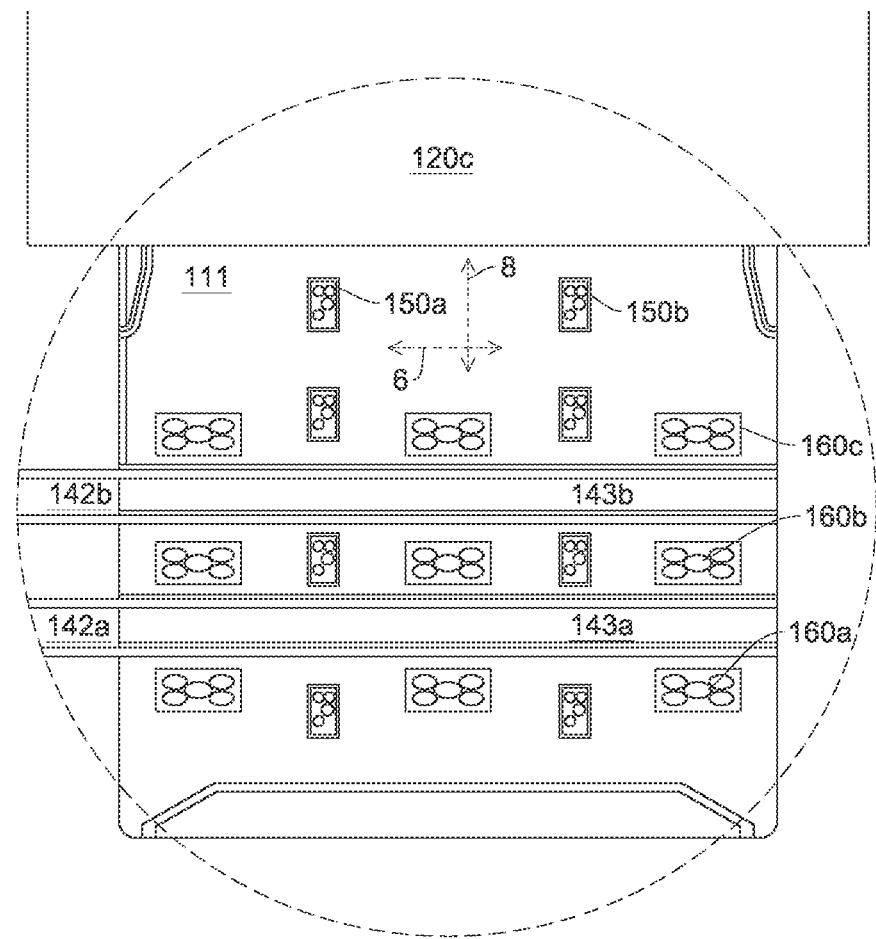
FIG. 11 illustrates a close-up top view of a bin retrieval platform of the robot shown in FIG. 10.

Additionally, a transfer mechanism positioned on the upper surface of the bin handling platform 110 may further assist in positioning the bin thereon. For example, as shown in FIG. 11, one or more of wheels, omni-wheels, mecanum wheels, rollers, roller balls, activated roller belts, belts, or combinations thereof (any of 150a, 150b, 160a, 160b, 160c) may push the bin toward the guide 117 after it is positioned on the platform 110. Such a mechanism may situate the bin in a neutral position before transfer of the bin to one of the storage trays (115a . . . d).

The transfer mechanism may be designed to rotate in either direction individually or in unison. For example, when the bin handling platform 110 is positioned at a vertical height matching that of a bin to be retrieved, at least the transfer mechanism adjacent the bin may rotate in a direction opposite from the direction of extension of the bin retrieval device 140. As the bin approaches the bin handling platform 110, the movement (e.g., rotation of wheels or rollers) of that adjacent transfer mechanism may assist in pulling the bin thereon. As the bin is moved fully onto the platform 110, the adjacent transfer mechanism may stop movement and a distal transfer mechanism may begin movement toward the bin to stop movement of the bin (e.g., stop the bin from moving off the opposite side of the platform). Alternatively, or additionally, retractable fingers (141a . . . 141d) on the opposite side of the platform from that on which the bin was retrieved may be closed or extended to secure the bin on the platform 110.

A retractable guide (not shown) may be positioned at an edge of the platform 110 opposite the guide 117. This guide may be vertically extendable to provide a second guide rail while a bin is being pulled onto the platform 110, and may be retracted to a position flush with the upper surface 111 of the bin handling platform 110 so that a bin may be transferred from the platform 110 to one of the storage trays (115a . . . d), or vice versa.

A unique aspect of the presently disclosed bin retrieval robot 600b is that it does not include rotation of the platform to reposition the bin for delivery to a storage location on the robot 600b. Rather, once the bin is retrieved and positioned on the bin handling platform 110, it may be transferred to a storage tray (115a . . . d) by a transfer mechanism without rotation of the platform 110 or the bin retrieval device 140 or the bin. A close-up view of the upper surface 111 of the bin handling platform 110 is shown in FIG. 11, wherein one exemplary version of a transfer mechanism is depicted. As shown, the transfer mechanism may include at least one transfer device (e.g., 160a, 160b, 160c) positioned to move the bin in a direction (arrow 6) coincident with the bin retrieval device 140 and at least one transfer device (150a, 150b) positioned to move the bin in a direction (arrow 8) perpendicular with the bin retrieval device (i.e., toward or away from the storage trays 115a . . . b). Thus, the transfer mechanism acts to move the bin through a substantially 90-degree turn without rotation of the bin handling platform 110 or the bin (i.e., also referred to herein as the 90-degree transfer mechanism). As shown in FIGS. 10 and 11, the 90-degree transfer mechanism may comprise transfer devices such as omni wheels, or may comprise any one or more of wheels, omni-wheels, mecanum wheels, rollers, roller balls, activated roller belts, belts, or combinations thereof.

An alternative embodiment of the 90-degree transfer mechanism may comprise a plurality of wheels or balls or other elements ("elements") configured to provide movement in a range of directions. For example, the elements may move in a direction (arrow 6) coincident with the bin retrieval device 140 to assist in pulling the bin onto the bin handling platform 110, and in a direction (arrow 8) perpendicular with the bin retrieval device (i.e., toward or away from the storage trays 115a . . . d) to push or pull the bin to or from a storage tray, or any range of motions therebetween.

The bin retrieval robots as shown and described with respect to each of FIGS. 1-11 are configured to travel in a direction that is parallel to a row of shelving on which the bins are supported. As such, the bin retrieval devices (e.g. 140) are configured to extend from the robot in a direction perpendicular to the direction of travel. While this may be a more efficient method for picking and placing bins, and traveling about a logistics facility to perform these actions, each of the bin retrieval robots disclosed herein (e.g., 600, 600b) could also be configured to drive up to a shelf (see 10 of FIG. 9) having a bin 14a supported thereon and extend the bin retrieval device 140 parallel with the direction of travel of the robot. In this way, the transfer mechanism (e.g., 150a, 150b, 160a, etc.) on the upper surface 111 of the bin handling platform 110 would have no need to move the bin through a 90-degree turn, but could simply align a vertical height of the bin handling platform with a bin storage tray and push the bin thereto.

When a bin is retrieved by the bin retrieval robot 600b and is positioned on the bin handling platform 110, it may be displaced therefrom to any of: (1) one of the storage trays (115a . . . d) on the robot 600b; (2) a platform 110 on another bin retrieval robot 600; (3) a storage location within the logistics facility; (4) a conveyance means within the logistics facility; (5) to a human worker; or (6) a platform on a different robot (bin transport robot 900' or 900") or an autonomous mobile manipulation robot (AMMR), such as described in any of U.S. Pat. No. 9,785,911 or 9,519,882. These AMMRs may be used to pick items or pieces that may be placed into bins and transferred to any of the AMRs disclosed herein (i.e., 600, 600b, 900', 900").

Figure 16:
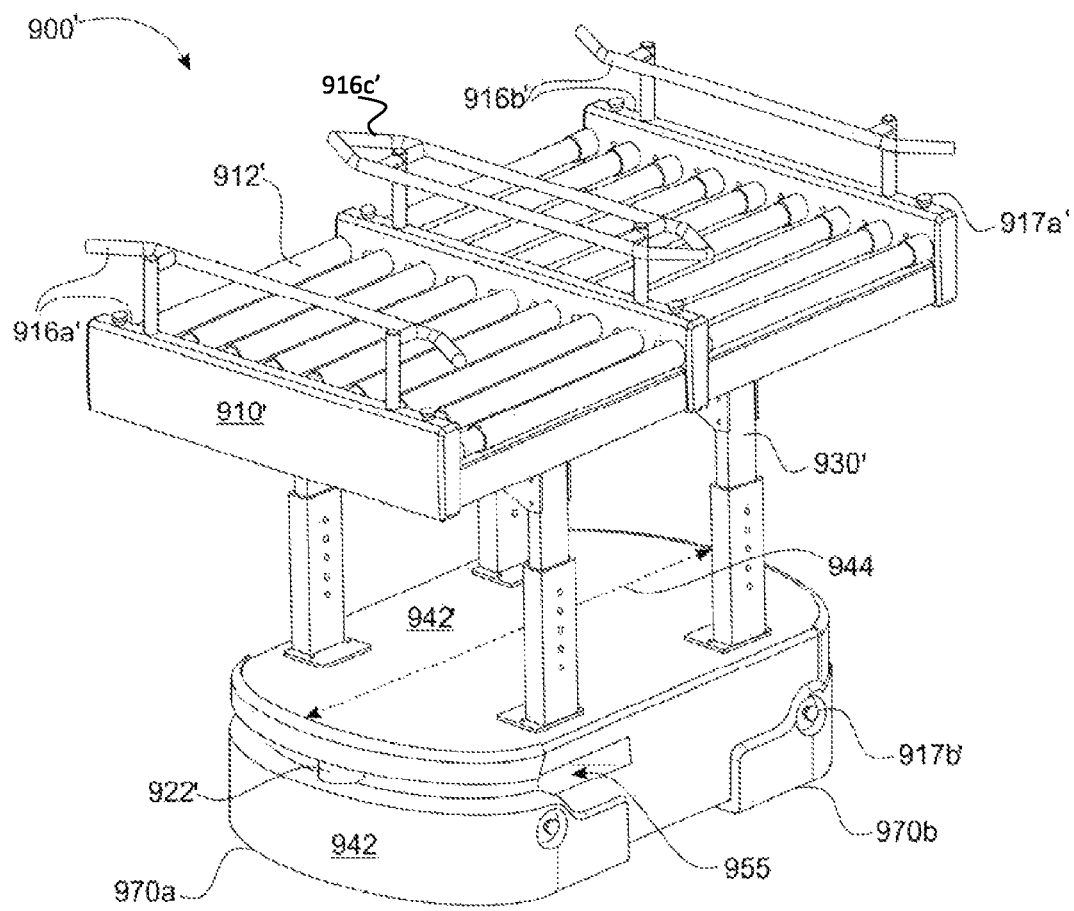
FIG. 16 illustrates a front perspective view of a mobile base, such as from FIG. 12A, with a transport platform positioned thereon, i.e., transport robot, in accordance with certain aspects of the present disclosure.
Figure 17:
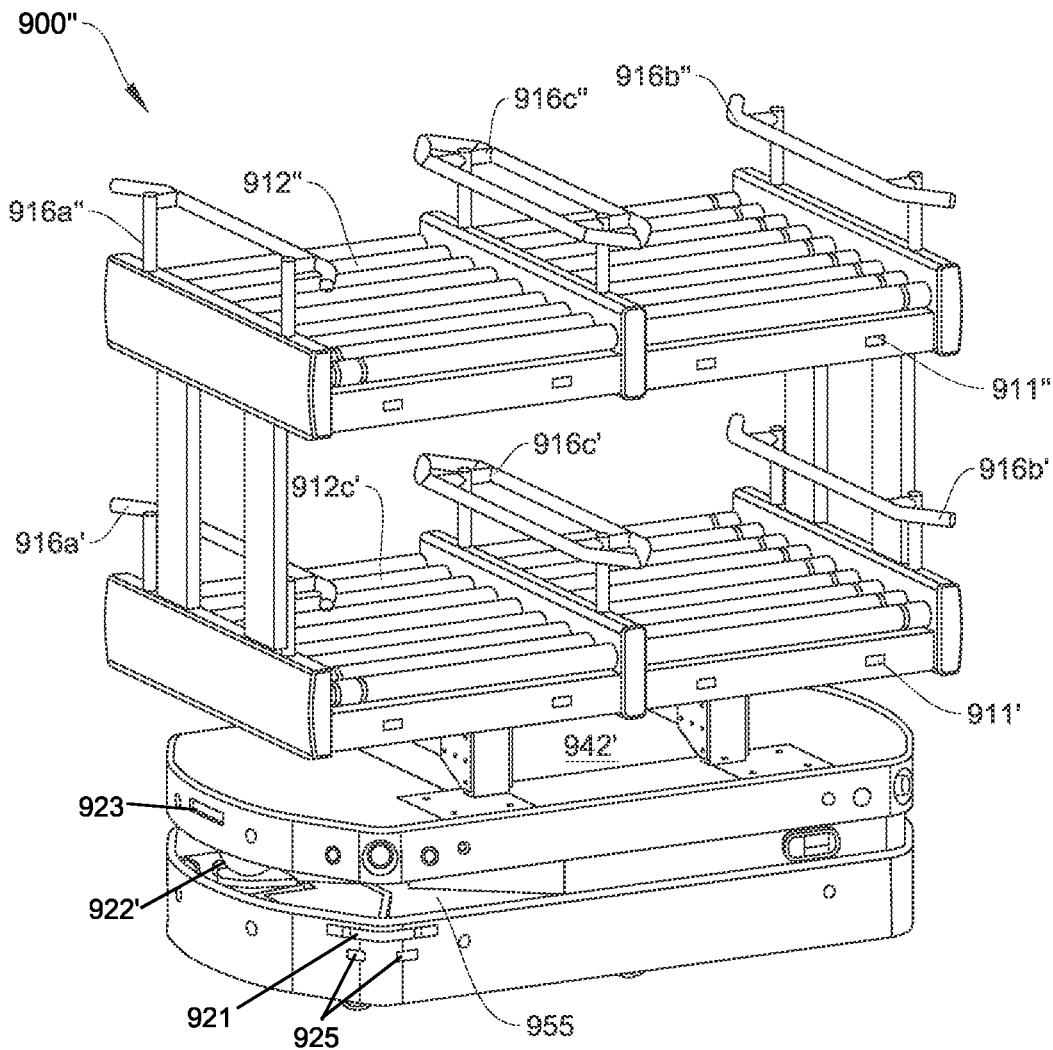
FIG. 17 illustrates a side perspective view of a mobile base, such as from FIG. 12A, with two transport platforms positioned thereon, in accordance with certain aspects of the present disclosure.

Also disclosed herein are bin transport robots, as shown in FIGS. 16 and 17. Bin retrieval robots (600, 600b) and AMMRs are generally more complex and expensive than the bin transport robots, and as such, their use to transport bins over long distances may not be the most economic and efficient means for supply chain and logistics automation. Rather, according to certain aspects of the presently disclosed invention, these robots (600, 600b; AMMRs) may transfer bins to a transport robot (900', 900") for lower cost, more efficient transport to a packing or staging area. The bin retrieval robots (600, 600b) and AMMRs may then spend more time in picking/put-away operations, increasing overall efficiency and thus reducing both up-front and long-term costs of the automation.

Exemplary transport robots (900', 900") are shown in FIGS. 16 and 17. The transport robots may include one or more levels each including a conveyance system, such as the motorized drive roller (MDR) shown in the figures (912', 912") or any of the transfer devices disclosed hereinabove, e.g., wheels, omni-wheels, mecanum wheels, rollers, roller balls, activated roller belts, belts, or combinations thereof. The conveyance system may accept bins from the bin retrieval robot(s) (600, 600b), an AMMR, another transport robot (900', 900"), a conveyance means within the logistics facility, or a human worker. Control of the conveyance system, such as motion of the roller bars in one direction or the other, may be included as a software module (conveyance module 974) that may be executed by the onboard computer processor 978 (see FIG. 22). This module 974 may control at least initiation, direction, and speed of the conveyance system. Such control may originate from signals received by the transport robot (900', 900"; i.e., at the processor 978) from the various sensors (e.g., cameras and infrared sensor pairs, e.g., 923, 925), or may originate as signal(s) sent from the central server 200, a warehouse management system (WMS, 201), a bin retrieval robot 600, or from another transport robot (900', 900"), which are received by the communication interface 970 on the transport robot. Additionally, control of these functions of the conveyance system may originate with a human worker via wireless signals (i.e., through the communication interface 970) or manual selection (i.e., buttons or other human accessible interface on the transport robot 900', 900").

With continued reference to FIGS. 16 and 17, exemplary designs for a transport robot are shown. The transport robots (900', 900") may include a mobile base 900 (e.g., the same mobile base indicated as part of the bin retrieval robots 600 or 600b). The mobile base 900 may include a front and rear skirt or bumper (970a and 970b, respectively) that may be positioned to restrict items from the region under the mobile base (i.e., region where the drive wheels and support wheels reside), and one or more lights 921. These lights may be used to improve visibility conditions for the various sensors on the transport robot 900', may improve visibility conditions for other devices that may need to identify the transport robot and/or may improve visibility for human workers in the vicinity of the transport robot. The lights may also be used to communicate the robot's state, i.e., moving direction, turning, manual/autonomous navigate state, system ready, system fault, etc.

The mobile base 900 may further include additional sensors, such as obstacle detection sensors 925 (e.g., IR sensors) and 3D cameras 923, that assist in navigation of the robot. Also shown are emergency stop buttons 917b' that may provide emergency shut off of the robot, such as when it cannot be shut down remotely.

The transport robot (900', 900") may further include attachment arms 930' (four are shown) that may secure a transport platform 910' above the mobile base 900 (see FIG. 16). Alternatively, a single attachment arm, such as positioned centrally or along one side, or two, three, or more arms can be included to support a transport platform. The transport platform 910' may include a conveyance system, such as the roller bars 912' shown, or any detailed hereinabove (e.g., conveyor belt, omni wheels, etc.). Moreover, the transport platform 910' may include front and back guides (916a' and 916b', respectively) that may ensure proper placement of a bin on the conveyance system. As shown in FIG. 16, the transport platform 910' may be divided into two separate sections each configured to receive, transport, and deliver a bin, and thus includes an additional guide 916c' to ensure proper bin alignment on each section of the platform.

As shown in FIG. 17, the transport robot may include more than one transport platform, such as two or more transport platforms. Each platform may include a conveyance system, such as the MDRs 912' and 912" shown, or any detailed hereinabove. Each of the various conveyance systems may be controlled independently. Thus, when in use, the various sections of the transport platform(s) may be operated to transport and/or deliver multiple full and empty bins.

Figure 12A:
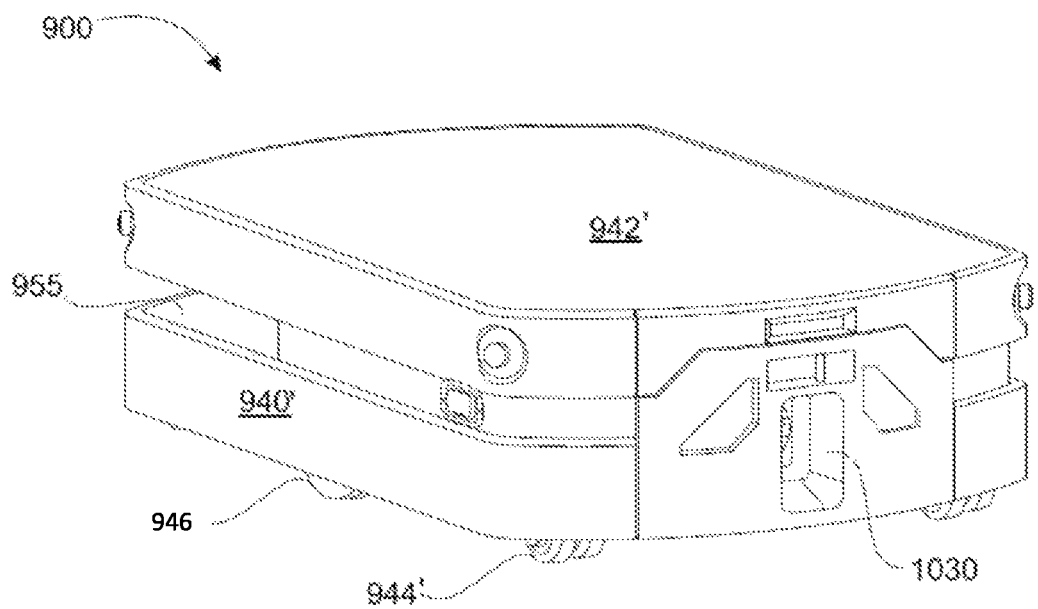
FIG. 12A illustrates a rear perspective view of a mobile base in accordance with certain aspects of the present disclosure.
Figure 12B:
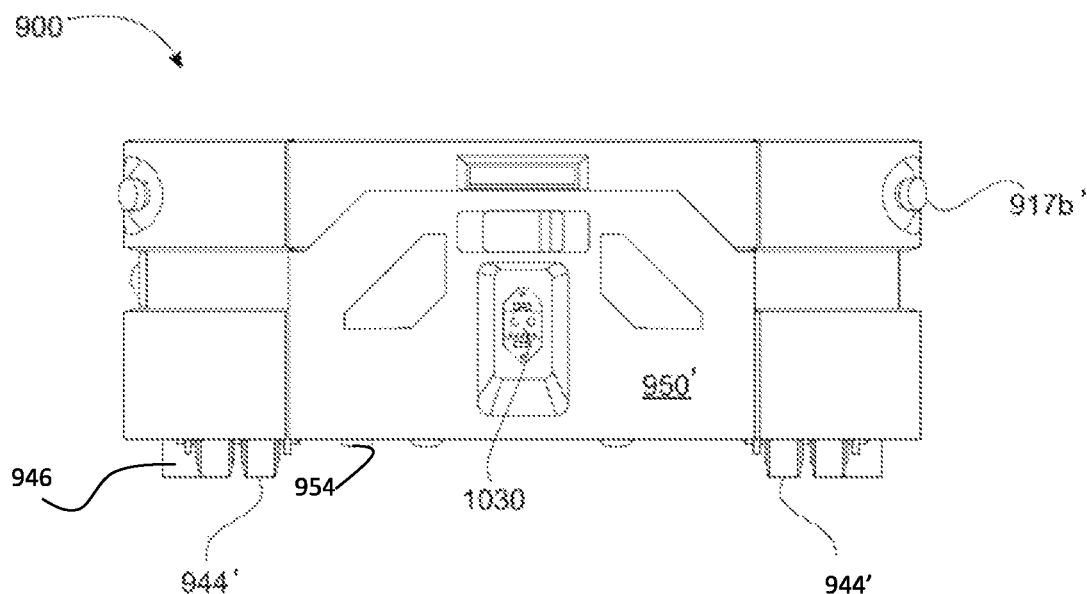
FIG. 12B illustrates a rear view of the mobile base shown in FIG. 12A.

With reference to FIG. 16, one or more of the sensors may be positioned within a slot 955 located on a front end 942 of the mobile base 900. As shown in FIGS. 12A and 12B, the slot 955 may be configured as a recess within the front portion of the mobile base 900, such as a recess extending from a front end 942 of the mobile base 900 to a point 0.2× to 0.5× the longitudinal length 944 of the mobile base 900, such as 0.3× to 0.5×, or 0.3× to 0.4× the longitudinal length 944 of the mobile base 900. The slot 955 thus provides a 180-degree filed of view, such as a 210-degree, 240-degree, or even 270-degree field of view for the LiDAR 922' (described in additional detail hereinbelow).

Proper alignment between a bin retrieval robot 600 and a transport robot (900', 900"), or between transport robots (900', 900") may be initiated and assisted by sensors on portions of the mobile base 900 or on portions of the transport platform(s) (910') and the bin handling platform 110. With specific reference to FIG. 17, position sensors (911', 911") are shown to be located on edges of the transport platform. These sensors may be used to provide proper alignment of the transport platform with a bin retrieval robot 600 or other transport robot (900', 900") or a conveyance system within a logistics facility. Exemplary position sensors include at least photo eye, retroreflective, and IR sensors.

Figure 18A:
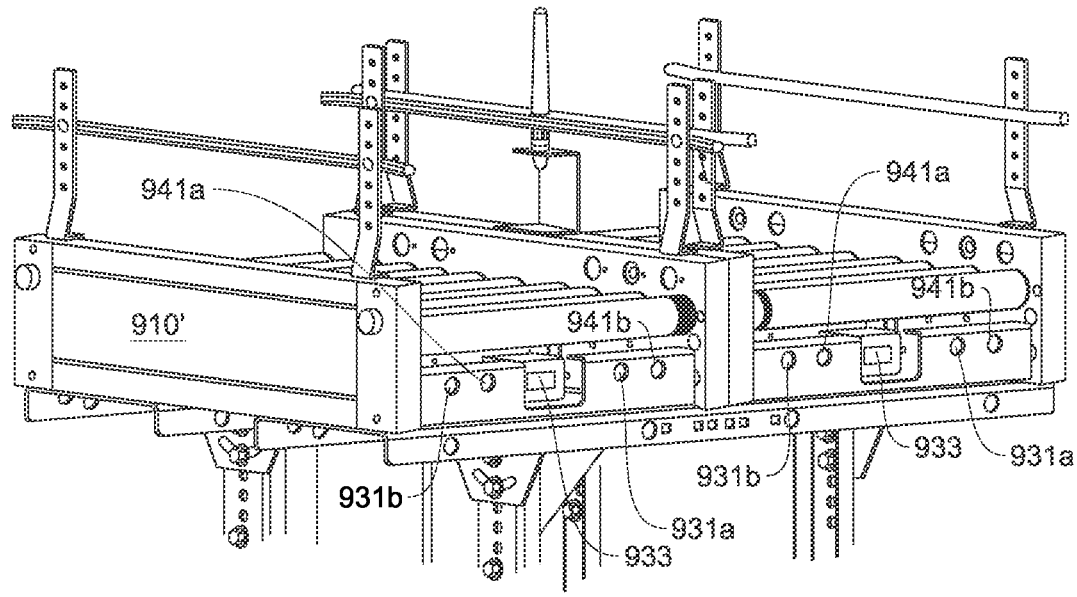
FIG. 18A illustrates a close-up view of positional sensors on a side of a transport platform of a robot in accordance with certain aspects of the present disclosure.

A close-up view of an exemplary position sensor arrangement on a transport platform 910' of a transport robot (900', 900") is shown in FIG. 18A. Note that a similar arrangement of sensors may also be positioned on an edge of the bin handling platforms (642, 110) of the bin retrieval robots (600, 600b, respectively) disclosed herein. As shown, the sensors may include one or more photo eye sensors (931a, 931b), retroreflectors (941a, 941b), and a data sensor 933. Exemplary data sensors include at least optical data couplers that allow parallel data transfer and a wide angle of divergence.

Figure 18B:
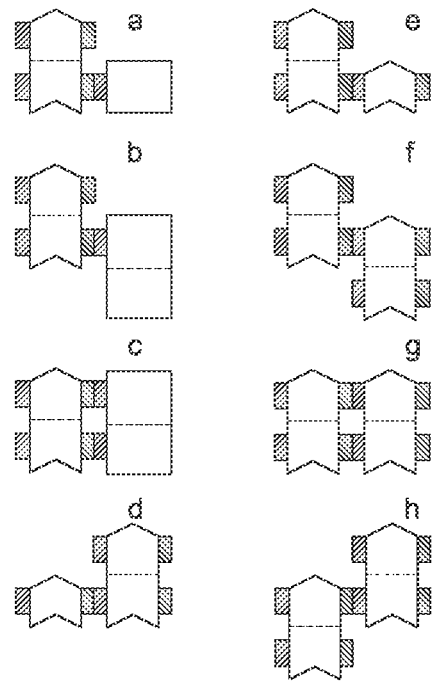
FIG. 18B illustrates docking configurations between a moving robot and a stationary robot or conveyance system in accordance with certain aspects of the present disclosure.

With reference to FIG. 18B, the specific arrangement of these position sensors on the platform(s) (e.g., 910', 642, 110) allows the mobile base 900 (referred to as "bolt" in the figure), or any robot disclosed herein comprising the mobile base, to recognize its position relative to any of the other exemplary robots (e.g., other "bolt" robots) or conveyance systems as one approaches another. For example, a 2-conveyor bolt, such as shown in FIG. 16, may dock with a stationary single (a) or double (b, c) conveyor belt, or a stationary 1-conveyor (e) or 2-conveyor (f, g, h) bolt. Also shown in FIG. 18B is a 1-conveyor bolt docking with a stationary 2-conveyor bolt (d). Note that while these sensors are indicated to be a part of the transport platform of the robot shown in FIG. 10A, they may also be positioned on each level of transport platforms, such as each of the two levels of transport platforms shown for the robot in FIG. 17.

Figure 18C:
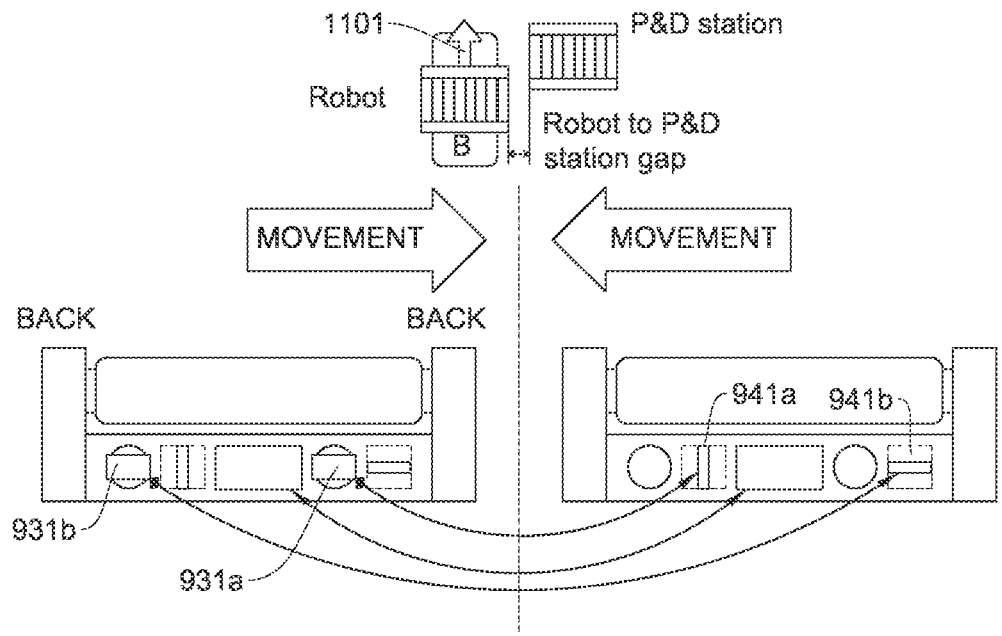
FIG. 18C illustrates a close-up view of sensor interactions during alignment of a moving robot and with a stationary conveyance system in accordance with certain aspects of the present disclosure.

As shown in more detail in FIG. 18C, a robot (e.g., 600, 600b, 900', 900") may approach a stationary conveyance system (labelled P&D station, i.e., packing and distribution station), wherein a direction of travel is indicated by arrow 1101 (B indicates the rear of the robot). The robot may reduce speed as it approaches the station, based on signals received by the various position sensors on the robot and/or sent from the station. For example, when a first sensor 931b, e.g., photo eye, detects sensor 941b, e.g., horizontal reflector on the stationary conveyance system, the robot may reduce speed and reposition to achieve a specific gap between the robot and the stationary conveyance system. As soon as a second sensor 931a on the robot detects sensor 941a, e.g., vertical reflector on the conveyance system, the robot may stop. When both of sensors on the robot (sensors 931a, b such as photo eyes) are detecting both sensors (sensors 941a, b such as reflectors), a data sensor 933 on the robot may exchange data with the conveyance system (such as with a data sensors on the P&D station) to initiate pick-up or drop-off of a bin. Alternatively, or additionally, data exchange may occur via wireless data exchange between the robot and a central server 200 or WMS 201 (see FIG. 22) and the stationary conveyance system.

Figure 18D:
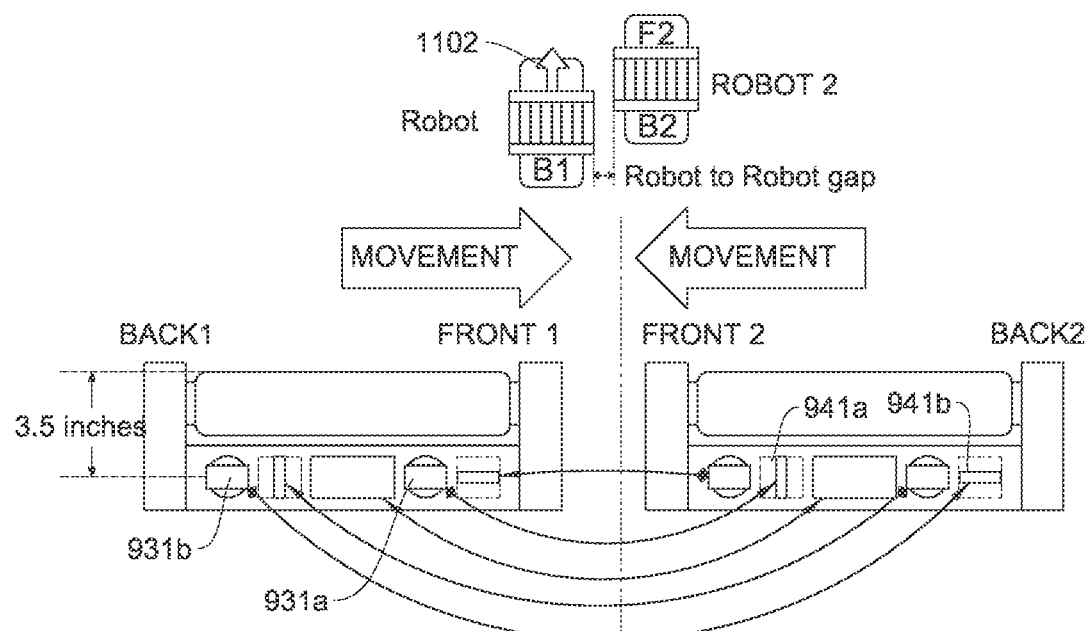
FIG. 18D illustrates a close-up view of sensor interactions during alignment of a moving robot and with a stationary robot in accordance with certain aspects of the present disclosure.

Shown in more detail in FIG. 18D is an exemplary interaction between a moving robot (robot 1; e.g., 600, 600b, 900', 900" or an AMMR) and a stationary robot (robot 2; e.g., 600, 600b, 900', 900" or an AMMR), wherein a direction of travel is indicated by arrow 1101 (B indicates the rear of the robot, i.e., B1 and B2, and F1 indicates the front of the stationary robot). The robot may reduce speed as it approached the stationary robot, based on signals received by the various sensors on the robot and/or sent from the stationary robot. For example, when a first sensor 931b, e.g., photo eye, detects sensor 941b, e.g., horizontal reflector, the robot may reduce speed and reposition to achieve a specific gap between the robot and the stationary robot. As soon as a second sensor 931a detects sensor 941a, e.g., vertical reflector on the stationary robot, the moving robot may stop. When both of sensors (931a, b) are detecting both sensors (941a, b), a data sensor 933 on the moving robot (robot 1) may exchange data with the stationary robot (data sensor on robot 2) to initiate pick-up or drop-off of a bin. Alternatively, or additionally, data exchange may occur via wireless data exchange between the moving robot and a central server 200 or WMS 201 (see FIG. 22) and the stationary robot.

As indicated above, the bin retrieval robots 600 and 600b disclosed herein comprise a mobile base 900, as illustrated in FIGS. 1 and 3-9. An exemplary version of the mobile base 900 without a vertical tower (652) or support frame (120a, b, c) attached thereon is shown in FIGS. 12A and 12B. Positions of drive wheels 946 and passive wheels 944' are shown. According to certain aspects, a drive system of the mobile base 900 includes two drive wheels 946, and four passive wheels 944'. The mobile base 900 may include an onboard computer processor (218, 978; see FIG. 22). Each drive wheel 946 may have an encoder that provides motion feedback to the processor (218, 978), which can be used to precisely control the speed of each wheel in order to achieve the desired rotation and translation velocities of the mobile base 900. The feedback data may also be used for odometry to estimate the motion of the mobile base 900 relative to the logistics facility. The odometry may be responsible for guiding the mobile base 900 navigation at times when visual markers are out of sensor range. The mobile base 900 may use the passive wheels 944', such as casters, for stability and weight distribution.

The presently disclosed mobile base 900 is unique in offering forward and reverse navigation and a 360-degree field of view provided by a laser ranging device, such as LIDAR, augmented with 3D cameras. For example, the mobile base 900 may include a laser ranging device 922' positioned in a cavity (slot 955) in a front end of the mobile base 900 (see FIG. 14). The cavity may be designed and configured to afford up to a 180-degree, 225-degree, or even a 270-degree field of view for the laser ranging device. These exteroceptive sensors may be differentiated from sensors included on the mobile base 900 or any of the robots disclosed herein that may be proprioceptive, such as accelerometers, gyroscopes, strain gauges, magnetometers and a compass, wheel encoders, and temperature sensors. These exteroceptive sensors may include forward, side, and rear facing sensors such as cameras, depth cameras, laser and/or LiDAR devices, radar, sonar, ultrasonic, infrared, touch sensors such as whiskers or bump sensors, GPS, and proximity sensors. Exemplary cameras may include any of 3D or structured light depth cameras, stereo cameras, color cameras, grey scale cameras, and combinations thereof.

Figure 14:
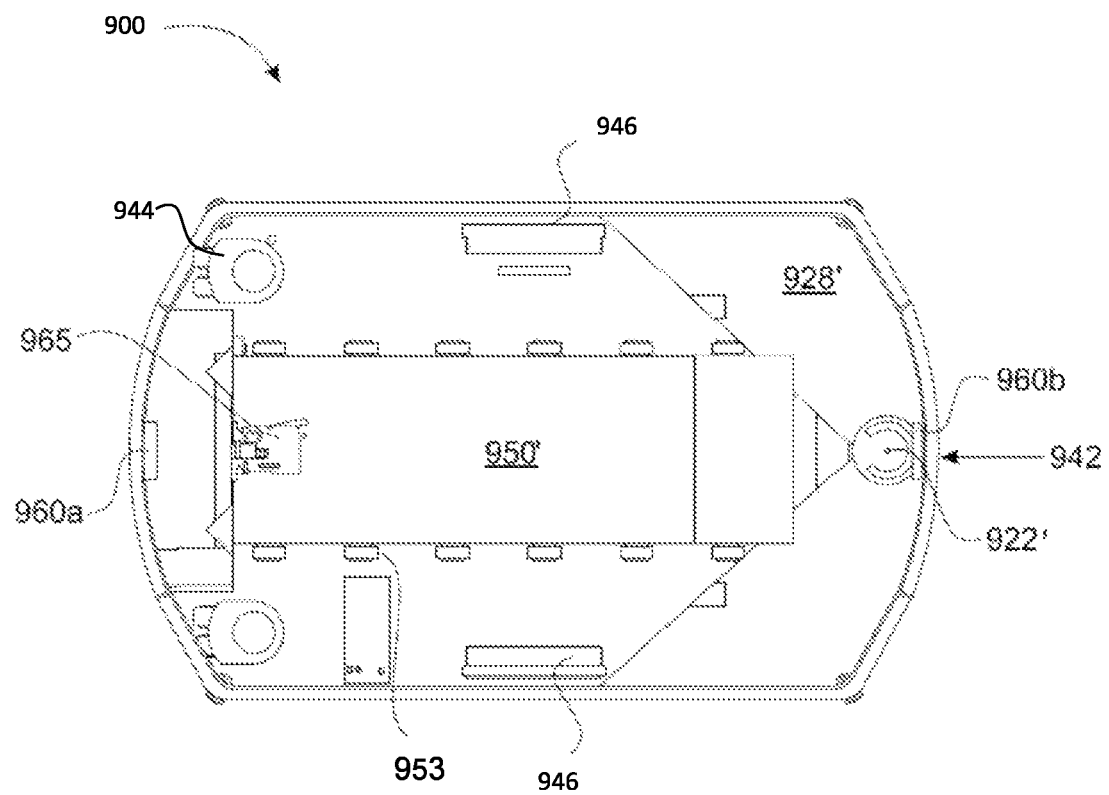
FIG. 14 illustrates a top view of internal components of the mobile base shown in FIG. 12A.

With reference to FIG. 14, a top view of the mobile base 900 is shown with a top cover removed so that internal details are apparent. A field replaceable battery 950' is shown engaged within a battery slot of the mobile base 900 and locked into position with an electronic latch 965. A position of the drive wheels 946 is also shown. A laser ranging device 922' such as a LiDAR device is shown at a front end 942 of the mobile base 900 positioned within the slot 955. As configured, the slot 955 provides the laser ranging device 922' a wide field of view (FOV, 928') of the surrounding environment along a plane that is elevated from the ground (i.e., from at least 180-degree to up to 270-degree FOV).

Also shown in FIG. 14 are positions for additional sensors at the back and front (960a and 960b, respectively) of the mobile base 900. According to certain aspects, the back and front (960a and 960b) sensors may be 3D depth cameras. According to certain aspects, side facing sensors may include stereo cameras and the forward and rear facing sensors may include structured light depth cameras (3D cameras). This unique design allows the mobile base 900 to navigate while driving both forwards and backwards and may provide a full 360-degree field of view of the environment around the mobile base 900. While sensors are discussed as provided on the mobile base 900, any of the robots disclosed herein that are configured on the mobile base (i.e., 600, 600b, 900', 900") may include such sensors on portions of the robots additional to the mobile base (e.g., on the support frame or bin handling platform of the bin retrieval robot 600).

Most prior art AMRs and AMMRs use motor-driven drive wheels in which the motor transfers power to a set of wheels via a gearbox. A disadvantage of such gearbox-driven robots is that they require a heavier force of touch to bring the motor to stop. Because of the necessary greater force, gearbox-driven robots may pose a safety hazard when operating near human workers in a warehouse. The drive wheels 946 of the presently disclosed robots overcome these drawbacks by providing a direct drive mechanism that is configured to detect much lighter forces, such as from an unintended collision, and instantly transfer that response back to the motors that are directly driving the wheels, thereby stopping the robot more quickly and more reliably.

Figure 19A:
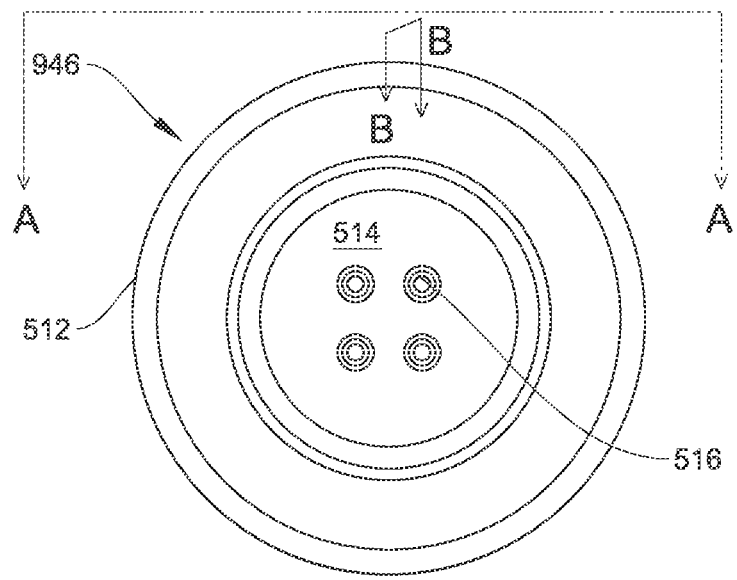
FIG. 19A illustrates a front view of an outer rotor brushless DC motor drive wheel of robot in accordance with certain aspects of the present disclosure.

An exemplary drive wheel 946 of the mobile base 900 is shown in FIG. 19A, wherein the drive wheel 946 generally includes an integrated tire 512 and a front cover 514 having holes 516 that allow passage of front attachment means. An exemplary attachment means, e.g., bolts, may pass through the holes 516 in the front cover 514 and extend through a thickness of the drive wheel 946 to attach to the mobile base 900. As such, these drive wheels 946 are easily replaced or removed for repairs. Additionally, the tire 512 is attachable or integrated with an outer rotor that may also be easily replaced, such as when the tire is worn.

Figure 19B:
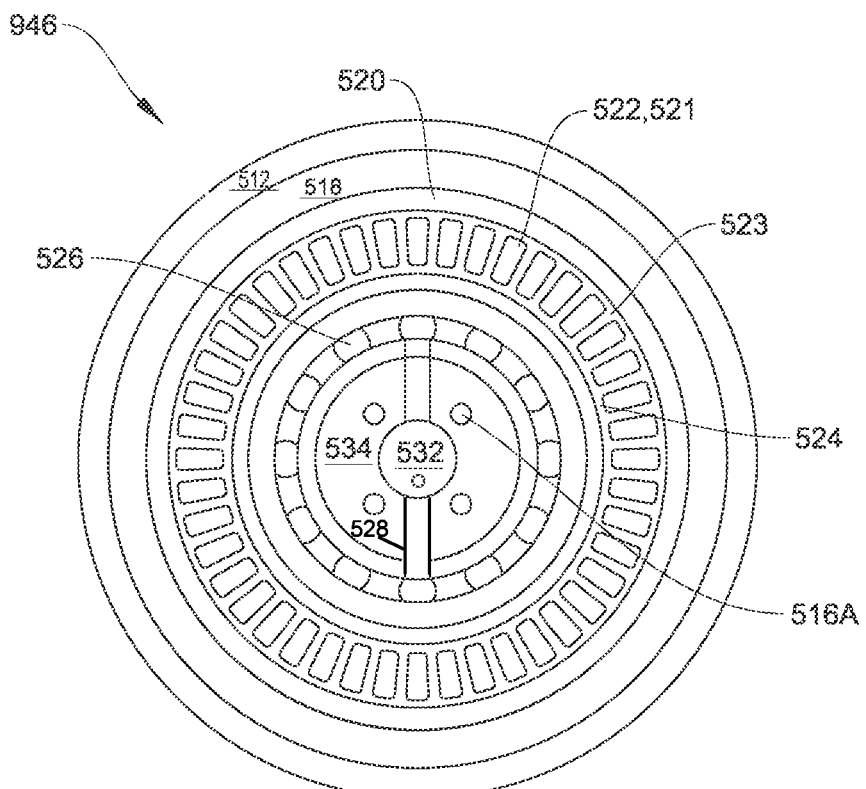
FIG. 19B illustrates a cross-sectional view taken along line A-A of the drive wheel shown in FIG. 19A.

Shown in FIG. 19B is a cross-sectional view of the drive wheel 946 taken along line A-A of FIG. 19A. The drive wheel 946 generally includes components of a brushless direct current motor, such as a stator 524 comprising electromagnets 521, a rotor 518, and alternating poles, i.e., permanent magnets 520. The rotor 518 may be positioned around the circumference of the stator 524 such that it is capable of rotation around the stator. Attached or connected to an inner wall of the rotor 518 are a number of alternating poles, i.e., permanent magnets 520 with alternating north and south poles. These magnets 520 are generally positioned with a small clearance or magnetic clearance gap between an inward facing surface of the magnet (i.e., inward to a center of the drive wheel) and the outer most surface of the stator (i.e., outward away from a center of the drive wheel). The magnetic clearance gap may be 5 mm or less, such as 3 mm or less.

The stator 524 is stationary and is formed around the outer circumference of a circular mechanical support element, or central shaft 534. A plurality of electromagnets 521 are positioned within slots 522 along an outer circumference of the stator 524 proximate the magnets 520 on the inner wall of the rotor 518. While the stator 524 is shown to include 44 slots 522 configured to hold electromagnets 521, any number of slots and electromagnets could be included in the drive wheel 946. Moreover, while the central shaft 34 is shown to be formed in the shape of a ring, any shape could be used, including, for example, a hub-and-spoke shape in which the stator 524 is supported by spokes connecting to a central hub.

Also shown in FIG. 19B are the attachment bores 16a that pass through the width of the drive wheel 946 and are positioned in the central shaft 534. These accept the attachment means discussed above that provide connection between the drive wheel 946 and the mobile base (900). The central shaft 534 also includes a central axial bore 532 that extends longitudinally through the central shaft (i.e., thickness of the drive wheel 946), and at least one wire passthrough bore 528 that extends radially from the central bore 532 through the central shaft 534. The central axial bore 532 and wire passthrough bore 528 provide for passage of wiring from the electromagnets and an encoder, such as to a motor controller and power supply, generally a battery provided by the mobile base 900.

Figures 20A, 20B:
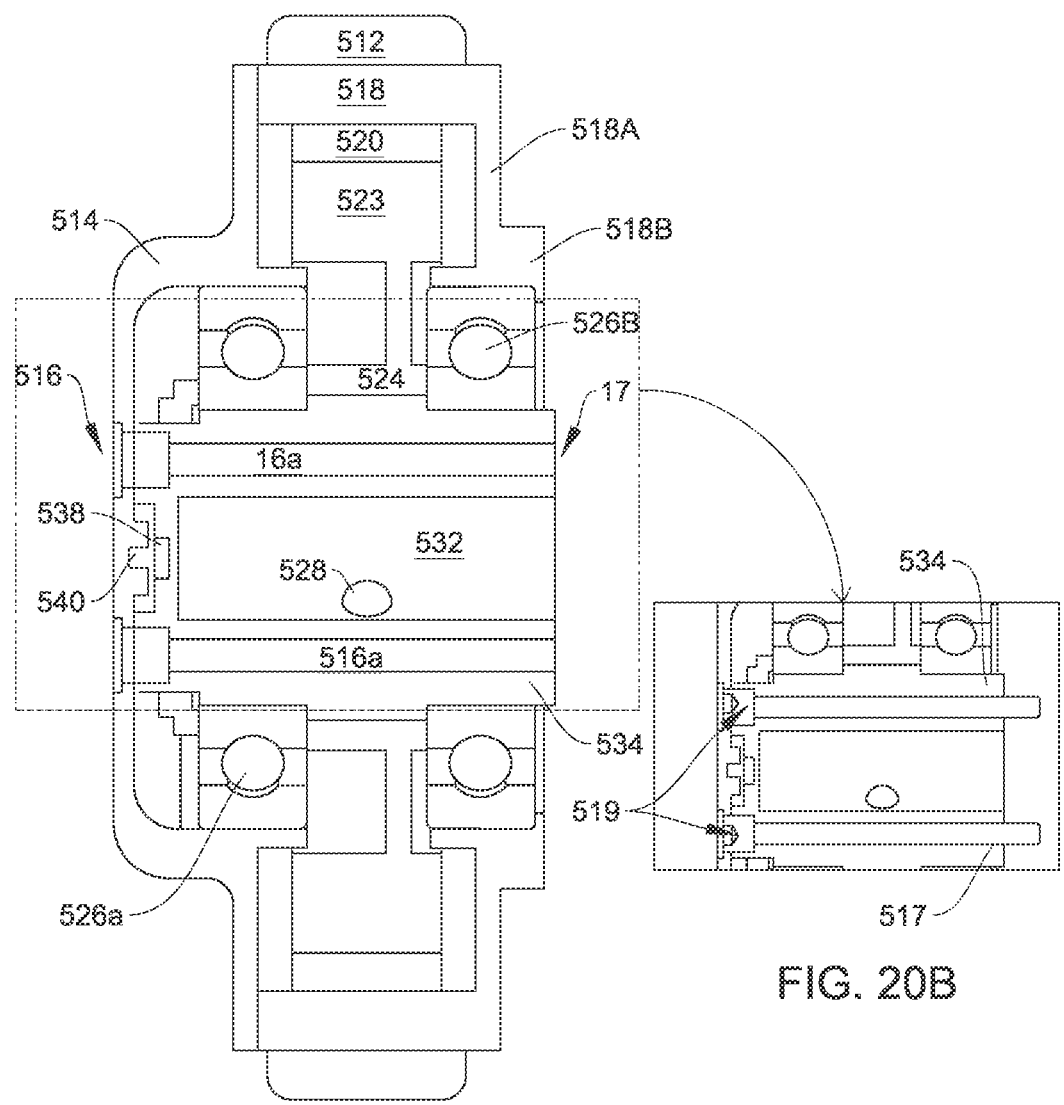
FIG. 20A illustrates a side cross-sectional view taken along line B-B of the drive wheel shown in FIG. 19A.
FIG. 20B illustrates a portion of the cross-sectional view of the drive wheel shown in FIG. 13A pointing out placement of attachment means through the central shaft in accordance with certain aspects of the present disclosure.

With specific reference to FIGS. 20A and 20B, which are cross-sectional views taken along line B-B of FIG. 19A, the stator 524 is shown to extend radially inward and connect to the central shaft 534. In FIG. 20A, a sidewall 523 of the slot 522 is shown, as is an inner most portion of the stator 524 attached to the central shaft. These views of the drive wheel 946 clearly illustrate the cover 514 on an outward facing surface, i.e., when the drive wheel is attached to the mobile base, and a sidewall (518a, 518b) of the rotor 518 that covers a large portion of an inward facing surface thereof. The holes 516 in the cover that allow passage of the attachment means, which extend through axial bores 516a in the central shaft 534. Reference number 17 points to an exit point of the axial bores 516a on a back side of the central shaft 534.

As shown more clearly in FIG. 20B, the attachment means 519, such as a bolt, may pass through the holes 516 in the cover and may reside in the axial bores 516a extending past the exit 517 on the back side of the central shaft 534 so that they may engage complementary bores on a mobile base 900. Once engaged, the attachment means does not interfere with rotation of the cover, i.e., as the rotor 518 and cover rotate about the stator 524, as they may be countersunk into the central shaft so that they are flush with a surface of the central shaft 534. As indicated above, the stator 524, electromagnets 521 positioned in the slots 522, and central shaft 534 do not rotate, while the rotor 518 and magnets 520 are configured for rotation. To support the axial rotation of the rotor 518 relative to the stator 524, bearings are included between the cover 514 and the central shaft 534, and between the sidewall (518a, 518b) of the rotor 518 and the central shaft 534 (bearings 526a and 526b, respectively).

The electromagnets 521 of the stator 524 can be energized in a controlled fashion to drive rotation of the magnets 520 attached to the inner surface of the rotor 518, and thus drive rotation of the tire 512 attached to the rotor 518. Accordingly, also included on each drive wheel 946 is an encoder. An exemplary implementation of an encoder may include an encoder read head 538 and an encoder magnet 540 as shown in FIG. 20A. The encoder magnet 540 is shown to be attached to an inner side of the cover 514, which rotates with the rotor 518, while the encoder read head 538 is attached to the stationary central shaft 534 (i.e., a rotary encoder). As the rotor 518 and cover 514 rotate, the encoder magnet 540 will also rotate and present different poles to the encoder read head 538. The encoder may be an absolute encoder or an incremental encoder.

Figure 22:
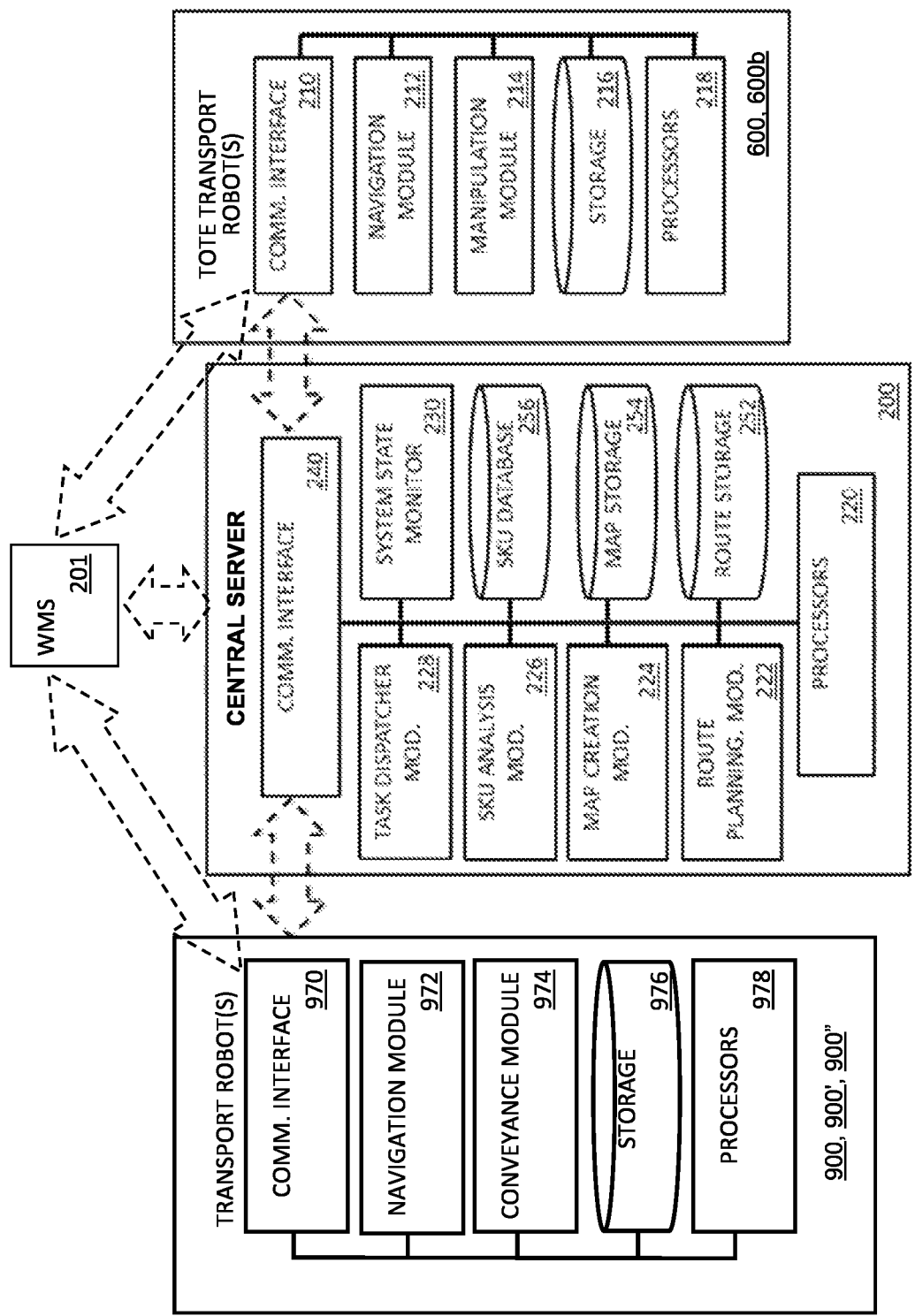
FIG. 22 illustrates a block diagram of a robotic system with hardware and software modules of a central server and a plurality of bin retrieval robots and transport robots in accordance with certain aspects of the present disclosure.

With reference to FIG. 22, the mobile base 900 may further include one or more onboard processors (218, 978), an onboard storage or memory (216, 976), and a remote communication interface (210, 970) that allows communication with external servers (201, 240), the internet, and other similar or dissimilar robots. This communication may be established through a wireless network via a wireless access point. For example, the mobile base 900 may include a Wi-Fi access point. Moreover, various other types of communication are possible and may be used in addition to, or as an alternative to wireless communication, such as a tethered wire connection or other point-to-point wireless data exchange.

Figure 21:
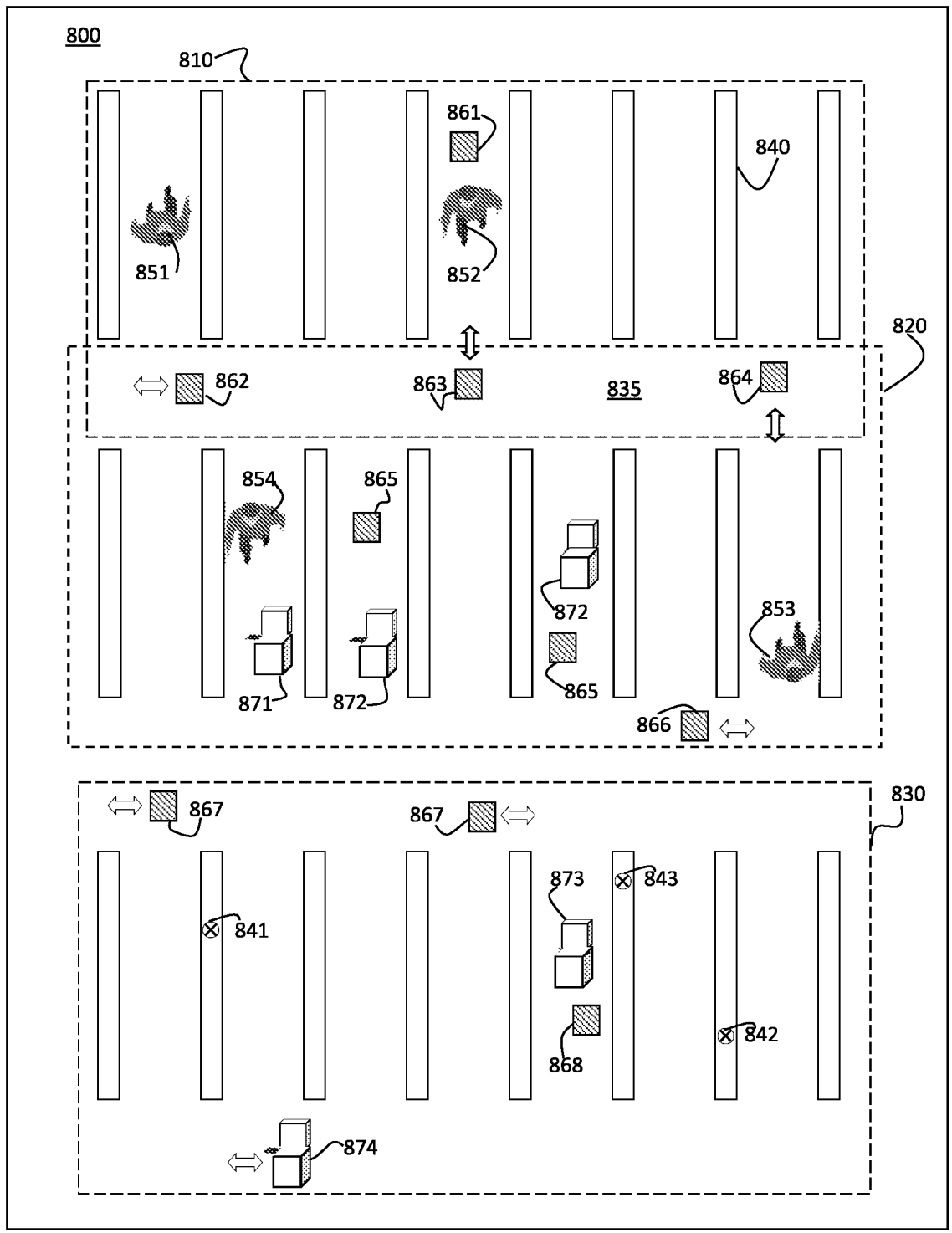
FIG. 21 illustrates a simplified overhead floor plan view of a representative logistics facility in accordance with certain aspects of the presently disclosed invention.
Figure 23:
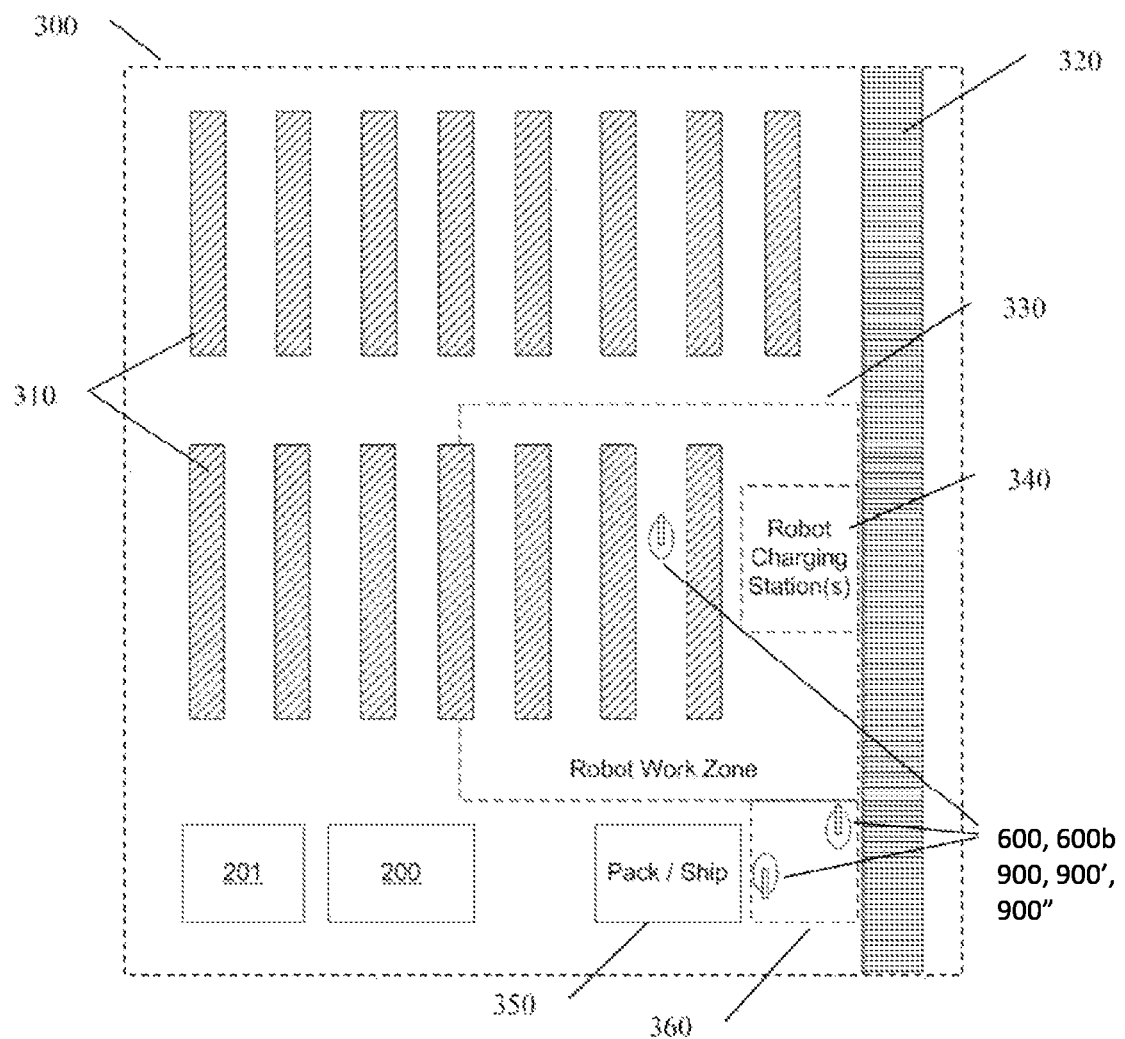
FIG. 23 illustrates a simplified overhead floor plan diagram of a representative logistics facility in accordance with certain aspects of the present disclosure.

The mobile base 900 may move and navigate between locations in a work zone and an order transfer area (see 330 and 360, respectively of FIG. 23; 820, 830 of FIG. 21). During navigation, data from the various sensors (e.g., at least the exteroceptive sensors) may be processed by the onboard computer processor (218, 978) in a navigation software module (212, 972) to extract two modalities of information. The first modality may be local mapping information that indicates which areas around the mobile base 900 are traversable and which areas contain obstacles. The second modality may be visual or audible landmark locations, characteristics of which may be stored on the central server 200 or on the memory (216, 976) of the mobile base (i.e., storage). When the characteristics of the landmarks are stored on the memory, the mobile base 900 may navigate autonomously through a logistics facility and may not require constant communication from the central server 200.

The mobile base 900 may also be equipped with safety features that can include: one or more safety lights or strobes (lights 921), an audible warning annunciator or horn, one or more emergency stop buttons 917b', the ability to display fault, error and/or intended action (such as navigation turn signal) information on a user interface, at some other point on the robot, such as via the safety lights, or any combination thereof.

The safety features of the mobile base, and any of the robots disclosed herein configured on the mobile base (i.e., 600, 600b, 900', 900"), may include a health monitor module on the processor/memory that may receive signals from the various sensors and may communicate a fault or error state to a remote server. As example, the health monitor may register a power loss, or obstacle, or sensor failure, or battery status or battery fault, and may communicate this information to the remote server. The robotic health monitor may cause the robot to stop, slow movement, signal an audible or visual error state, or change routes, or after receiving signals from the robot regarding an error or fault state, the remote server may cause any of these actions. Certain limits may be dynamically set for the robots depending on the logistics facility and/or specific job requirements of the robot. For example, in facilities where human workers may work side-by-side with the robots of the present disclosure, the distance limits at which an object is registered as an obstacle may be set to avoid accidental contact with a human, or the robot may be configured to slow when approaching a human worker. Additionally, should an error be registered at the remote server for a robot, a human worker may be dispatched to clear the error (e.g., move an obstacle).

The mobile base 900 and any of the robots disclosed herein configured on the mobile base (i.e., 600, 600b, 900', 900") may contain an external swappable memory port on a side, where necessary information may be uploaded to the robot directly when the operator inserts a data storage device, thus by-passing the wireless communication to the server. The data storage device may be a disk, USB flash device, or other form of external memory storage device. The data may also be transferred through proximity communication technologies, such as near field communication (NFC), Bluetooth, or short-range radio-frequency identification (RFID) standards.

Furthermore, the mobile base 900 and any of the robots disclosed herein configured on the mobile base (i.e., 600, 600b, 900', 900") may receive signals from the central server 200, or directly from the WMS 201, which may indicate an emergency and may direct the robot to stop and/or may further activate the one or more safety lights or strobes and/or audible warning annunciator or horn. In the event that an unstable and/or unsafe diagnostic state for the robot is detected by the one or more robot processors (i.e., 978 or 218 of FIG. 22), the mobile base may be stopped. The mobile base 900, and thus the bin retrieval robot 600 or transport robots (900', 900") disclosed herein, may also be stopped if the sensors detect a human or obstacle in close proximity or detect unsafe operation of the robot. Such signals may be processes at the central server 200 which may then control the robot speed and or direction of operation.

The mobile base 900, and thus the bin retrieval (600, 600b) or transport robots (900', 900") disclosed herein, may also send signals back to the central server 200, the WMS 201, or to other robots regarding conditions in a navigation pathway (e.g., obstacles, unsafe conditions), a condition of the robot (e.g., unstable and/or unsafe diagnostic state, load state, status of the work order, battery charge state), or a condition of the inventory or warehouse (e.g., no item at pick location, inventory status).

Internal details of components and software relevant to the system are shown in FIG. 22, which provides a block diagram of a system comprising a central server 200, at least one bin retrieval robot (600, 600b), and at least one transport robot (900', 900"). Note that reference to a transport robot may include any of the configurations detailed herein, such as the transport robot 900' of FIG. 16 and/or the transport robot 900" of FIG. 17, unless specifically indicated otherwise. Moreover, reference to a bin retrieval robot may include any of the configurations detailed herein, such as the bin retrieval robot 600 of FIG. 1 and/or the bin retrieval robot 600b of FIG. 7, unless specifically indicated otherwise.

The server may have an electronic communications interface (server communication interface 240) that connects with an electronics communication interface on the bin retrieval robot(s) (remote communication interface 210) and the transport robot(s) (remote communication interface 970). This connection may be established through a wireless network via a wireless access point. Various other types of communication are possible and may be used in addition to, or as an alternative to wireless communication, such as a tethered wire connection or other point-to-point wireless data exchange.

The onboard computer processors (218, 978) may also have local persistent memory (216, 976) which stores specific information relevant to the configuration of each mobile base and/or robot configured thereon. Such information may include sensor calibration data, actuator tuning parameters, such as for the conveyance system actuators, and other platform specific data. The onboard computer processor (218, 978) may also communicate with the central server 200 to receive pick information and respond back with confirmation data to inform the central server 200 of successful picks or any errors that might occur.

Figure 24:
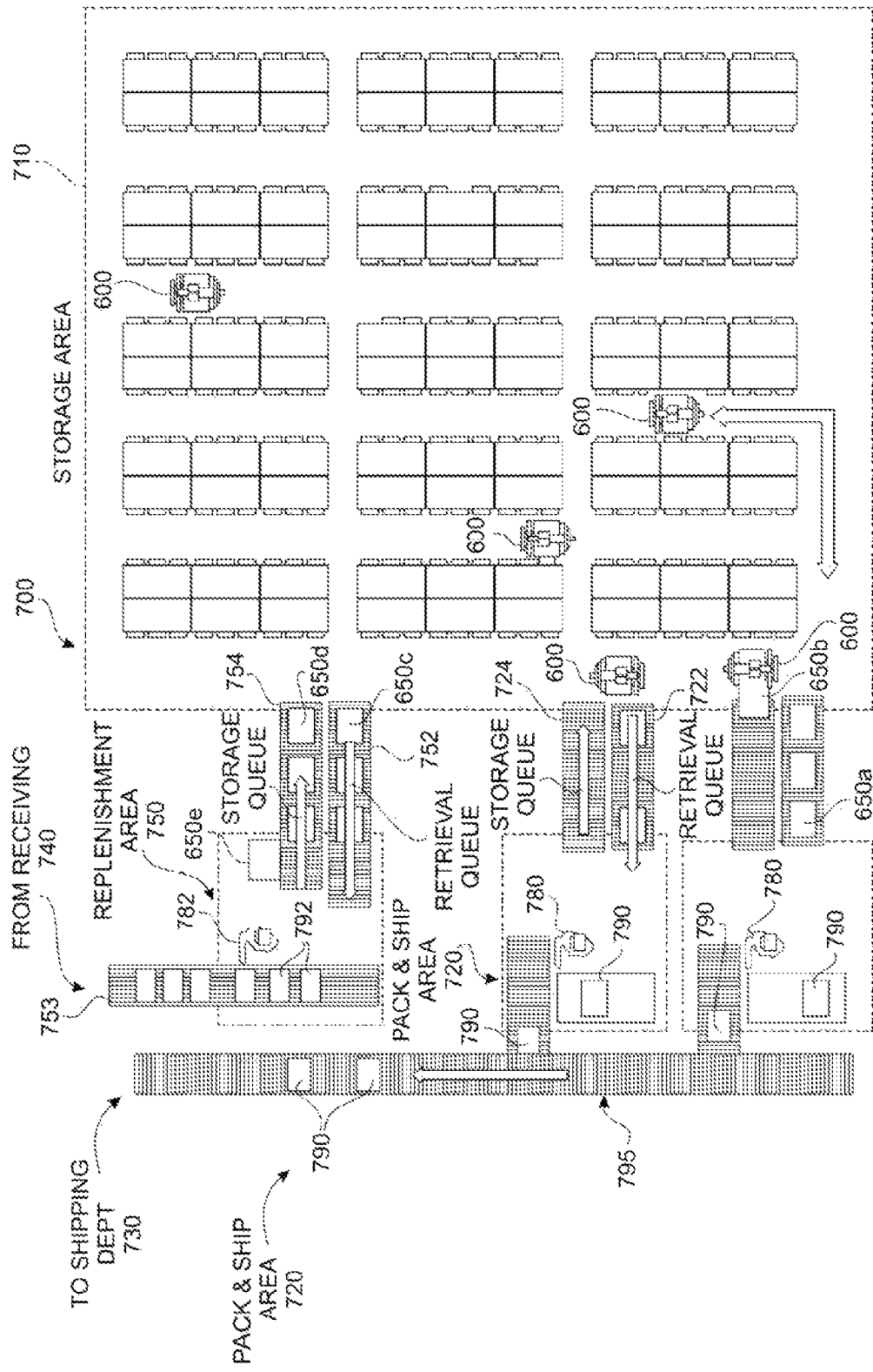
FIG. 24 illustrates a simplified overhead floor plan diagram of a representative logistics facility in accordance with certain aspects of the present disclosure.

FIGS. 23 and 24 show exemplary top view floor plans of a section of a logistics facility (300, and 700, respectively) in which bin retrieval robot (600, 600b) and optionally the transport robot (900', 900") may be deployed. The presently disclosed system(s) and method(s) enable bins to be picked by a bin retrieval robot 600 and transferred to any of a transport robot (900', 900"), a packing and shipping station 350, or a conveyor 320 of a staging area 360 (transfer area). The transport robot (900', 900") may accept bins, or bins from any of a bin retrieval robot 600, another transport robot (900', 900"), a packing and shipping station 350, a human worker, or a conveyor 320 or a staging area, and may deliver the bins to any of the same.

Figure 13A:
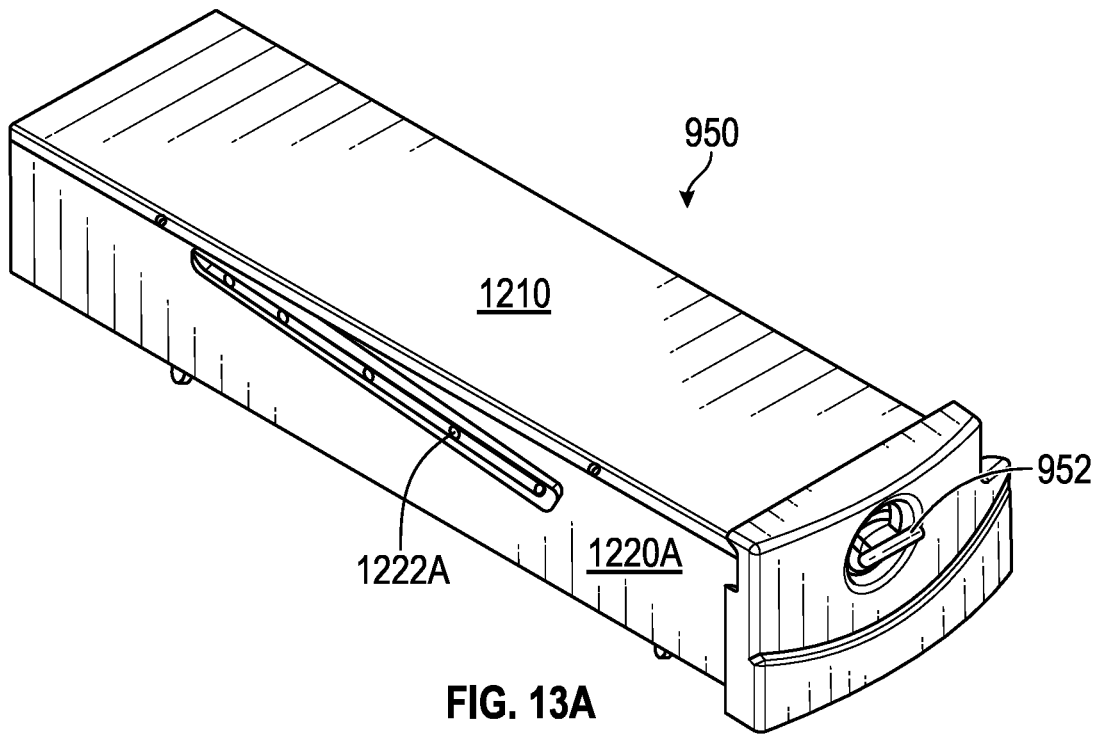
FIGS. 13A and 13B illustrate left- and right-side perspective views of a field replaceable battery useful in the bin retrieval robot and transport robot in accordance with certain aspects of the present disclosure.
Figure 13B:
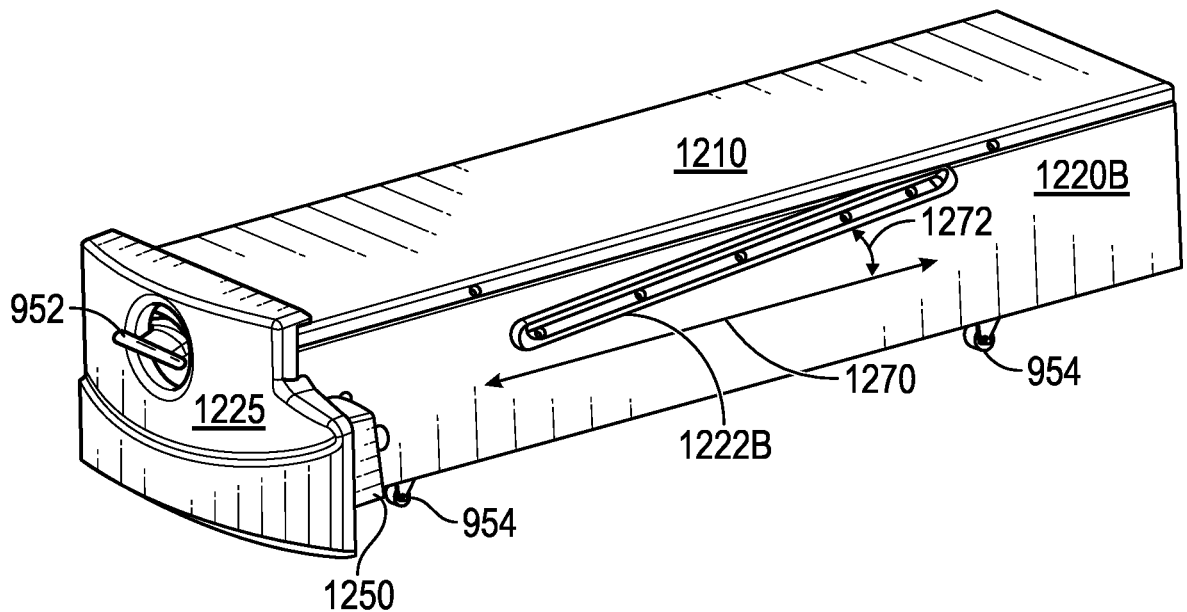

All systems onboard the mobile base 900 and various robots configured thereon, i.e., bin retrieval robot 600 and any other AMR or AMMR, such as other robots configured on the mobile base 900, may be powered from onboard batteries, such as the field replaceable battery 950 shown in FIGS. 13A and 13B, or the field replaceable battery 950' housed within a cavity of the mobile base 900 shown in FIG. 14. The field replaceable battery (950, 950') may supply power to the mobile base during navigation for a limited time and may be rechargeable to maintain operation through an economically viable work period. Battery charging may occur opportunistically during times at which no work orders are present for the bin retrieval robot 600 and transport robots 900', 900", or charging may occur separately from the mobile base 900. In this later case, the field replaceable battery (950, 950') may be swapped with separately charged batteries for continued operation of thereof.

For opportunistic charging, the mobile base may have a charging station in a designated area of the facility (see 340 of FIG. 23) in which the robots (e.g., 600, 600b, 900', 900" and any other robots in the facility) can make temporary electrical contacts which feed power into the onboard batteries (i.e., field replaceable battery 950) while the robot is present. For separate charging, a battery hot-swap may be performed by using permanently installed smaller short-life (i.e., minutes) onboard batteries to maintain power while the larger field replaceable battery 950 is replaced with a fully charged field replaceable battery 950. This prevents the robot from needing to power down during battery swap, which saves time.

Hot-swapping may be done manually by a human operator or may be done automatically such as with internal mechanisms of the transport robot and charging station that may automatically discharge/swap batteries at the charging station with the transport robot coordinating the procedure. That is, the transport robot may automatically discharge an exhausted field replaceable battery at an empty charging station, travel to a second charging station having a charged field replaceable battery thereon and load the charged field replaceable battery from that second charging station. The smaller, short-life batteries may provide sufficient power for each of these operations. Moreover, the smaller, short-life batteries may be recharged by the field replaceable battery during normal operation of the transport robot.

Additional signaling from the various charging stations that provide information regarding their status, e.g., presence or absence of a battery, and/or charge state of a battery on the charging station, may be provided to the central server 200 or the WMS 201. This information may be shared with each of the bin retrieval robot (600, 600b) and transport robots (900', 900"), and/or any other robots working in the logistics facility (e.g., AMMRs).

Figure 15:
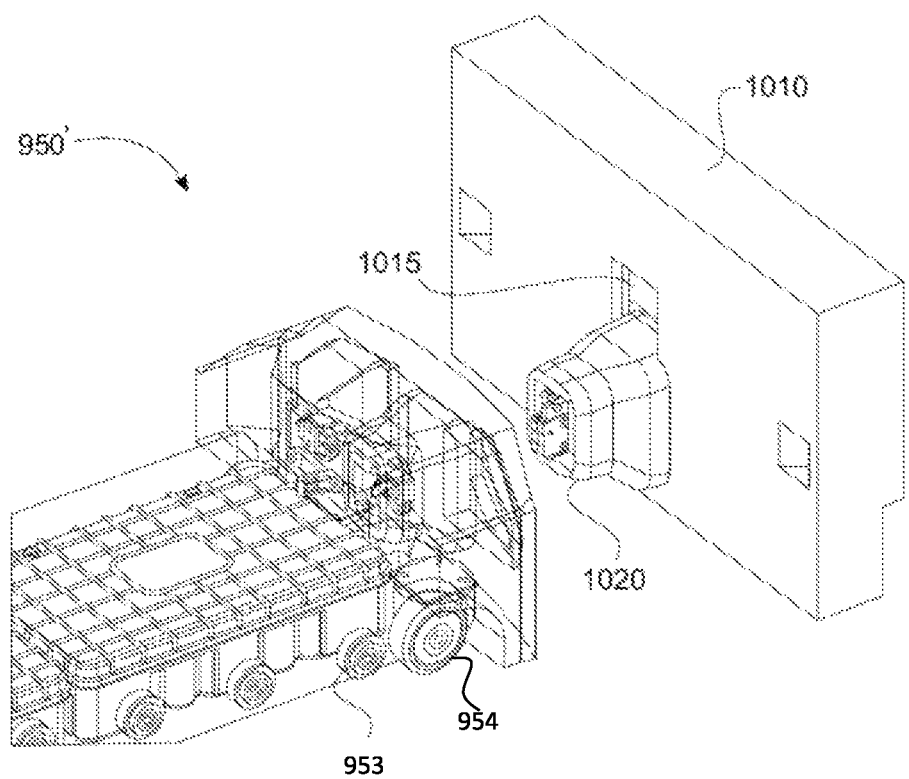
FIG. 15 illustrates a field replaceable battery docking with a docking station in accordance with certain aspects of the present disclosure.

Charging of the field replaceable battery at the charging station may be wireless or may include direct contacts for interfacing with corresponding contacts (e.g. such as a charger pad or direct contacts) on the field replaceable battery. The contacts may be any suitable contacts such as spring loaded or other actuatable contacts that are configured to engage the contacts of the field replaceable battery when the battery is positioned substantially over or in front of the charging station. An exemplary design for the contacts between a field replaceable battery 950' and a charging station 1010 is shown in FIGS. 12B and 15. A contact 1020 of the charging station 1010 may be positioned so that a complementary contact 1030 of the field replaceable battery 950' may be pushed or moved into contact therewith by a human worker or a robot (i.e., any of the robots disclosed herein).

With reference to FIG. 14, an exemplary design and location for the field replaceable battery 950 in a mobile base 900 is shown, such as positioned within a cavity of the mobile base 900. As shown in FIGS. 13A and 13B, the field replaceable battery 950 may include a main body having a top side 1210, left- and right-side walls (1220A and 1220B, respectively), and front and back side walls. The top side 1210 may include a cover which may be opened to provide access to contents therein, such as at least one rechargeable battery cell. Exemplary rechargeable batteries include at least lithium ion batteries, such as rechargeable lithium iron phosphate batteries (e.g., 55V, 110 Amp).

Exemplary battery configurations are shown in U.S. Patent Publication No. 2018/0104829, the entire content of which is incorporated by reference herein. These exemplary batteries, which are configured to provide sufficient power to the various robots disclosed herein, may weight in excess of 120 pounds. Accordingly, they would generally be too heavy for the average person to lift and/or maneuver. Thus, also provided on the main body may be a means to enable movement of the field replaceable battery. For example, as shown in FIG. 13B, wheels 954 such as fixed or rotatable casters may be attached to a bottom of the main body of the field replaceable battery 950.

The main body of the field replaceable battery 950 may further include at least one attachment or connection means for engaging with complementary attachment or connection means on the robot(s). For example, the main body may include at least one connection means on each of the left and right sides of the main body. Shown in FIG. 13A is a connection rail 1222A on the left-side wall 1220A of the main body. Shown in FIG. 13B is a connection rail 1222B on the right-side wall 1220B of the main body. Each connection rail is attached to the side of the main body at an angle 1272 that deviates from the longitudinal axis 1270 of the main body. That is, the connection rails (1220A, 1220B) extend upward from a front side wall 1225 to a back side wall of the main body with respect to the longitudinal axis thereof.

The angle 1272 may be at least 5°, such as at least 6°, or 7°, or 8°, or 9°, or 10°, or 15°, or 20°, or 25°, or 30°, or 35°, or 40°, or 45°. In general, the angle would not exceed 45° as the force required to push the field replaceable battery into the cavity on the mobile base 900 is directly related to the angle 1272. That is, the connection rails provide a means to lift/elevate the field replaceable battery 950 into an engaged position on the mobile base 900. See for example the wheels 954 of the field replaceable battery 950 that are elevated relative to the drive wheels 946 and passive wheels 944' of the mobile base 900 as shown in FIG. 13B when the battery is engaged and locked into the transport robot.

The specific position of these connection rails on the sides of the main body provide a means to connect the field replaceable battery with the mobile base 900 by engaging with complementary device connection means in a cavity thereof. For example, the device connection means may be positioned on an inner right side and an inner left side of the cavity at a position complementary to the position of the battery connection rails (i.e., distance from the ground surface, angle, horizontal spacing, etc.). The field replaceable battery may be positioned (e.g., rolled on wheels 954) for connection by positioning a back sidewall of the battery proximate to an open front of the cavity in the robot. The connection rails (1220A, 1220B) may engage a complementary connection means on each of the right and left sides of the cavity (e.g., rails, wheels, etc. that are configured to interact with the connection means on the field replaceable battery). Connection of the field replaceable battery to the mobile base is then achieved by pushing the battery into the cavity. The connection means on the outer side walls of the main body of the battery will engage with the connection means on the inner side walls of the cavity so that when the field replaceable battery is pushed into the cavity of the robot, the battery is lifted into the cavity with a bottom of the battery suspended above the ground surface (e.g., floor). In this way, the wheels 954 of the field replaceable battery are lifted/elevated off the ground surface. While the connections means are shown in FIGS. 13A and 13B as rails (1222A, 1222B) on the sides of the battery 950, other connections means are possible and within the scope of the present disclosure, such as wheels, etc. For example, shown in FIG. 15 are wheels 953 positioned on a side of the battery 950' that may engage with corresponding connection means on each of the right and left sides of the cavity in the mobile base 900.

Once the field replaceable battery (950, 950') is fully inserted (pushed) into the cavity of the mobile base, an electrical connection may be established between the two via a connector. A preferred connector includes a blind mate connector on the field replaceable battery which may be configured to make an electrical connection with a blind mate connector on the robot. Shown in FIG. 13B is a blind mate connector 1250 on a back side of the front wall 1225 of the main body of the field replaceable battery 950. This blind mate connector is configured to engage a corresponding blind mate connector on the mobile base to electrically connect the at least one battery cell of the field replaceable battery 950 to power supply circuitry of the mobile base when the field replaceable battery 950 is installed in the cavity.

While the blind mate connector on each of the field replaceable battery and the mobile base are shown in a specific position, such as toward a front of the field replaceable battery and the cavity of the mobile base, other positions are possible and within the scope of the present disclosure. For example, the blind mate connectors may also be positioned toward a back of the cavity and on a back wall of the field replaceable battery or may be position on a top of the field replaceable battery and on an upper surface of the cavity of the mobile base.

As shown in FIGS. 13A and 13B, the field replaceable battery 950 may further include a locking handle 952 or manual release push button for the latch 965 having a locked position and an unlocked position. For example, the locked position may be configured to lock the field replaceable battery 950 in an engaged position on the mobile base. In the engaged position, the field replaceable battery 950 is fully pushed into the cavity of the robot and the blind mate connectors on each are connected to provide electrical connection between the two. The unlocked position of the handle may be configured to allowed movement of the field replaceable battery 950 within the cavity of the mobile base (e.g., insert or remove the battery from the cavity).

Alternatively, and as shown in FIGS. 12A and 14, the field replaceable battery 950' may not include an exterior handle but may rather be locked into position within the mobile base 900 by an electronic latch 965, such as a latch that may be activated (i.e., opened or closed) by the mobile base 900 or by pressing the manual release push button. Such a configuration would enable manual or autonomous exchange of discharged batteries for charged batteries by the mobile base 900.

For example, the mobile base 900 may be configured to autonomously swap the field replaceable battery 950' when it is nearly or fully discharged at a charging station 1010 such as shown in FIG. 15. The mobile base 900 may receive signals from the field replaceable battery 950', such as from a charge sensor configured to sense a charge state of the battery (i.e., charge state of at least one battery cell). Upon receiving a signal indicative of a low charge state of the field replaceable battery 950', the mobile base 900 may proceed to an empty charging station 1010. Signals related to the status of various charging stations, i.e., occupied or empty, and of the field replaceable batteries 950' docked at any of the charging stations, may be communicated between the mobile base 900 and the central server 200 and/or WMS 201.

Once at an empty charging station 1010, the mobile base 900 may autonomously unlatch the electronic latch 965 so that the field replaceable battery 950' may be released from the mobile base 900 and slide into position on the charging station 1010. As shown in FIG. 15, the charging station 1010 includes a contact 1020, generally a male connector, that may engage with a complementary contact 1030, generally a female connector, on the field replaceable battery 950'.

The contact 1020 on the charging station 1010 may be configured to move vertically within a slot 1015 on the charging station. As indicated above, when a field replaceable battery 950' is engaged within a robot, it is elevated above the ground. As such, when a mobile base 900 approaches a charging station 1010, the contact 1020 may be elevated vertically to a position that best enables engagement with the complementary contact 1030 of the field replaceable battery 950'. Upon release of the electronic latch 965 by the mobile base 900, the field replaceable battery 950' may slide down and out of the mobile base while maintaining connection with the charging station contact 1020, which moves vertically down to match a position of the complementary contact 1030 on the battery.

The mobile base 900 may send/receive signals related to the status of this newly positioned field replaceable battery 950', such as proper alignment of the battery on the charging station and active charging of the battery. These signals may be sent from the field replaceable battery 950' and/or the charging station 1010 and may be received by the mobile base 900 and/or the central server 200 (and/or the WMS 201). In the case that improper alignment, connection, or charging are detected by the charging station 1010, further signals may be sent out by any of the mobile base 900, field replaceable battery 950', and/or charging station 1010 (i.e., those devices participating in the battery docking and charging activity) to summon a human worker to correct the error, or to cause the mobile base 900 to re-engage the field replaceable battery 950' and attempt to position the battery on the charging station again.

Thus, a standard autonomous hot-swap of a discharged battery may include signaling between a mobile base 900 and the central server 200 and/or WMS 201 to locate an empty charging station 1010, traveling to that charging station, and docking the complementary contact 1030 of the field replaceable battery 950' with a contact 1020 of the charging station 1010. The mobile base 900 may then send/receive signals, as detailed above, regarding a successful docking action at the charging station 1010, and upon a successful docking action, may unlatch the electronic latch 965 to discharge the field replaceable battery 950' from the internal cavity of the mobile base 900 so that the mobile base may move away from the charging station. Docking may include simple contact between the charging station contact 1020 and the contact 1030 of the battery, and/or may further include a physical locking engagement therebetween, such as to avoid accidental disconnect upon exit of the mobile base from the discharged battery.

The mobile base 900 may send/receive signals from any of a charging station having a charged battery, the central sever 200, and/or the WMS 201 regarding location and charge status of a field replaceable battery 950' that may be used to replace the recently discharged battery. Upon locating a suitable replacement battery, the mobile base 900 may proceed to that charging station 1010 and drive over/engage the replacement battery within the internal cavity. Once engaged properly within the internal cavity (i.e., connected so that the battery may provide power to the mobile base 900), the mobile base 900 may re-engage the electronic latch 965 to secure the battery therein. The mobile base may exit the charging station and proceed with previous duties (pick/put-away, etc.).

Alternatively, the mobile base 900 may not hot-swap the field replaceable battery 950 but may remain positioned on the charging station 1010 during charging, i.e., in-robot charging. In such a case, the mobile base (e.g., any of the robots 600, 600b, 900', 900", or AMMRs disclosed herein) would dock on the charging station without releasing the battery during charging. When the field replaceable battery 950 is fully charged or if the mobile base 900 is sent to perform a task by the central server 200, the mobile base 900 would unlatch itself from the charging station 1010 and would drive, e.g., proceed within the logistics facility, to perform that task.

The field replaceable battery generally includes at least one rechargeable battery cell. Further, the field replaceable battery may include a charge sensor configured to sense a charge state of the at least one battery cell, and a circuit electrically connected to the charge sensor for receiving a signal indicative of the charge state of the at least one battery cell. Additional sensors may be included which register a temperature, voltage, current, etc. of the at least one battery, and such information (data) may also be relayed via a circuit. Alternatively, each of the sensor signals, e.g., signals related to charge state, temperature, voltage, current, etc., may be sent wirelessly from the field replaceable battery to any of the mobile base, the charging station, and/or the WMS. Additionally, when more than one battery cell is included in the field replaceable battery, each individual battery may include a charge sensor (and optionally additional sensors), which may communication via individual circuits, wirelessly, or may communicate directly, to a battery management system. Such a system manages a rechargeable battery (cell or group of cells), such as by protecting the battery from operating outside its safe operating area, temperature, voltage, etc.; and by monitoring its state, calculating secondary data, reporting that data, controlling its environment, authenticating it and/or balancing the usage of individual cells in a groups of cells.

The field replaceable battery may be part of a power management system that may also include a backup battery to provide power to the mobile base 900 when the field replaceable battery is removed or fully discharged. Moreover, the power management system may include a battery docking station, such as the charging station 340 and/or

1010 (FIGS. 23 and 15, respectively) previously discussed, and/or AC plug. In additional to specific signals sent from the field replaceable battery to the mobile base and/or remote server, the field replaceable battery may also indicate a charge status on a visible face of the main body of the battery either through one or more lights or a visible readout. Alternatively, or additionally, the field replaceable battery may indicate the charge status by an audible signal that may change (e.g., start at a certain charge state, grow louder and/or increase frequency of signal, etc.) as the battery is progressively discharged. Moreover, the field replaceable battery may be configured with both an electronic latch 965 and a locking handle 952 that enable either or both of electronic and manual connection/disconnection of the battery with a robot.

According to certain aspects of the present disclosure, various work zones may be defined within a logistics facility. For example, a logistics facility may include zones that are robot specific work zones where human workers are excluded, zones where humans and robots may work side-by-side, and human-only work zones where robots are substantially or totally excluded. These zones may be setup in any user defined manner, such that portions of shelving or storage rows or even individual units may include two or more work zones.

These various work zones may be mapped using granular information, such as 1D barcodes placed on ends of racks, or may be mapped in a more defined manner, such as using identifiers that define specific regions of interest (e.g., individual racks in a row of racks; described in more detail hereinbelow).

Selection of these work zones may be dynamic. That is, the various work zones may be defined/redefined at any point during operation of the system from either the central server 200 or the WMS 201. In certain instances, signals may be communicated to the central server 200 or the WMS 201 regarding a new limitation or definition of the work zones, such as from any of the robots (600, 600*b*, 900', 900"). For example, in the case of a human accident or emergency, it may be necessary to exclude robots from a specific area of a logistics facility. Robots in the area may send information regarding the emergency (i.e., emergency signals initiated by the robot or by a human worker, or sensor information that may be interpreted at a distal location to indicate an emergency).

As discussed hereinabove, bin retrieval robots (600, 600*b*) may pick bins from standard shelving and may transport those bins to a different zone within the logistics facility, such as to a conveyor or a pack/ship zone (see 320 and 350 of FIG. 23). The bin retrieval robots may pick bins and may transfer those bins to a transport robot (e.g., 900', 900"). The transport robot may then travel to a different location to deliver the bin. Exemplary locations include a conveyor or a pack/ship zone (see 320 and 350 of FIG. 23). Alternatively, the transport robot (900', 900") may transfer the items to another transport robot for delivery to any of those locations.

As example, and with reference to FIG. 21, shown in zone 830, bin retrieval robots 874 may pick bins from standard shelving 840 and may transport those bins to a different zone within the logistics facility 800, such as to a conveyor or a pack/ship zone (see 320 and 350 of FIG. 23). The bin retrieval robots 873 may pick bins and may transfer those bins to a transport robot 868. The transport robot 868 may then travel to a different location to deliver the bin. Exemplary locations include a conveyor or a pack/ship zone (see 320 and 350 of FIG. 23). Alternatively, the transport robot 868 may transfer the bins to another transport robot 867 for delivery to any of those locations.

The systems of the presently disclosed invention may also work side-by-side with human workers in a mixed work zone 820. For example, and with continued reference to FIG. 21, human workers (853, 854) may pick items or bins and transport those items or bins to a conveyor or a pack/ship zone, or to a transport robot (866, 864), or to a bin retrieval robot 871. Bin retrieval robots 872 may also pick bins from standard shelving 840 and may transfer those bins to transport robots 865. As indicated above, the transport robots 865 may then travel to a different location, such as a conveyor or a pack/ship zone (see 320 and 350 of FIG. 23) to deliver the bins, or may transfer the bins to another transport robot (866, 862) for delivery to any of those locations.

Within the same logistics facility, human only work zones 810 may be established where robots are substantially or totally excluded. Human pick workers 851 may select items or bins for transport to a conveyor or a pack/ship zone (see 320 and 350 of FIG. 23). According to certain aspects, transport robots (861, 863) may be allowed in these zones (810) to accept items, totes, or bins from the human workers 852. These transport robots (861, 863) may then travel to a different location, such as a conveyor or a pack/ship zone (see 320 and 350 of FIG. 23) to deliver the items, totes, or bins, or may transfer the items, totes, or bins to another transport robot 862 for delivery to any of those locations. As shown in FIG. 21, there may be overlap 835 between certain of these zones.

According to certain aspects of the present disclosure, mapping of bins to a region of interest (e.g., slots on a shelf or rack) within the logistics facility may be dynamic. For example, certain bins, or certain items stored within a bin, may become more highly requested, and thus localization of those items to additional storage locations, and/or to storage locations closer to pack and ship areas of a logistics facility may enhance picking operations. Thus, according to certain aspects, the identities of items or bins stored at specific regions of interest, as defined by the markers positioned according to the methods disclosed herein, may be dynamic. That is, item or bin identities at regions of interest may be dynamic and may be redefined at any point during operation of the system from either the central server 200 or the WMS 201. In certain instances, signals may be communicated to the central server 200 or the WMS 201 regarding a new limitation or definition of product or bin location, such as from any of the robots (600, 600*b*, 900', 900"; i.e. using SLAM methods as detailed herein). This information may stem from recognition of SKU information on the item or other marker information on a bin (i.e., barcode, marker) or from other characteristics of the item/bin recognized by one of the AMRs (e.g., visual recognition of written matter on a bin or SKU, or combination of bin size, shape, color, and/or weight, etc.).

With continued reference to FIG. 23, an exemplary logistics facility 300 may include a defined robot only work zone 330 and a plurality of transfer areas 360 in which items would be transferred to and from the bin retrieval robots 600 and/or transport robots (900', 900"), and/or from human workers. The transfer area 360 may possibly interface with a packing and shipping station 350, a conveyor 320, a staging area, or any combination thereof.

According to certain aspects, a human worker may remove picked items from the bin, or the entire bin from the robot 600/600*b*/900'/900" at the transfer area 360. If a bin is removed, a new bin could be transferred to the robot 600/900'/900" for fulfillment of the next order. The system may be designed to interface automatically with a separate conveyor system 320 which may be adjacent to the transfer area 360, whereby items or bins could be automatically moved through a conveyor 320 around a facility to and from a robot picking area 330 (work zone). Moreover, as noted hereinabove, the robots (600, 600b, 900',900") may include more than one area configured to accept a bin. As such, multiple bins may be returned to the transfer area 360 or conveyor 320.

The method may employ transfer of picked items from the bin or the entire bin by a human operator or the transfer of bins may be automatic. That is, the conveyance means of the bin retrieval robot (600, 600b) or the transport robot (900', 900") may allow for automatic transfer to the conveyor 320 or other transfer area 360. The bin retrieval robot (600, 600b) may adjust a height of the bin handling platform 110 to match a height of the conveyor 320 or transfer area 360 or transport platform 910 of a transport robot. Additionally, the conveyance system of the transport platform 910 on the transport robot (900', 900") may be actuated to transfer items, or bins from the transport platform 910 to the conveyor 320 or transfer area 360, or to the transport platform 910 of another transport robot (900', 900").

According to certain aspects, the systems and methods of the present disclosure may further include autonomous mobile manipulation robots (AMMR) such as disclosed in any of U.S. Pat. No. 9,785,911 or 9,519,882. These AMMRs may be used to pick items or pieces that may be placed into totes or bins and transferred to any of the AMRs disclosed herein (i.e., 600, 600b, 900', 900").

With reference to FIG. 22, the system's central server 200 may be used to process order information that is transacted with a WMS 201 and may coordinate the fulfillment of orders with a plurality of bin retrieval robots (600, 600b) and transport robots (900', 900"). All computation on the server 200 may be executed by one or more internal processors 220. The server may have two software modules that enable this order fulfillment coordination. The first processor may be a task dispatch module 228, which analyzes orders received from a WMS 201, and determines which of the plurality of bin retrieval robots (600, 600b) and/or transport robots (900', 900") is to be assigned to an order. After one or more robots are selected for picking/transporting a bin or multiple bins, the task dispatcher 228 instructs the robot with high-level order picking information, such as, route navigation paths, bin locations, and an order drop-off location. The task dispatcher 228 works closely with a system state monitor 230 to obtain key feedback information from the system. The system state monitor 230 may communicate with the bin retrieval robots (600, 600b) and transport robots (900', 900") to keep track of their current physical location within the facility, along with status information, which may include but is not limited to: whether the robot is currently assigned an order, any faults or error modes, health information such as remaining battery power or charging status, inventory information, etc.

The central server 200 may also be used to store and process centralized SKU or bin identity information in a database 256, which stores information required by the robots to complete the bin picking. The processing of this SKU/bin specific information may be executed within an analysis software module 226. The SKU information can include SKU size and shape data, which can include physical dimensions, 3D geometry that can include point and triangle mesh structures, item weight, appearance information that can include colorized texture maps, and may include SKU marking codes, that can include barcode and UPC data. Bin specific information may include a bin identity and/or identity of specific SKUS stored in a bin.

According to certain aspects, the SKU information may comprise data collected by the system and methods disclosed in U.S. Pat. No. 10,311,634 titled "Three-dimensional scanning and data extraction systems and processes for supply chain piece automation", the content of which is incorporated herein in its entirety.

The central server 200 may store information about the state of the SKU/bin inventory in the database 256 and may process this information in the analysis module 226. Such information may include the position of bins within the logistics facility, i.e., in their stored location. The central server 200 enables multiple robots to share information about the state of inventory and plans for picking. Inventory and SKU status information may also be shared with the central server 200 and/or WMS 201 by the robots. For example, if a certain SKU/bin is absent, misplaced, or in a position that is not readily retrievable by the bin retrieval robot (600, 600b), the robot may send this information to the central server 200/WMS 201.

In certain instances, the bin retrieval robot (600, 600b) may encounter a situation wherein the bin at the target location (as defined by the central server 200 or the WMS 201) may not match the characteristics of the expected bin at that location (e.g., wrong marker, size, shape, color, weight, etc.). In such an instance, the bin retrieval robot (600, 600b) may send signals back to the central server 200 and/or WMS 201 indicating an error (i.e., mapping error or stocking error). The bin retrieval robot (600, 600b) may request clarification from the central server 200 and/or WMS 201 or may request assistance from a human worker. For example, the request may be displayed on a display screen of the bin retrieval robot (600, 600b) and the human worker may indicate the correct pick for the robot. Alternatively, the request may be displayed on a remote display screen, and a human may indicate the correct pick for the robot.

In the instance when the bin retrieval robot (600, 600b) is unable to retrieve a bin at a first location, such as when it encounters any of the errors mentioned above (e.g., item missing, wrong item, item position so that the telescoping deck can't execute the retrieve, etc.), a redundant picking method/system may be employed. For example, when the bin retrieval robot encounters an error at a first pick location 841, it may travel to a second pick location 842 and attempt the same pick. Should the bin retrieval robot encounter an error at this second pick location 842, it may travel to a third pick location 843 and attempt the same pick. This redundant storage of items or bins may improve efficiency and reduce error rates in a pick operation. For example, should the pick accuracy at a single pick location be about 80%, inclusion of at least a second pick location would increase the pick accuracy to about 96%, and inclusion of a third pick location would increase the pick accuracy to about 99.2%. Should the pick accuracy at a single pick location be about 90%, inclusion of at least a second pick location would increase the pick accuracy to about 99%, and inclusion of a third pick location would increase the pick accuracy to about 99.9%. In situations of limited space within the logistics facility, only high traffic items may be stored in multiple pick locations.

The markers for each of these redundant storage locations or slots would not be the same. The central server 200 may store information about the infrastructure of the facility of operation in a map storage database 254. This can include information about the storage racks such as shelving dimensions (width, depth and height), separate shelf level heights, shelf face widths, and rack column widths. The infrastructure information can be created, modified and analyzed through a map creation software module 224 on the central server 200. Using this module, a human operator can manually create a facility map or may load the map data from a predefined file, such as a Computer Aided Drawing (CAD) file, or may load mapping data automatically collected by a robot (e.g., 600, 600*b*, 900', 900"), such as by any one or more of their onboard sensors, which can use its onboard sensors to observe the facility infrastructure and automatically generate a map.

The robots (600, 600*b*, 900', 900") may also dynamically upload mapping data automatically collected by their various sensors. That is, the one or more robots may collect image data and utilize simultaneous localization and mapping (SLAM) to generate a map of the logistics facility using the location of various markers dispersed throughout the warehouse. SLAM provides real-time construction/updating of a map of an unknown environment while navigating through that environment. Popular SLAM approximate solution methods include particle filter, extended Kalman filter, and GraphSLAM.

Data from the various sensors on the mobile base and/or robots comprising the mobile base may be processed by the onboard computer processor (218, 978) in a navigation software module (212, 972) to extract landmark locations. According to the present disclosure, the system may use landmarks placed ahead of time in fixed locations around the facility of operation. At least one of the sensors may be used to detect these markers and locate the mobile base 900 or robot (600, 600*b*, 900', 900") relative to them. This enables either to know precisely where it is in the facility. Each marker may have a unique pattern that is different from other markers within the same facility. The unique marker pattern may be recognized by navigation module (212, 972) algorithms which may be run by the onboard computer processor (218, 978), thus allowing the mobile base 900 or robot (600, 600*b*, 900', 900") to localize itself without ambiguity.

Exemplary landmarks include visual markers as described above, which may include any identifiable unique visual pattern, such as barcodes, numbers, letters, geometric shapes, or even a specific pattern of blinking lights, and audible markers, which may include at least unique patterns of sound or even specific tones of sound. Before a robot can use landmarks for navigation, the characteristics of the landmarks may be stored on the central server 200, the WMS 201, and/or on the storage (216, 976) of the mobile base 900 or robot (600, 600*b*, 900', 900"). When the characteristics of the landmarks are stored on the storage (216, 976) of the robots, they may navigate autonomously through a logistics facility and may not require constant communication from the central server 200 or WMS 201.

According to certain aspects, the present disclosure provides methods and systems that assist the various robots described herein in finding their way around a logistics facility and identifying the exact locations of specific items, bins, or cases to pick. Accurate execution of such operations is an important component to overall order picking success. As such, methods for robust robot localization, mapping and region of interest segmentation beyond simple navigation markers on inventory shelving or facility flooring may be used.

The present disclosure utilizes a novel marker system that may be applied on every inventory rack in a logistics facility and may even be used across multiple logistics facilitates. The marker system provides successful picking without having to positively identify the object or bin to be picked. Moreover, use of such a marker system allows for the dynamic reassignment of storage locations mentioned hereinabove.

According to certain aspects, the markers generally serve as visual fiducial markers, which can be used to extract pose and marker signature. Currently available markers use a binary matrix to encode information. An inherent flaw in use of this binary matrix is that it limits the maximum number of markers you can have, and thus the maximum number of items or locations that can be identified in a logistics facility. While increasing the resolution of the marker somewhat mitigates this limitation, the number of possible markers remains finite and generally less than the number required in current day logistics facilities. Such a facility can theoretically contain an infinite set of mapping points, which means that, over a period of time for a sufficiently large facility, the markers will need to repeat.

The present solution to this problem includes generating markers based on the physical location of an individual rack within the logistics facility. Thus, even though the finite number of markers and potentially infinite number of racks means that these markers will still repeat, according to the present solution, the tags only need to be unique in a local span. However, ensuring that a tag is unique locally means maintaining information on neighboring racks. This activity creates a large bookkeeping operation to keep up with neighboring rack data while generating markers for a single rack.

An alternate solution is to compute a continuous periodic function that repeats tags after a preset span. For any minor changes to the racks locally, however, an entire span of racking would have to be recomputed to ensure that the contiguous nature of the tag progression is maintained. With the potentially infinite span of a logistics facility, the problem becomes intractable if there is infinite flexibility in the way racking is arranged. Thus, if marker generation were to be automated, certain constraints would need to be placed on the way the facility could be arranged or rearranged, or on how a robot may operate in such a facility.

This problem can be offset by imposing constraints on the facility to make the problem tractable. Having a general set of assumptions that are valid throughout the facility allows a locally unique set of markers to be computed for each rack without maintaining data on its neighbors. This solution has a two-fold advantage: (1) locally unique markers can be generated as a result of a rack's unique attributes, meaning information on the rack's neighbors is unnecessary and does not have to be maintained; and (2) while picking, the feature vector of markers to be expected at the shelf can be computed using rack information.

The present disclosure solves both issues, where a large cumbersome optimization does not need to be computed, and local changes to racks do not need an entire span of racks to have their markers regenerated to guarantee local uniqueness. This solution also solves the bookkeeping problem, i.e., a database does not need to be maintained for the markers and their location, as they are simply computed on the go.

Accordingly, the present disclosure uses a continuous approach to marker placement that allows locations of discrete markers to be mapped to a continuous periodic function. Rather than associating specific tag identities with rack identities, these marker tags are associated with the location of the slots or areas of interest they represent. As such, the present disclosure comprises three novel ideas: (1) locally unique features, (2) computation of a landmark index based on a periodic function, and (3) the ability to use a finite set of landmarks over an infinite space.

This novel approach uses a periodic function that has the width of one marker in metric space as the minimum resolution, which differentiates a unique physical position (x-axis) for each marker value (y-axis). This method produces markers in a repeating pattern of integer indices for an infinitely long axis in the metric space. Therefore, every slot on a rack maps its metric position to the corresponding marker and has a locally unique marker index. See for example the system disclosed in U.S. Provisional Application Ser. No. 62/987,084, filed on Mar. 9, 2020.

This method allows for multimodal localization using the markers positioned at slots or regions of interest. Further, it allows for implicit global localization for probabilistic beliefs, as a repeating pattern for any marker would be far enough from the current state to be not considered as an update to the multimodal belief. It also allows for the robot to update its belief on where the markers themselves are actually located in a full simultaneous localization and mapping (SLAM) application, i.e., in instances when the marker has been physically placed in the wrong location (either relatively on the shelf, the whole rack, or both).

According to certain aspects, individual racks in a logistics facility may also include a marker that may uniquely identify a rack and/or rack location within the logistics facility. The markers placed on the racks may be different from the markers placed on the shelves, as described above. For example, according to certain aspects, each rack in a logistics facility may include a unique 1D barcode positioned at an end thereof. Further, the 1D barcodes may be positioned vertically so that the information may be accurately scanned by sensors of a passing robot. Alternatively, or additionally, these markers may be positioned on the floor or at other locations within such a facility (e.g., support beams, doorways, walls) that may provide granular orientation information that is differentiated over the more precise location information provided by the set of markers placed using the presently disclosed periodic function.

Accordingly, these additional markers may aide in a granular definition or mapping of the logistics facility. Once at a specific rack or granular location within the facility, the markers disclosed herein may provide the fine mapping to accurately locate and identify a slot or region of interest on the rack.

This invention addresses several challenges associated with localization, mapping, and region of interest segmentation, which include the ability to positively identify a region of interest (e.g. a slot) to find an item of interest using smaller markers detectable by low-resolution cameras. These markers provide localization to and positive identification of the region of interest by guaranteeing local uniqueness of landmarks in a 1-D manifold of 3-D space of potentially infinite span (i.e., marker location calculated based in a periodic function).

The unique localization of markers at the region of interest allows mapping of a finite set of landmarks to an infinite space. Moreover, localization of the markers based on a periodic function allows onboard computation of expected landmarks as opposed to maintaining a lookup table of markers to locations in space, and ready identification of missing or mispositioned markers.

The identity of these identifiers may be determined by onboard processors of the robot, such as any of the robots disclosed herein, or by processors of a remote server such as the WMS 201 or the central server 200. These identities may be used to calculate or understand a pose of the robot within a 3D space.

According to certain aspects, the remote server such as the WMS 201 or the central server 200 may be configured to invalidate pose information sent from a robot and may enforce a different pose via an external message. According to certain other aspects of the systems and methods, a human user may be able to enforce a different pose for a specific robot, such as via interaction at a user interface of the robot (display screen, USB port, etc.).

The central server 200 and/or WMS 201 may also be used to store and process centralized information about the markers and their initial mapped locations within the logistics facility, in a marker database. The location within the logistics facility generally comprises a set of x, y, and z coordinates. For example, the x,y coordinates provide a position in logistics facility of a rack and z position provides the height of a shelf on the rack. The processing of this information may be executed within a marker analysis software module.

The navigation process may also be aided by a remote server such as such as the WMS 201 or the central server 200. The remote server may have access to the central facility map storage 254, which enables it to analyze the stored maps in depth and optimize routes between pick locations. As such, the central server 200 may have a set of route planning algorithms in a software module 222 that allow it to pre-compute navigation routes within the robot work zone 330, and between the work zone 330 and any transfer areas 360 (FIG. 23), or within the various defined work zones shown in FIG. 21. These routes can be stored after computation in a route storage database 252 within the central server 200, so that they can quickly be recalled and communicated to the mobile base or robots for rapid response during order fulfillment and for interchangeability between multiple robots.

With reference to FIG. 24, shown is a typical warehouse or distribution center utilizing a bin retrieval robot system 700 according to certain aspects of the present disclosure. Shown are human pickers 780 in a pack and ship area 720 as well as bin retrieval robots (600, 600*b*) pulling bins from and returning bins to shelving in a storage area 710. The storage area may contain standard shelving and may be part of any logistics facility.

As discussed above, the central server 200 may be responsible for receiving orders from the WMS 201. The order may contain information such as, for example, UPC, product description, location in the warehouse (which rack, which shelf, which slot on the shelf), order number and quantity of each product to be shipped. This information may be processed by software running on the central server 200, and the bin retrieval robot (600, 600*b*) to retrieve the bin(s) based on current location or availability may be determined.

Once the bin retrieval robot(s) (600, 600*b*) is selected, it will autonomously move to the location of the bin on the specific shelf. Once there, the bin retrieval robot (600, 600*b*) may be able to detect the bin via image processing techniques, which might identify the bin or read a code on the bin (e.g., marker) or designated area of interest (e.g., on the shelving at the bin location) to verify that it is the correct bin. The bin retrieval robot 600 may be able to do additional movements to position itself optimally in front of the bin so that the telescoping deck (602, 603) is able to pull the bin retrieval device 140 from the shelf onto bin handling platform 110. After finding and moving the bin onto the bin handling platform 110, the bin retrieval robot 600 may transfer that bin to another robot (e.g., a transport robot 900', 900"), or may autonomously navigate to a retrieval queue 722 in front of a human picker 780 that is to complete the order. If the bin has been transferred to a transport robot (900', 900"), it may autonomously navigate to the retrieval queue 722 in front of the human picker 780 that is to complete the order. It is possible that an order requires multiple bins delivered by a single bin retrieval robot or by multiple robots 600/900. The system may optimize the overall performance such that for each order, the items are delivered to the retrieval queue in a timely fashion so that the human picker 780 can close out that order and send it to shipping for delivery to the customer.

After a bin retrieval robot (600, 600*b*) or transport robot (900', 900") has dropped off the bin(s) 650*a* at the retrieval queue 722, the human picker 780 may transfer a product from the bin 650*a* into a shipping box 790. The shipping box 790 may be transferred to a shipping department or area 730 on a conveyance means 795. The bin retrieval robot 600 or transport robot (900', 900") may then be instructed by the central server 200 to pick up bins (650*b*, 650*d*) from any of the storage queues (724, 754) that have bins ready to be placed back into the storage area 710. The bin retrieval robot 600 can pull up to the storage queue (724, 754), which has bins (650*b*, 650*d*) waiting, and pull one or more bins onto its bin handling platform 110 using the bin retrieval device 140, and/or the transfer system on the bin handling platform 110. Alternatively, the transport robot (900', 900") can pull up to the storage queue (724, 754), which has bins (650*b*, 650*d*) waiting, and transfer a bin onto its transport platform 910, such as by using the roller bars 912.

Once it has loaded the bins (650*b*, 650*d*) from the storage queue (724, 754), the bin retrieval robot (600, 600*b*) or transport robot (900', 900") may then move to the location in the storage area 710 that is to hold this bin. If transported by the bin retrieval robot 600, it may use its conveyance means (601*a*, 601*b*) to transfer the bin to the storage location.

If the bin 650*b* has high moving products, the central server 200 may place the bin in an optimal location in the storage area 710 to speed up retrieval for future orders. If the bin is empty, the human picker 780 may store the bin on the floor, or in a location near them instead of putting the bin on the storage queue. Alternatively, the human picker 780 may place the empty bin in the storage queue 724 so that a bin retrieval robot (600, 600*b*) may transport the bin to the replenishment area 750.

After a bin retrieval robot has placed each of the bins 650*b* in the storage area 710, it may resume retrieval of other bins if there are orders to be picked, perform more storage activities if there are bins to be stored, or reorganize the shelves if the central server 200 determines it would be valuable. Lastly if there are no tasks for the bin retrieval robot (600, 600*b*) or the transport robot (900', 900"), it may position itself in front of a charging station so it can charge its batteries.

Another aspect of the invention is how the system handles replenishment. Replenishment is the act of putting newly obtained products into a bin for future retrieval. For example, when a new case of product 792 arrives in a receiving department or area 740, the central server 200 may instruct a bin retrieval robot (600, 600*b*) or a transport robot (900', 900") to pick up one or more bins in which the new product will be placed. The case of product 792 may move along a conveyance means 753 to a replenishment area 750. One or more bin retrieval robots (600, 600*b*) or transport robots (900', 900") may retrieve bin(s) 650*c* for that particular product from the storage area 710 and deliver them to the replenishment retrieval queue 752. A human 782 may then put the items into the bins(s) 650*d* and place them onto the replenishment storage queue 754. A bin retrieval robot (600, 600*b*) or transport robot (900', 900") will then pick up one or multiple bins to be placed in the storage area 710. Alternatively, if this is a newly stored product, or as discussed below, includes filling of additional bins not previously found in the storage area 710, the human 782 may fill bins stored within the replenishment area (e.g., 650*e*) or supplied via the conveyance means 753.

The central server 200 may have knowledge of bin capacity, storage area 710 capacity and the speed at which products move. When overall storage area 710 capacity permits, the system may put high moving products into multiple bins instead of squeezing into one bin, thus allowing multiple bin retrieval robots (600, 600*b*) or transport robots (900', 900") the opportunity to deliver bins of high moving products to human pickers at the same time. The system may manage this optimization automatically and handle the condensing of multiple bins of the same product when situations change concerning the speed at which the product is moving.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

Aspects of the Present Disclosure

The following aspects are disclosed in this application:

Aspect 1: An autonomous mobile robot (AMR) for retrieving bins (retrieval robot), the AMR comprising a mobile base having a vertical tower positioned thereon, a bin handling platform moveable on the vertical tower along vertical tracks on a face of the vertical tower, the bin handling platform comprising a telescoping deck having at least a first and second telescoping platform extendable horizontally from the bin handling platform.

Aspect 2: The AMR according to any previous aspect, wherein the first telescoping platform comprises at least one twister arm at each end thereof, wherein each twister arm has a retracted or open position parallel and flush with a top surface of the first telescoping platform and an extended or closed position perpendicular to the top surface of the first telescoping platform.

Aspect 3: The AMR according to any previous aspect, wherein the first telescoping platform comprises a platform conveyance means at each end thereof, wherein ends of the first telescoping platform are perpendicular to an extension direction thereof.

Aspect 4: The AMR according to any previous aspect, wherein each platform conveyance means is configured to move in a direction parallel to and opposite from the extension direction of the first telescoping platform.

Aspect 5: The AMR according to any previous aspect, wherein the platform conveyance means comprises a conveyor belt, one or more roller bars, or a combination thereof.

Aspect 6: The AMR according to any previous aspect, wherein the first and second telescoping platforms are extendable from either side of the bin handling platform.

Aspect 7: An autonomous mobile robot (AMR) for retrieving bins (retrieval robot), the AMR comprising a mobile base having first and second ends defining a longitudinal length therebetween; a support frame installed on and extending above the mobile base and provided with a plurality of storage trays projecting horizontally from a first side of the support frame and distributed in a vertical direction thereon; a bin handling platform having an upper surface comprising a bin retrieval device, wherein the bin handling platform projects from a second side of the support frame opposite the first side and is moveable vertically along the support frame and positionable at each of the plurality of storage trays, wherein the bin retrieval device is configured to extend along a horizontal plane from the bin handling platform to a position under a bin, and retract horizontally to pull the bin onto the bin handling platform, and wherein, the bin handling platform is configured to deliver the bin to one of the plurality of storage trays without rotation of the bin handling platform or bin retrieval device.

Aspect 8: The AMR according to aspect 7, wherein the first and second sides of the support frame are coincident with the first and second ends of the mobile base, and wherein the horizontal plane of the bin retrieval device is perpendicular to the longitudinal length of the mobile base and substantially parallel with a top surface thereof.

Aspect 9: The AMR according to aspect 7 or 8, wherein the bin retrieval device comprises a pair of telescoping arms that extend along the horizontal plane in either direction from the bin handling platform.

Aspect 10: The AMR according to any one of aspects 7 to 9, wherein each telescoping arm comprises a retractable finger at each end thereof, wherein each of the retractable fingers are configured to have an open position parallel and flush with the telescoping arm and a closed position substantially perpendicular to the horizontal plane and extending upward therefrom.

Aspect 11: The AMR according to any one of aspects 7 to 10, wherein, after the bin retrieval device extends along the horizontal plane from the bin handling platform to a position under a bin, the bin handling platform is configured to lift vertically to a raised position before the bin retrieval device retracts horizontally.

Aspect 12: The AMR according to any one of aspects 7 to 11, wherein the upper surface of the bin handling platform comprises a transfer mechanism configured to move the bin between the bin handling platform and one of the plurality of storage trays.

Aspect 13: The AMR according to any one of aspects 7 to 12, wherein the transfer mechanism moves the bin through a 90-degree turn without rotation of the bin, and comprises wheels, omni-wheels, mecanum wheels, rollers, roller balls, activated roller belts, belts, or combinations thereof.

Aspect 14: The AMR according to any one of aspects 7 to 13, wherein each storage tray comprises an actuatable conveyance system.

Aspect 15: The AMR according to any one of aspects 1 to 14, further comprising a plurality of sensors; one or more processors; a remote communication device; and a memory comprising computer program instructions executable by the one or more processors to receive data from and send data to a central server, process data received from each of the plurality of sensors, and output control signals to the mobile base.

Aspect 16: The AMR according to aspect 15, wherein the plurality of sensors include forward and rear facing cameras and a laser ranging device, wherein the laser ranging device is positioned in a horizontal cavity of the mobile base, the horizontal cavity located in one of the first and second ends of the mobile base and configured to afford the laser ranging device a 180-degree field of view on a horizontal plane elevated from and parallel with a floor surface.

Aspect 17: The AMR according to aspect 16, wherein the field of view of the laser ranging device is greater than 240-degrees.

Aspect 18: The AMR according to any one of aspects 15 to 17, wherein the plurality of sensors include positional sensors located on an edge of the bin handling platform and configured to provide a view substantially perpendicular to a direction of travel of the AMR.

Aspect 19: The AMR according to aspect 18, wherein the positional sensors include at least a first and a second sensor configured to detect a first and second positional reflector on another robot or a conveyance system and enable alignment of the AMR with the other robot or conveyance system.

Aspect 20: The AMR according to aspect 19, wherein the AMR is configured to reduce a rate of forward motion when the first sensor detects the first positional reflector, and stop when the second sensor on the AMR detects the second positional reflector.

Aspect 21: The AMR according to any one of aspects 15 to 20, wherein the plurality of sensors comprises a data sensor located on the edge of the bin handling platform and the AMR is configured to exchange data via the data sensor with the other robot or conveyance system when aligned therewith.

Aspect 22: The AMR according to any one of aspects 15 to 21, wherein the AMR is configured to exchange data with other robots or conveyance systems when aligned therewith via a central server.

Aspect 23: The AMR according to any one of aspects 15 to 22, wherein the AMR is configured to exchange data with a central server, wherein the central server is configured to send a task list to the AMR including at least one bin to be picked, wherein the task list includes a location within a logistics facility for the at least one bin.

Aspect 24: An AMR according to any one of aspects 1 to 23, comprising a field replaceable battery, wherein the field replaceable battery comprises at least one battery cell, a charging interface for connecting the at least one battery cell to an external power source, and a blind mate connector electrically connected to the at least one battery cell and configured to engage a corresponding blind mate connector on the bin retrieval robot.

Aspect 25: The AMR according to aspect 24, wherein the field replaceable battery comprises a self-contained charging circuit that is connectable to an external power source.

Aspect 26: The AMR according to aspect 24 or 25, wherein the AMR is configured to autonomously exchange the field replaceable battery based on signals received from one or both of a charge sensor on the field replaceable battery and a central server.

Aspect 27: An AMR according to any one of aspects 1 to 26, comprising at least two direct drive wheels, each direct drive wheel comprising: an inner stationary stator comprising a plurality of electromagnets positioned on an outer circumference thereof; a cylindrical outer rotor surrounding the inner stationary stator and including: a plurality of permanent magnets alternatively magnetized north and south and positioned on an inner circumferential surface of the rotor forming a magnetic clearance gap between the plurality of permanent magnets and the plurality of electromagnets, and a tire positioned on an outer circumferential surface of the rotor; and a stationary central shaft having a central axial bore, wherein the stator is mounted to the central shaft and the rotor is configured for rotation about the stator, wherein a motor controller, such as a battery on the mobile base, is configured to provide power to groups of electromagnets of the plurality of electromagnets, and to apply a switching pattern to the groups to cause the outer rotor to rotate about the stator.

Aspect 28: The AMR according to aspect 27, wherein each direct drive wheel further comprises: a front cover attached to an outer circumferential edge of the rotor; and a back cover attached to an inner circumferential edge of the rotor and extending inward from the rotor toward the central shaft such that the stator is positioned between the front cover and the back cover, wherein rotation of the rotor about the central shaft is permitted by a first bearing positioned between an inner surface of the front cover and the central shaft and a second bearing positioned between an inner edge of the back cover and the central shaft.

Aspect 29: The AMR according to aspect 27 or 28, wherein the central shaft of each of the direct drive wheels further includes at least one axial bore offset from the central axial bore and configured to accept an attachment means for connection to the bin retrieval robot.

Aspect 30: A system for bin retrieval and transport within a logistics facility comprising an AMR according to any one of aspects 1 to 30 and a transport robot.

Aspect 31: The system according to aspect 30, wherein the transport robot comprises a mobile base; at least one bin platform comprising a conveyance means; a plurality of sensors; one or more processors; a remote communication device; and a memory comprising computer program instructions executable by the one or more processors to receive data from and send data to a central server, process data received from each of the plurality of sensors, and output control signals to the mobile base.

Aspect 32: The system according to aspect 30 or 31, wherein the AMR is configured to adjust a height of the bin handling platform to match a height of the at least one transport platform of the transport robot and to transfer the bin thereto or therefrom using a conveyance means on either or both of the AMR and the transport robot.

Aspect 33: A system for picking, transport, and put-away of bins within a logistics facility, the system comprising a central server; and an AMR according to any one of aspects 1 to 30, wherein the central server is configured to send a task list to the AMR, and wherein the task list includes a location within the logistics facility for at least one bin to be picked or put-away.

Aspect 34: The system according to aspect 33, wherein the task list includes a unique identification for the at least one bin, and the location within the logistics facility includes an identity of a shelf defined by a shelf marker, an identity of a region of interest on the shelf defined by two fiducial markers positioned at horizontal edges of the region of interest, or both.

Aspect 35: The system according to aspect 33 or 34, wherein the shelf marker comprises a vertically positioned barcode and/or wherein the fiducial markers comprise a 2D code.

Aspect 36: The system according to any one of aspects 33 to 35, further including a transport robot, wherein the transport robot comprises a mobile base; at least one bin platform comprising a conveyance means; a plurality of sensors; one or more processors; a remote communication device; and a memory comprising computer program instructions executable by the one or more processors to receive data from and send data to a central server, process data received from each of the plurality of sensors, and output control signals to the mobile base.

Aspect 37: The system according to aspect 36, wherein the AMR is configured to adjust a height of the bin handling platform to match a height of the at least one transport platform of the transport robot and to transfer the bin thereto or therefrom using a conveyance means on either or both of the AMR and the transport robot.

What is claimed is:

1. A bin retrieval robot comprising:
    a mobile base having first and second ends defining a longitudinal length therebetween;
    a plurality of sensors;
    one or more processors;
    a remote communication device;
    a memory comprising computer program instructions executable by the one or more processors to receive data from and send data to a central server, process data received from each of the plurality of sensors, and output control signals to the mobile base;
    a support frame installed on and extending above the mobile base and provided with a plurality of storage trays projecting horizontally from a first side of the support frame and distributed in a vertical direction thereon; and
    a bin handling platform having an upper surface comprising a bin retrieval device, wherein the bin handling platform projects from a second side of the support frame opposite the first side and is moveable vertically along the support frame and positionable at each of the plurality of storage trays,
    wherein the bin retrieval device is configured to extend along a horizontal plane from the bin handling platform to a position under a bin, and retract horizontally to pull the bin onto the bin handling platform, and
    wherein, the bin handling platform is configured to deliver the bin to one of the plurality of storage trays without rotation of the bin handling platform or bin retrieval device, and
    wherein the plurality of sensors include forward and rear facing cameras and at least one laser ranging device, wherein the at least one laser ranging device is positioned in a horizontal cavity of the mobile base, the horizontal cavity located in one of the first and second ends of the mobile base and configured to afford the at least one laser ranging device a 180-degree field of view on a horizontal plane elevated from and parallel with a floor surface.

2. The robot of claim 1, wherein the first and second sides of the support frame are coincident with the first and second ends of the mobile base, and wherein the horizontal plane of the bin retrieval device is perpendicular to the longitudinal length of the mobile base and substantially parallel with a top surface thereof.

3. The robot of claim 2, wherein the upper surface of the bin handling platform comprises a transfer mechanism configured to move the bin between the bin handling platform and one of the plurality of storage trays.

4. The robot of claim 3, wherein the transfer mechanism moves the bin through a 90-degree turn without rotation of the bin, and comprises wheels, omni-wheels, mecanum wheels, rollers, roller balls, activated roller belts, belts, or combinations thereof.

5. The robot of claim 1, wherein the bin retrieval device comprises a pair of telescoping arms that extend along the horizontal plane in either direction from the bin handling platform.

6. The robot of claim 5, wherein each telescoping arm comprises a retractable finger at each end thereof, wherein each of the retractable fingers are configured to have an open position parallel and flush with the telescoping arm and a closed position substantially perpendicular to the horizontal plane and extending upward therefrom.

7. The robot of claim 1, wherein, after the bin retrieval device extends along the horizontal plane from the bin handling platform to a position under a bin, the bin handling platform is configured to lift vertically to a raised position before the bin retrieval device retracts horizontally.

8. The robot of claim 1, wherein each storage tray comprises an actuatable conveyance system.

9. The robot of claim 1, wherein the field of view of the laser ranging device is greater than 240-degrees and up to 270-degrees.

10. The robot of claim 1, wherein the plurality of sensors include positional sensors located on an edge of the bin handling platform and configured to provide a view substantially perpendicular to a direction of travel of the robot.

11. The robot of claim 1, wherein the robot is configured to exchange data with other robots or conveyance systems when aligned therewith via a central server or corresponding data sensors.

12. The robot of claim 1, wherein the robot is configured to exchange data with a central server, wherein the central server is configured to send a task list to the robot including at least one bin to be picked, wherein the task list includes a location within a logistics facility for the at least one bin.

13. The robot of claim 1, further comprising:
a field replaceable battery, wherein the robot is configured to autonomously exchange the field replaceable battery based on signals received from one or both of a charge sensor on the field replaceable battery and a central server, wherein the signals are wired or wireless signals.

14. The robot of claim 1, further comprising at least two direct drive wheels, each direct drive wheel comprising:
an inner stationary stator comprising a plurality of electromagnets positioned on an outer circumference thereof;
a cylindrical outer rotor surrounding the inner stationary stator and including a plurality of permanent magnets, and a tire positioned on an outer circumferential surface of the outer rotor; and
a stationary central shaft having a central axial bore, wherein the stator is mounted to the central shaft and the rotor is configured for rotation about the stator.

15. A bin retrieval robot comprising:
a mobile base having first and second ends defining a longitudinal length therebetween;
a plurality of sensors;
one or more processors;
a remote communication device;
a memory comprising computer program instructions executable by the one or more processors to receive data from and send data to a central server, process data received from each of the plurality of sensors, and output control signals to the mobile base;
a support frame installed on and extending above the mobile base and provided with a plurality of storage trays projecting horizontally from a first side of the support frame and distributed in a vertical direction thereon; and
a bin handling platform having an upper surface comprising a bin retrieval device, wherein the bin handling platform projects from a second side of the support frame opposite the first side and is moveable vertically along the support frame and positionable at each of the plurality of storage trays,
wherein the bin retrieval device is configured to extend along a horizontal plane from the bin handling platform to a position under a bin, and retract horizontally to pull the bin onto the bin handling platform, and
wherein, the bin handling platform is configured to deliver the bin to one of the plurality of storage trays without rotation of the bin handling platform or bin retrieval device,
wherein the plurality of sensors include positional sensors located on an edge of the bin handling platform and configured to provide a view substantially perpendicular to a direction of travel of the robot, and
wherein the positional sensors include at least a first and a second sensor configured to detect a first and second positional reflector on another robot or a conveyance system and enable alignment of the robot with the other robot or conveyance system.

16. The robot of claim 15, wherein the robot is configured to reduce a rate of forward motion when the first sensor on the robot detects the first positional reflector, and stop when the second sensor on the robot detects the second positional reflector.

17. The robot of claim 15, wherein the plurality of sensors comprises a data sensor located on the edge of the bin handling platform and the robot is configured to exchange data via the data sensor with the other robot or conveyance system when aligned therewith.

18. A system for picking, transport, and put-away of bins within a logistics facility, the system comprising:
a central server; and
at least one bin retrieval robot according to claim 1,
wherein the central server is configured to send a task list to the bin retrieval robot, and
wherein the task list includes a location within the logistics facility for at least one bin to be picked or put-away.

19. A system for picking, transport, and put-away of bins within a logistics facility, the system comprising:
a central server; and
at least one bin retrieval robot according to claim 15,
wherein the central server is configured to send a task list to the bin retrieval robot, and
wherein the task list includes a location within the logistics facility for at least one bin to be picked or put-away.

20. A bin retrieval robot comprising:
a mobile base having first and second ends defining a longitudinal length therebetween;
a plurality of sensors;
one or more processors;
a remote communication device;
a memory comprising computer program instructions executable by the one or more processors to receive data from and send data to a central server, process data received from each of the plurality of sensors, and output control signals to the mobile base;
a support frame installed on and extending above the mobile base and provided with a plurality of storage trays projecting horizontally from a first side of the support frame and distributed in a vertical direction thereon; and
a bin handling platform having an upper surface comprising a bin retrieval device, wherein the bin handling platform projects from a second side of the support frame opposite the first side and is moveable vertically along the support frame and positionable at each of the plurality of storage trays,
wherein the bin retrieval device is configured to extend along a horizontal plane from the bin handling platform to a position under a bin, and retract horizontally to pull the bin onto the bin handling platform, and wherein, the bin handling platform is configured to deliver the bin to one of the plurality of storage trays without rotation of the bin handling platform or bin retrieval device, and wherein the plurality of sensors include at least one exteroceptive sensor, wherein the at least one exteroceptive sensor is positioned in a horizontal cavity of the mobile base, the horizontal cavity located in one of the first and second ends of the mobile base and configured to afford the at least one exteroceptive sensor at least a 180-degree field of view on a horizontal plane elevated from and parallel with a floor surface.

* * * * *